(12) United States Patent
Galor Gluskin et al.

(10) Patent No.: US 11,863,884 B2
(45) Date of Patent: Jan. 2, 2024

(54) SYSTEMS AND METHODS FOR CONTROLLING AN IMAGE SENSOR

(71) Applicant: QUALCOMM Incorporated, San Diego, CA (US)

(72) Inventors: Micha Galor Gluskin, San Diego, CA (US); Wesley James Holland, Encinitas, CA (US); Jiafu Luo, Irvine, CA (US); Venkata Ravi Kiran Dayana, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 17/477,255

(22) Filed: Sep. 16, 2021

(65) Prior Publication Data

US 2023/0080715 A1 Mar. 16, 2023

(51) Int. Cl.
*H04N 25/44* (2023.01)
*H04N 25/704* (2023.01)
(Continued)

(52) U.S. Cl.
CPC ....... *H04N 25/44* (2023.01); *G06K 19/06028* (2013.01); *G06K 19/06037* (2013.01);
(Continued)

(58) Field of Classification Search
CPC ........ H04N 5/345; H04N 5/343; H04N 5/351; H04N 5/36961; H04N 5/37452;
(Continued)

(56) References Cited

U.S. PATENT DOCUMENTS 7,573,516 B2 * 8/2009 Krymski ................ H04N 23/73
348/308
8,730,347 B2 * 5/2014 Hirose ................... G03B 13/36
348/226.1
(Continued)

FOREIGN PATENT DOCUMENTS

EP 2858348 A1 4/2015
WO 2021014999 A1 1/2021

OTHER PUBLICATIONS

International Search Report and Written Opinion—PCT/US2022/076240—ISA/EPO—dated Dec. 6, 2022.

*Primary Examiner* — Nhan T Tran
(74) *Attorney, Agent, or Firm* — QUALCOMM Incorporated

(57) ABSTRACT

Systems and techniques are described for imaging. An imaging system includes an image sensor with a plurality of photodetectors, grouped into a first group of photodetectors and a second group of photodetectors. The imaging system can reset its image sensor. The imaging system exposes its image sensor to light from a scene. The plurality of photodetectors convert the light into charge. The imaging system stores analog photodetector signals corresponding to the charge from each the photodetectors. The imaging system reads first digital pixel data from a first subset of the analog photodetector signals corresponding to the first group of photodetectors without reading second digital pixel data from a second subset of the analog photodetector signals corresponding to the second group of photodetectors. The imaging system generates an image of the scene using the first digital pixel data.

31 Claims, 19 Drawing Sheets

(51) Int. Cl.
*H04N 25/42* (2023.01)
*H04N 25/50* (2023.01)
*H04N 25/75* (2023.01)
*G06V 10/70* (2022.01)
*H04N 25/771* (2023.01)
*G06K 19/06* (2006.01)

(52) U.S. Cl.
CPC ............. *G06V 10/70* (2022.01); *H04N 25/42* (2023.01); *H04N 25/50* (2023.01); *H04N 25/704* (2023.01); *H04N 25/75* (2023.01); *H04N 25/771* (2023.01)

(58) Field of Classification Search
CPC ............. H04N 5/378; G06K 19/06028; G06K 19/06037; G06V 10/10
See application file for complete search history.

(56) References Cited

U.S. PATENT DOCUMENTS

| | | | |
|---|---|---|---|
| 10,129,497 B2 * | 11/2018 | Iwabuchi | ................ H04N 25/75 |
| 2005/0173618 A1 * | 8/2005 | Sugiyama | ............ H04N 25/767 |
| | | | 348/E3.018 |
| 2005/0270391 A1 * | 12/2005 | Watanabe | .............. H04N 23/69 |
| | | | 348/294 |
| 2012/0057057 A1 * | 3/2012 | Amano | ................ H04N 23/843 |
| | | | 348/294 |
| 2014/0118592 A1 | 5/2014 | Yoon et al. | |
| 2017/0054925 A1 | 2/2017 | Honda | |
| 2021/0218923 A1 * | 7/2021 | Yoda | ...................... H04N 25/75 |

* cited by examiner

FIG. 3B

Storage Array 320

| S7 | S15 | S23 | S31 | S39 | S47 | S55 | S63 |
| S6 | S14 | S22 | S30 | S38 | S46 | S54 | S62 |
| S5 | S13 | S21 | S29 | S37 | S45 | S53 | S61 |
| S4 | S12 | S20 | S28 | S36 | S44 | S52 | S60 |
| S3 | S11 | S19 | S27 | S35 | S43 | S51 | S59 |
| S2 | S10 | S18 | S26 | S34 | S42 | S50 | S58 |
| S1 | S9 | S17 | S25 | S33 | S41 | S49 | S57 |
| S0 | S8 | S16 | S24 | S32 | S40 | S48 | S56 |

FIG. 3A

Image Sensor 310

| P7 | P15 | P23 | P31 | P39 | P47 | P55 | P63 |
| P6 | P14 | P22 | P30 | P38 | P46 | P54 | P62 |
| P5 | P13 | P21 | P29 | P37 | P45 | P53 | P61 |
| P4 | P12 | P20 | P28 | P36 | P44 | P52 | P60 |
| P3 | P11 | P19 | P27 | P35 | P43 | P51 | P59 |
| P2 | P10 | P18 | P26 | P34 | P42 | P50 | P58 |
| P1 | P9 | P17 | P25 | P33 | P41 | P49 | P57 |
| P0 | P8 | P16 | P24 | P32 | P40 | P48 | P56 |

FIG. 5A

SYSTEMS AND METHODS FOR CONTROLLING AN IMAGE SENSOR

FIELD

This application is related to image capture and/or processing. More specifically, this application relates to systems and methods of controlling whether to perform a first readout of first image data from a first subset of pixels of an image sensor to produce an image with a first resolution, or to perform a second readout of second image data from at least a second subset of pixels of the image sensor to produce an image with a second resolution.

BACKGROUND

An image sensor includes an array of photodetectors, such as photodiodes. Each photodetector receives light from a scene and converts the light into a charge based on how much light reaches the photodetector. Readout of the image data from the image sensor can involve operations such as amplification of the charge produced by the photodetectors, conversion of an analog signal associated with the charge into a digital signal using an analog to digital converter (ADC), and/or additional image processing operations. An amount of power drawn, bandwidth used, heat generated, and/or computational resources used for image capture can be associated with a number of photodetectors that are read out.

Portable electronic devices, such as mobile handsets, cellular phones, head-mounted displays (HMDs), or wearable devices, are increasingly popular. A portable electronic device is generally powered by a portable power storage unit, such as a battery, that is part of the portable electronic device. To remain lightweight and small—and thus portable—portable electronic devices generally include relatively small batteries. Because portable electronic devices have limited battery lives, it is beneficial to reduce power usage of operations performed by portable electronic devices when possible. Some portable electronic devices include cameras. Different resolutions of images may be useful for different use cases. For some use cases, images having a first resolution may be sufficient. For other uses cases, an image having a second resolution (e.g., higher than the first resolution) may be beneficial.

BRIEF SUMMARY

In some examples, systems and techniques are described herein for controlling readout of an image sensor to control a resolution of a captured image and a corresponding power draw. The imaging system includes imaging circuitry. In some examples, the imaging circuitry includes an image sensor with an array of photodetectors, such as photodiodes. In some examples, the photodetectors of the photodetector array of the image sensor are grouped so that each photodetector is in one of a set of multiple distinct groups, for instance based on a pattern. In an illustrative example, some of the photodetectors of the photodetector array are in a first group, some of the photodetectors of the photodetector array are in a second group that is distinct from the first group, and so forth. According to some examples, the imaging system uses a global shutter. According to some examples, the imaging system uses a rolling shutter. The imaging system can reset the photodetectors of its image sensor. The imaging system exposes its image sensor to light from a scene. Each of the photodetectors of the image sensor converts the light from the scene into a charge in response to exposure to the light. According to some examples, the imaging system receives and/or stores analog photodetector signals corresponding to the charge. For instance, the imaging system stores the analog photodetector signals in storage units (e.g., storage diodes) of a storage array in some examples. The imaging system reads out first digital pixel data from a first subset of the analog photodetector signals corresponding to the first group of photodetectors without reading second digital pixel data from a second subset of the analog photodetector signals corresponding to the second group of photodetectors.

Readout of pixel data from some of the photodetectors of the image sensor without readout of other photodetectors of the image sensor can be referred to as sparse readout. Sparse readout reduces power draw, bandwidth used, heat generated, and/or computational resources used compared to dense readout of the photodetectors of the image sensor. Readout of more of the photodetectors of the image sensor than in sparse readout can be referred to as dense readout. Readout of all of, or at least a subset (e.g., at least a threshold amount) of, the photodetectors of the image sensor can be referred to as dense readout. In some examples, different types of photodetectors of an image sensor can be used for different functions. For instance, photodetectors of a first type (e.g., image photodetectors) can be used for image capture, and photodetectors of a second type (e.g., focus photodetectors) can be used for focus, such as for phase detection autofocus (PDAF). Readout of all of, or at least a subset (e.g., at least a threshold amount) of, the photodetectors of a certain type (e.g., photodetectors for image capture rather than for focus) of the image sensor can be referred to as dense readout. Readout can include analog gain, analog to digital conversion (ADC), digital gain, demosaicing, and/or other operations. The imaging system can generate an image of the scene with a first resolution using the first digital pixel data at least in part by combining the first digital pixel data into the image with the first resolution. In some examples, the first resolution can be different from (e.g., less than) a full resolution that the image sensor is capable of. In some examples, the imaging system can reset the photodetectors of the image sensor after capturing the image with the first resolution, for instance before capturing a subsequent image using the image sensor. In some cases, the imaging system can determine that an image with a second resolution (e.g., higher than the first resolution) may be desirable. The imaging system can read out the second digital pixel data and combine it with the first digital pixel data to generate the image with the second resolution.

In one example, an apparatus for imaging is provided. The apparatus includes a memory and one or more processors (e.g., implemented in circuitry) coupled to the memory. The one or more processors are configured to and can: cause an image sensor to expose a plurality of photodetectors of the image sensor to light from a scene, wherein each of the plurality of photodetectors are configured to convert the light from the scene into a charge in response to exposure to the light from the scene, wherein the plurality of photodetectors includes at least a first group of photodetectors and a second group of photodetectors that are distinct from one another; cause the image sensor to store a plurality of analog photodetector signals corresponding to the charge from each the plurality of photodetectors; read first digital pixel data from a first subset of the plurality of analog photodetector signals corresponding to the first group of photodetectors without reading second digital pixel data from a second subset of the plurality of analog photodetector signals corresponding to the second group of photodetectors; and generate an image of the scene using at least the first digital pixel data.

In another example, a method for imaging is provided. The method includes: causing an image sensor to expose a plurality of photodetectors of the image sensor to light from a scene, wherein each of the plurality of photodetectors are configured to convert the light from the scene into a charge in response to exposure to the light from the scene, wherein the plurality of photodetectors includes at least a first group of photodetectors and a second group of photodetectors that are distinct from one another; causing the image sensor to store a plurality of analog photodetector signals corresponding to the charge from each the plurality of photodetectors; reading first digital pixel data from a first subset of the plurality of analog photodetector signals corresponding to the first group of photodetectors without reading second digital pixel data from a second subset of the plurality of analog photodetector signals corresponding to the second group of photodetectors; and generating an image of the scene using at least the first digital pixel data.

In another example, a non-transitory computer-readable medium is provided that has stored thereon instructions that, when executed by one or more processors, cause the one or more processors to: cause an image sensor to expose a plurality of photodetectors of the image sensor to light from a scene, wherein each of the plurality of photodetectors are configured to convert the light from the scene into a charge in response to exposure to the light from the scene, wherein the plurality of photodetectors includes at least a first group of photodetectors and a second group of photodetectors that are distinct from one another; cause the image sensor to store a plurality of analog photodetector signals corresponding to the charge from each the plurality of photodetectors; read first digital pixel data from a first subset of the plurality of analog photodetector signals corresponding to the first group of photodetectors without reading second digital pixel data from a second subset of the plurality of analog photodetector signals corresponding to the second group of photodetectors; and generate an image of the scene using at least the first digital pixel data.

In another example, an apparatus for image processing is provided. The apparatus includes: means for causing an image sensor to expose a plurality of photodetectors of the image sensor to light from a scene, wherein each of the plurality of photodetectors are configured to convert the light from the scene into a charge in response to exposure to the light from the scene, wherein the plurality of photodetectors includes at least a first group of photodetectors and a second group of photodetectors that are distinct from one another; means for causing the image sensor to stored a plurality of analog photodetector signals corresponding to the charge from each the plurality of photodetectors; means for reading first digital pixel data from a first subset of the plurality of analog photodetector signals corresponding to the first group of photodetectors without reading second digital pixel data from a second subset of the plurality of analog photodetector signals corresponding to the second group of photodetectors; and means for generating an image of the scene using at least the first digital pixel data.

In some aspects, to read the first digital pixel data from the first subset of the plurality of analog photodetector signals corresponding to the first group of photodetectors without reading the second digital pixel data from the second subset of the plurality of analog photodetector signals corresponding to the second group of photodetectors, the one or more processors use imaging circuitry to selectively apply a modification to the first subset of the plurality of analog photodetector signals without applying the modification to the second subset of the plurality of analog photodetector signals.

In some aspects, an analog photodetector signal of the plurality of analog photodetector signals is indicative of a voltage corresponding to the charge from one of the plurality of photodetectors.

In some aspects, the methods, apparatuses, and computer-readable medium described above further comprise: the image sensor.

In some aspects, to read the first digital pixel data from the first subset of the plurality of analog photodetector signals, the one or more processors are configured to cause one or more amplifiers to amplify each of the first subset of the plurality of analog photodetector signals corresponding to the first group of photodetectors into a plurality of amplified analog photodetector signals using the one or more amplifiers, wherein the first digital pixel data is based on the plurality of amplified analog photodetector signals. In some aspects, the methods, apparatuses, and computer-readable medium described above further comprise: the one or more amplifiers.

In some aspects, to read the first digital pixel data from the first subset of the plurality of analog photodetector signals, the one or more processors are configured to cause one or more analog to digital converters (ADCs) to convert a plurality of analog signals based on the first subset of the plurality of analog photodetector signals corresponding to the first group of photodetectors into digital signals using the one or more ADCs, wherein the first digital pixel data is based on the digital signals. In some aspects, the methods, apparatuses, and computer-readable medium described above further comprise: the one or more ADCs. In some aspects, the one or more processors are configured to: generate the first digital pixel data based on the digital signals at least in part by processing the digital signals using one or more image processing operations, the one or more image processing operations including at least one of digital gain, demosaicking, pixel interpolation, missing pixel correction, bad pixel correction, brightness adjustment, contrast adjustment, saturation adjustment, histogram adjustment, color space conversion, automatic white balance adjustment, automatic black balance adjustment, downsampling, and upsampling. In some aspects, the plurality of analog signals include a plurality of amplified analog photodetector signals, wherein one or more amplifiers generate the plurality of amplified analog photodetector signals at least in part by amplifying the first subset of the plurality of analog photodetector signals corresponding to the first group of photodetectors.

In some aspects, the one or more processors are configured to: determine whether to read the second digital pixel data from the second subset of the plurality of analog photodetector signals corresponding to the second group of photodetectors after generating the image and based on the image.

In some aspects, the one or more processors are configured to: read the second digital pixel data from the second subset of the plurality of analog photodetector signals corresponding to the second group of photodetectors after reading the first digital pixel data from the first subset of the plurality of analog photodetector signals corresponding to the first group of photodetectors, wherein reading the second digital pixel data is based on storage of the plurality of analog photodetector signals; and generate a second image of the scene using at least the first digital pixel data and the second digital pixel data, wherein a second resolution of the second image is higher than a first resolution of the image. In some aspects, to read the second digital pixel data from the second subset of the plurality of analog photodetector signals corresponding to the second group of photodetectors after reading the first digital pixel data from the first subset of the plurality of analog photodetector signals corresponding to the first group of photodetectors, the one or more processors are configured to read the second digital pixel data from the second subset of the plurality of analog photodetector signals corresponding to the second group of photodetectors after generating the image of the scene. In some aspects, the one or more processors are configured to: identify that the image includes an area with a saliency exceeding a saliency threshold, wherein the one or more processors are configured to read the second digital pixel data from the second subset of the plurality of analog photodetector signals corresponding to the second group of photodetectors in response to identifying that the image includes the area with the saliency exceeding the saliency threshold. In some aspects, the one or more processors are configured to: identify that the image depicts a movement relative to a previous image of the scene captured by the image sensor and exceeding a movement threshold, wherein the one or more processors are configured to read the second digital pixel data from the second subset of the plurality of analog photodetector signals corresponding to the second group of photodetectors in response to identifying that the image depicts the movement relative to the previous image of the scene captured by the image sensor and exceeding the movement threshold.

In some aspects, the one or more processors are configured to: determine whether to read third digital pixel data from a third subset of the plurality of analog photodetector signals corresponding to a third group of photodetectors after generating the second image and based on the second image, wherein the plurality of photodetectors includes the third group of photodetectors that are distinct from the first group of photodetectors and the second group of photodetectors, wherein the image and the second image are generated without the third digital pixel data. In some aspects, the one or more processors are configured to: read third digital pixel data from a third subset of the plurality of analog photodetector signals corresponding to a third group of photodetectors after reading the second digital pixel data from the second subset of the plurality of analog photodetector signals corresponding to the second group of photodetectors, wherein reading the third digital pixel data is based on storage of the plurality of analog photodetector signals, wherein the plurality of photodetectors includes the third group of photodetectors that are distinct from the first group of photodetectors and the second group of photodetectors, wherein the image and the second image are generated without the third digital pixel data; and generate a third image of the scene using at least the first digital pixel data and the second digital pixel data and the third digital pixel data, wherein a third resolution of the third image is higher than the second resolution of the second image.

In some aspects, the one or more processors are configured to: identify that the image includes a depiction of an object, wherein the one or more processors are configured to read the second digital pixel data from the second subset of the plurality of analog photodetector signals corresponding to the second group of photodetectors in response to identifying that the image includes the depiction of the object. In some aspects, the object is a glyph that optically encodes information, wherein the glyph includes at least one of a linear bar code and a two-dimensional code. In some aspects, the object includes at least a portion of a person. In some aspects, the object includes at least a portion of a vehicle. In some aspects, the object includes one or more alphanumeric characters.

In some aspects, the plurality of photodetectors of the image sensor are arranged according to a lattice of blocks that each contain a respective subset of the plurality of photodetectors, wherein each block of the lattice of blocks includes at least one photodetector of the first group of photodetectors and at least one photodetector of the second group of photodetectors. In some aspects, the first group of photodetectors is arranged across the image sensor according to a first pattern, wherein the second group of photodetectors is arranged across the image sensor according to a second pattern, wherein the first pattern and the second pattern correspond to one or more lattices.

In some aspects, the image sensor includes a storage array with a plurality of storage units, wherein, to store each of the plurality of analog photodetector signals corresponding to the charge from each the plurality of photodetectors, the image sensor is configured to store each of the plurality of analog photodetector signals in one of the plurality of storage units of the storage array.

In some aspects, the image sensor is configured to: reset the plurality of photodetectors of the image sensor and the plurality of storage units of the storage array after capturing the image. In some aspects, the one or more processors are configured to: analyze the image using an object detection algorithm, wherein, to reset the plurality of photodetectors of the image sensor and the plurality of storage units of the storage array after capturing the image, the image sensor is configured to reset the plurality of photodetectors of the image sensor and the plurality of storage units of the storage array automatically in response to a lack of a detection of one or more objects in the image by the object detection algorithm. In some aspects, the image sensor is configured to: reset each of the plurality of photodetectors of the image sensor before exposing the plurality of photodetectors to the light from the scene.

In some aspects, the image sensor is configured to: move a reset pointer across a plurality of reset pointer positions from a first side of the image sensor to a second side of the image sensor at a predetermined speed, wherein to reset each of the plurality of photodetectors, the image sensor is configured to reset a first photodetector of the plurality of photodetectors in response to the reset pointer reaching one of the plurality of reset pointer positions at which the first photodetector of the plurality of photodetectors is positioned; and move a readout pointer across a plurality of readout pointer positions from the first side of the image sensor to the second side of the image sensor at the predetermined speed, wherein, to read the first digital pixel data from the first subset of the plurality of analog photodetector signals corresponding to the first group of photodetectors, the image sensor is configured to read third digital pixel data corresponding to a second photodetector of the first group of photodetectors in response to the readout pointer reaching one of the plurality of reset pointer positions at which the second photodetector of the first group of photodetectors is positioned, wherein the predetermined speed is associated with a rolling shutter.

In some aspects, the one or more processors are configured to: output the image. In some aspects, the methods, apparatuses, and computer-readable medium described above further comprise: a display, wherein, to output the image, the one or more processors are configured to display the image using the display. In some aspects, the methods, apparatuses, and computer-readable medium described above further comprise: a communication transceiver, wherein, to output the image, the one or more processors are configured to send the image to a recipient device using the communication transceiver.

In some aspects, the plurality of photodetectors includes a plurality of photodiodes. In some aspects, the plurality of photodetectors of the image sensor includes a plurality of image photodiodes and a plurality of focus photodiodes, wherein the plurality of focus photodiodes are configured for phase detection autofocus (PDAF), wherein the first group of photodetectors includes a first subset of the plurality of image photodiodes, wherein the second group of photodetectors includes a second subset of the plurality of image photodiodes.

In some aspects, the apparatus is, is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyrometers, one or more accelerometers, any combination thereof, and/ or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIG. 3A is a conceptual diagram illustrating an example of an image sensor that includes a plurality of pixels labeled P0 through P63, in accordance with some examples;

FIG. 3B is a conceptual diagram illustrating an example of a storage array that temporarily stores pixel data corresponding to each of the pixels of the image sensor of FIG. 3A, in accordance with some examples;

FIG. 5A is a conceptual diagram illustrating organization of a pixel array of an image sensor into a lattice of twenty-four blocks, and organization of each of the pixels of the pixel array into one of sixteen groups, with each block including one pixel from each group, in accordance with some examples;

DETAILED DESCRIPTION

Figure 1:
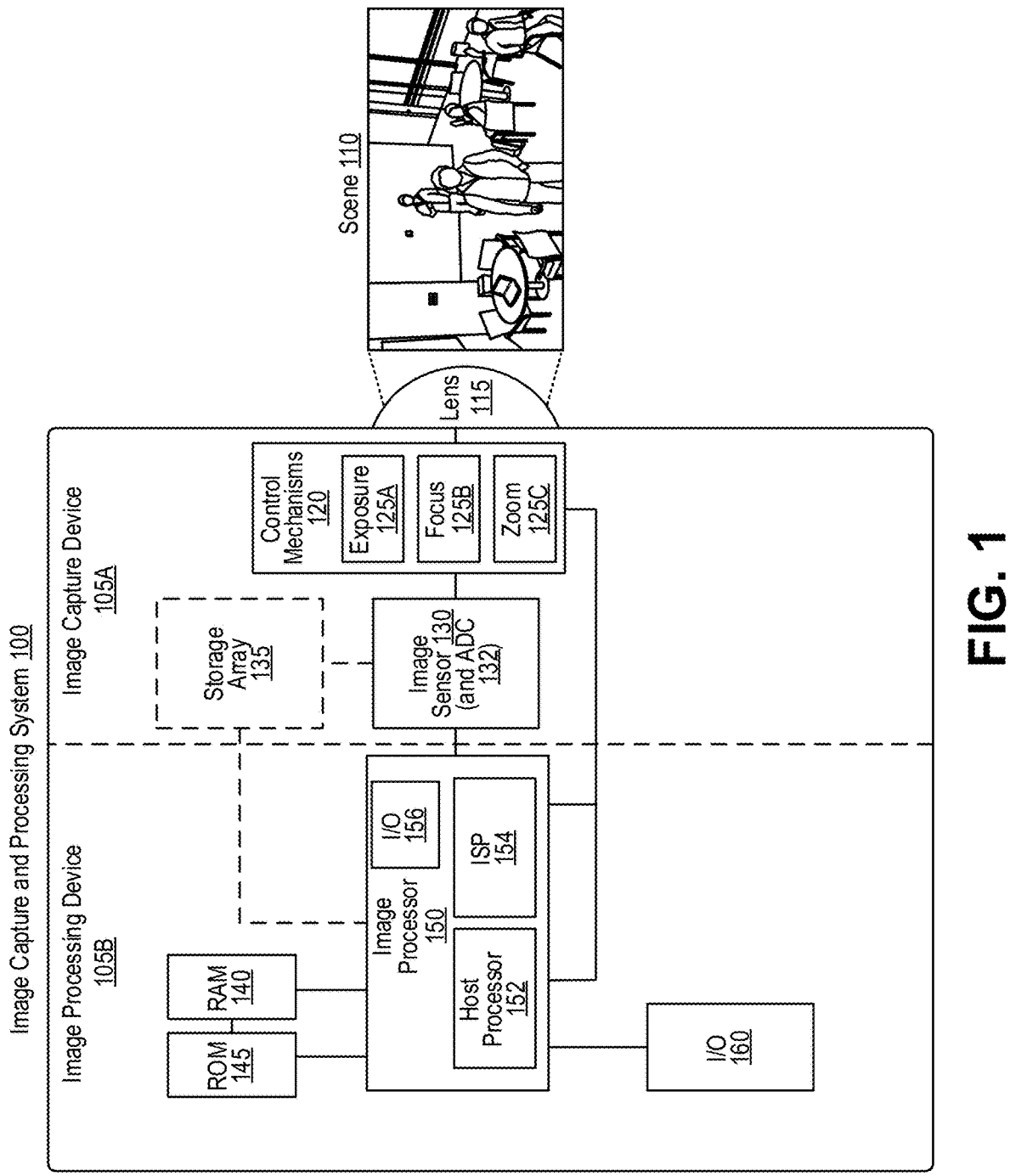
FIG. 1 is a block diagram illustrating an example architecture of an image capture and processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

An image sensor includes an array of photodetectors, such as photodiodes. Each photodetector receives light from a scene and converts the light into a charge based on how much light reaches the photodetector. The photodetector data from a given photodetector can be processed (e.g., via analog gain, analog to digital conversion, digital gain, and/or demosaicing) to provide pixel data for a pixel of an image captured by the image sensor. For color image sensors, different photodetectors can provide pixel data corresponding to different color components (e.g., red, green, or blue) for a given pixel. Readout of the image data from the image sensor can involve operations such as amplification of the charge produced by the photodetectors (e.g., analog gain), conversion of an analog signal associated with the charge into a digital signal using an analog to digital converter (ADC) (e.g., digitization), demosaicing, digital gain, missing pixel correction, bad pixel correction, brightness adjustment, contrast adjustment, saturation adjustment, histogram adjustment, color space conversion, automatic white balance adjustment, automatic black balance adjustment, downsampling, upsampling, additional image processing operations, or a combination thereof. Performing readout for every photodetector of the image sensor can result in a significant impact on an imaging device in terms of amount of power draw, amount of bandwidth usage, amount of heat generated, and/or amount of usage of computational resources (e.g., for ISP operations and/or image processing operations). Resetting a photodetector refers to clearing the charge of the photodetector before the photodetector receives and detects light for capture of a new image. Resetting the image sensor can refer to resetting at least a subset of the photodetectors of the image sensor. Resetting the image sensor can refer to resetting all of the photodetectors of the image sensor.

A portable electronic device is generally powered by a power storage unit, such as a battery, that is part of the portable electronic device. To remain lightweight and small—and thus portable—a portable electronic device generally includes a relatively small battery. Because of portable electronic devices have limited battery life, it is beneficial to reduce power usage of operations performed by portable electronic devices when possible. Some portable electronic devices thus also have less processing power than devices that connect to a power outlet, to reduce power draw and increase battery life. Some portable electronic devices include cameras. Different resolutions of images may be useful for different use cases. For some use cases, images having a first resolution may be sufficient. For other uses cases, an image having a second resolution (e.g., higher than the first resolution) may be beneficial. In some examples, readout of image data at the first resolution may draw less battery power than readout of image data at the second resolution, or vice versa.

Electronic devices that draw and use electric power from a power source can generate heat from routing the electric power to components that use the electric power to perform action(s), and from the components using the electric power to perform the action(s). Electronic devices can include heat dissipation components that aid in heat dissipation, such as heat sinks, fans, liquid coolers, tubes that transport fluids (e.g., liquids and/or gases), channels that transport fluids (e.g., liquids and/or gases), and the like. To remain lightweight and small—and thus portable—a portable electronic device generally includes very little space for heat dissipation components. Thus, many portable electronic devices include little or no heat dissipation components. Portable electronic devices that include heat dissipation components are generally limited in the types and sizes of heat dissipation components that the portable electronic devices can include, which can also limit the effectiveness of the heat dissipation components used in such portable electronic devices. If heat in parts of an electronic device becomes too high (e.g., above a threshold temperature or heat level), the electronic device can become modified and/or defective. For instance, at high heat levels, certain components, or connections between components, can melt, deform, transform, change state, become brittle, change shape, break, or otherwise become modified. Additionally, portable electronic devices are often held by a user in the user's hand, or worn by the user on the user's body (e.g., as wearable devices), or stored by the user in the user's pocket adjacent to the user's body. If heat in parts of a portable electronic device becomes too high (e.g., above a threshold temperature or heat level), the portable electronic device can burn the user, hurt the user, and/or cause discomfort to the user. Because some portable electronic devices can have limited heat dissipation capabilities, it is beneficial to reduce heat generation of operations performed by portable electronic devices when possible. Some portable electronic devices have less processing power than devices that connect to a power outlet, to reduce heat generation, to reduce the heat dissipation needed to maintain a threshold temperature or threshold heat level, to reduce the amount of heat that any heat dissipation component(s) are to dissipate to maintain a threshold temperature or threshold heat level, or a combination thereof. Some portable electronic devices include cameras. Different resolutions of images may be useful for different use cases. For some use cases, images having a first resolution may be sufficient. For other uses cases, an image having a second resolution (e.g., higher than the first resolution) may be beneficial. In some examples, readout of image data at the first resolution may generate less heat (and thus reduce heat dissipation needed to maintain a threshold temperature or a threshold heat level) than readout of image data at the second resolution, or vice versa.

Rolling shutter cameras can capture a still image or each frame of a video by scanning across a scene rapidly from one side of the image sensor to another side of the image sensor. Typically, a rolling shutter camera scans across the scene vertically, for instance from the top of the image sensor to the bottom of the image sensor. In some cases, rolling shutters may scan across the scene horizontally instead. In some examples, using a rolling shutter, different parts of the image of the scene are recorded at different instants in time. In some examples, using a rolling shutter, not all parts of the image of the scene are recorded at exactly the same instant. An image captured using a rolling shutter can depict different parts of the scene as they appeared at slightly different times (e.g., instants in time) in the scene. A rolling shutter camera can reset its photodetectors line-by-line (e.g., row by row) from one side of the image sensor to the other side of the image sensor. A rolling shutter can read out pixel data from its photodetectors line-by-line (e.g., row by row) from one side of the image sensor to the other side of the image sensor after resetting those photodetectors.

Global shutter cameras can be used capture a still image or each frame of a video by scanning the entire area of the image simultaneously. Global shutter cameras can include a storage array of storage units, such as storage diodes, that store photodetector data from each photodetector of the image sensor, and thus for each pixel of a full-resolution image that the image sensor can produce. Global shutter cameras can stop exposure at the photodetector array and can move the accumulated charge from the photodetector array to the storage array. The storage units of the storage array may be reset after a period of time, for example just before another image is to be captured by the global shutter camera. In some examples, the storage array can store the photodetector data as analog photodetector data (e.g., the charge at an individual photodetector before or after amplification).

Systems and techniques are described herein for controlling whether a camera performs a first readout from a first subset of pixels of its image sensor to produce an image with a first resolution at a first power draw, or whether the camera performs a second readout from at least a second subset of pixels of its image sensor to produce an image with a second resolution at a second power draw. An imaging system can include an image sensor with an array of photodetectors, such as photodiodes. The photodetectors of the photodetector array of the image sensor can be grouped so that each photodetector is in one of a set of multiple distinct groups. For instance, some of the photodetectors can be in a first group, some of the photodetectors can be in a second group that is distinct from the first group, and so forth. The photodetectors of the photodetector array can be grouped into the different groups based on a predetermined pattern. For instance, the photodetectors of the photodetector array can be grouped into a lattice of blocks that each have predetermined dimensions (e.g., n photodetectors in width by m photodetectors in height) and that each include one or more photodetectors from each group, in some cases arranged according to a predetermined order within the block. In this example, n and m are both be integer values that are each greater than or equal to one, and can be equal to one another or can be different than one another. For instance, each block of photodetectors can include a photodetector in the first group, followed by a photodetector in the second group, and so forth. The imaging system can use a global shutter or a rolling shutter.

The imaging system can reset the photodetectors in the photodetector array of its image sensor line-by-line (e.g., rolling shutter), globally (e.g., global shutter), group-by-group, or a combination thereof. The imaging system can expose its image sensor, and the photodetector array on it, to light from a scene. Each of the photodetectors are configured to, and can, convert the light from the scene into a charge in response to exposure to the light from the scene. The imaging system can receive and/or store analog photodetector signals corresponding to the charge from each of the photodetectors. In some examples, the imaging system uses a global shutter, and can store each of the analog photodetector signals in one of the storage units of a storage array. In some examples, the imaging system uses a rolling shutter, and can store each of the analog photodetector signals at the photodetectors until readout from the photodetectors.

The imaging system can read out first digital pixel data from a first subset of the analog photodetector signals corresponding to the first group of photodetectors without reading second digital pixel data from a second subset of the analog photodetector signals corresponding to the second group of photodetectors (and/or without reading additional digital pixel data from an additional subset of the analog photodetector signals corresponding to an additional group of photodetectors, such as a third or fourth group of photodetectors). The imaging device only reading out digital pixel data from a subset of its groups of photodetectors can be referred to as sparse readout. Sparse readout can also be referred to as a low-power mode. Readout can include amplification of the analog photodetector signals (e.g., analog gain). Readout can include conversion of the analog photodetector signals into digital signals (e.g, via an ADC). In some examples, the digital signals from the ADC are the first digital pixel data. In some examples, the digital signals from the ADC are processed further via one or more image processing operations (e.g., digital gain, demosaicing, pixel interpolation, missing pixel correction, bad pixel correction, brightness adjustment, contrast adjustment, saturation adjustment, histogram adjustment, color space conversion, automatic white balance adjustment, automatic black balance adjustment, downsampling, and upsampling) to become the first digital pixel data. The imaging system can capture a low-resolution image of the scene at least in part by combining the first digital pixel data into the low-resolution image. In some examples, the imaging system can reset the photodetectors of the image sensor after capturing the low-resolution image, for instance before capturing a subsequent image.

In some examples, the imaging system can determine that a high-resolution image may be desirable, for instance based on a user interface input by a user, based on the imaging device determining that the low-resolution image includes a depiction of an object such as a barcode or a quick response (QR) code that may be easier to scan and/or interpret in a high-resolution image, determining that the low-resolution image includes a depiction of an object such as person's face that that may be easier to recognize using a high-resolution image, determining that the low-resolution image includes a depiction of alphanumeric characters that that may be easier to parse using a high-resolution image, based on the imaging device determining that the low-resolution image includes an image area (e.g., having at least a threshold size) having a saliency exceeding a saliency threshold, based on the imaging device determining that the low-resolution image includes a movement (e.g., exceeding a movement threshold) compared to a previous image, or a combination thereof. The imaging device can read the second digital pixel data from the second subset of the analog photodetector signals corresponding to the second group of photodetectors from the stored analog photodetector signals after reading the first digital pixel data. The imaging device can capture a high-resolution image of the scene at least in part by combining both the first digital pixel data and the second digital pixel data into the high-resolution image. The high-resolution image has a higher resolution than the low-resolution image. The imaging device reading out digital pixel data from more of its groups of photodetectors than in the sparse readout can be referred to as dense readout. The imaging device reading out digital pixel data from all of its groups of photodetectors can be referred to as full readout. Dense readout can include full readout. Dense readout can also be referred to as a high-power mode.

In some examples, the imaging device can read the second digital pixel data from the second subset of the analog photodetector signals corresponding to the second group of photodetectors from the stored analog photodetector signals before the photodetectors and/or the storage units of the storage array are reset. Thus, the imaging device can decide, on the fly, to switch from the low-resolution image readout to the high-resolution image readout before capture of the next frame even begins. This is a technical improvement over traditional cameras in which a change in settings is generally not applied until several frames after the request for the change is made. The imaging device provides technical improvements such as reduced power draw, reduced bandwidth usage, and/or reduced computational resource usage. These improvements are brought about due to use of sparse readout when a low-resolution image is sufficient and use of dense readout (e.g., full readout) when requested (e.g., by a user or by the imaging device itself) for operations in which a high-resolution image is beneficial. In some examples, sparse readout can be used for cameras that are left on and recording for long periods of time, such as always-on (AON) cameras, and/or for persistent imaging applications to reduce the power usage. The imaging system may switch from sparse readout to dense readout as requested (e.g., by a user or by the imaging device itself) for operations in which a high-resolution image is beneficial.

Various aspects of the application will be described with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodetector (e.g., photodetector) of the image sensor 130, which each bend the light received from the lens 115 toward the corresponding photodetector before the light reaches the photodetector. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodetectors, such as photodiodes or other photosensitive elements. Each photodetector measures an amount of light that eventually corresponds to a particular pixel in the image produced by the image sensor 130. In some cases, different photodetectors may be covered by different color filters, and may thus measure light matching the color of the filter covering the photodetector. For instance, Bayer color filters include red color filters, blue color filters, and green color filters, with each pixel of the image generated based on red light data from at least one photodetector covered in a red color filter, blue light data from at least one photodetector covered in a blue color filter, and green light data from at least one photodetector covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodetectors throughout the pixel array (in some cases vertically stacked). The different photodetectors throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodetectors, or portions of certain photodetectors, at certain times and/or from certain angles, which may be used for phase detection autofocus (PDAF). The image sensor 130 may also include an analog gain amplifier to amplify the analog signals output by the photodetectors and/or an analog to digital converter (ADC) 132 to convert the analog signals output of the photodetectors (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

In some examples, the arrays of photodetectors of the image sensor 130 can include focus photodetectors and image photodetectors. Both image photodetectors and focus photodetectors can receive light from a scene that is being photographed. Photodiode data from the image photodetectors can be used to capture an image of the scene as described herein. Photodiode data from the focus photodetectors can be used for PDAF. Both the image photodetectors and the focus photodetectors can be under micro lenses.

In some examples, a microlens over a focus photodiode can be partially masked with an opaque mask or a reflective mask, so that one side of the microlens passes light from the scene to the focus photodiode, while another side of the microlens blocks light from scene from reaching the focus photodiode. This masking may limit the light reaching the focus photodiode to light approaching the focus photodiode from a specific range of angles that may be useful for PDAF. In some examples, a microlens may be split between two or more focus photodiodes, so that the light reaching each focus photodiode is limited to light that passes through a specific portion of the microlens, and thus light approaching the photodiode from a specific range of angles that may be useful for PDAF. In some examples, image data from the focus photodiodes of the image sensor 130 may be discarded by the image capture and processing system 100. The ISP 154, the host processor 152, and/or the image processor 150 can treat pixel data from the focus photodiodes as missing pixels and or bad pixels that the ISP 154, the host processor 152, and/or the image processor 150 can correct using missing pixel correction, bad pixel correction, and/or interpolation. In some examples, image data from the focus photodiodes of the image sensor 130 can be used by the image capture and processing system 100 in generating the captured image, for instance with some corrections based on neighboring pixels (e.g., using missing pixel correction, bad pixel correction, and/or interpolation). Pixels corresponding to image photodiodes can be referred to as image pixels. Pixels corresponding to focus photodiodes can be referred to as focus pixels.

The image processor 150 may include one or more processors, such as one or more image signal processors (ISPs) (including ISP 154), one or more host processors (including host processor 152), and/or one or more of any other type of processor 1310 discussed with respect to the computing system 1300. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

In some examples, image capture and processing system 100 can include a storage array 135 that includes an array of storage units. In some examples, the storage units may be storage diodes, memory diodes, memory units, or a combination thereof. The storage array 135 may store photodetector data from the photodetector array of the image sensor 130 before photodetector data is converted to digital by the ADC 132. In some examples, each storage unit of the storage array 135 stores analog photodiode data (e.g., the charge or a signal indicative of the charge) of a different one of the photodetectors of the photodetector array of the image sensor 130, for instance as illustrated with respect to the image sensor 310 of FIG. 3A and the corresponding storage array 320 of FIG. 3B. The storage array 135 can provide the stored analog photodiode data to the ADC 132 and/or to the image processor 150 (e.g., the ISP 154 and/or the host processor 152) for readout, for example as illustrated with respect to the imaging system of FIG. 2.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140 and/or 1320, read-only memory (ROM) 145 and/or 1325, a cache, a storage unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1335, any other input devices 1345, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
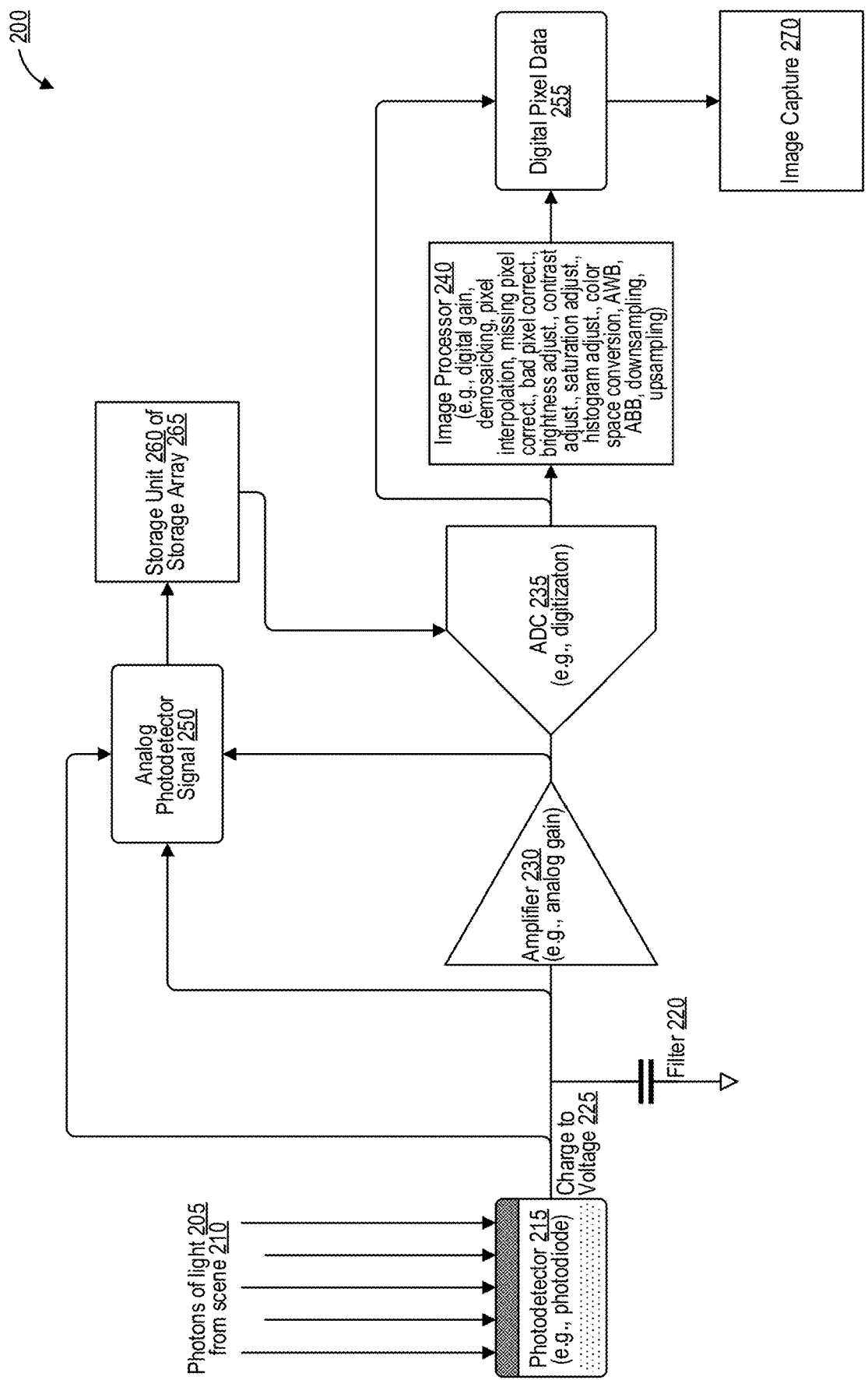
FIG. 2 is a block diagram illustrating an example architecture of an imaging system that performs a process for image capture at least in part by storing an analog photodetector signal and reading out digital pixel data from a photodetector, in accordance with some examples.

FIG. 2 is a block diagram illustrating an example architecture of an imaging system performing a process 200 for image capture at least in part by storing an analog photodetector signal 250 and reading out digital pixel data 255 from a photodetector 215. The image capture system includes a photodetector 215, such as a photodiode or a phototransistor. The photodetector 215 may be a photodetector of a photodetector array of an image sensor, such as the image sensor 130 or the image sensor 310. The photodetector 215 may receive photons of light 205 from a scene 210. The scene 110 may be an example of the scene 210. The light 205 that reaches the photodetector 215 may be referred to as incident light. The photodetector 215 can convert the light 205 into a charge. The charge may form a voltage 225 and may flow as an analog photodetector signal (e.g., as current). In some examples, a filter 220 (e.g., low-pass filter, high-pass filter, bandpass filter), for instance formed using a capacitor to ground as illustrated in the imaging system of FIG. 2, can filter out noise from the analog photodetector signal from the photodetector 215. In some examples, the filter 220 can be omitted. The analog photodetector signal can flow to an amplifier 230 that can amplify the analog photodetector signal and thus provide analog gain to the analog photodetector signal. The analog photodetector signal, now amplified, can flow from the amplifier 230 to the analog to digital converter (ADC) 235. In some examples (not illustrated), another filter (like filter 220 but distinct from filter 220) can filter the analog photodetector signal on its way from the amplifier 230 to the ADC 235. The ADC 235 can be an example of the ADC 132. The ADC 235 convert the analog photodetector signal into a digital pixel data. In some examples, an image processor 240 can process and/or modify the digital pixel data using one or more image processing operations, in some cases based on other digital pixel data from the ADC 235 corresponding to other photodiodes distinct from the photodiode 215 (but from the same image sensor). For instance, the image processor 240 can process and/or modify the digital pixel data at least in part by adjusting digital gain, demosaicing, pixel interpolation, performing missing pixel correction, performing bad pixel correction, adjusting brightness, adjusting contrast, adjusting saturation adjust, adjusting a histogram, performing color space conversion, performing automatic white balance (AWB), performing automatic black balance (ABB), downsampling, upsampling, or a combination thereof. The image processor 240 can be an example of an ISP 154, a host processor 152, an image processor 150, an image processing device 105B, or a combination thereof.

The term digital pixel data 255 can refer to digital pixel data that is generated by the ADC 235 without (yet) being processed by the image processor 240, or to the digital pixel data that is generated by the ADC 235 and that is also processed and/or modified by the image processor 240. The digital pixel data 255 can be combined with digital pixel data corresponding to other photodiodes and/or pixels of the image sensor to perform image capture 270 to capture an image.

The analog photodetector signal 250 can refer to an analog photodetector signal that is output by the photodetector 215 but not yet filtered by the filter 220 or amplified by the amplifier 230, an analog photodetector signal that is filtered by the filter 220 but that is not yet amplified by the amplifier 230, an analog photodetector signal that is amplified by the amplifier 230, an analog photodetector signal that is filtered by a second filter (not pictured) after being amplified by the amplifier 230, or a combination thereof. The analog photodetector signal 250 can be stored in a storage unit 260 of a storage array 265. The storage array 265 can be an example of the storage array 135 and/or the storage array 320. The storage unit 260 can be an example of one of the storage units S0-S63 of FIG. 3B. The storage unit 260 can be a storage diode, a memory diode, a memory unit, or a combination thereof.

FIG. 3A is a conceptual diagram illustrating an example of an image sensor 310 that includes a plurality of pixels labeled P0 through P63. The image sensor 310 is 9 pixels wide and 9 pixels in height. The pixels are numbered sequentially from P0 to P63 from left to right within each row, starting from the top row and counting up toward the bottom row. The image sensor 310 may be an example of the image sensor 130. Each of the individual pixels (P0-P63) of the image sensor 310 may include one or more photodetectors, such as the photodetector 215. In some examples, each of the elements labeled P0-P63 may be individual photodetectors, such as photodetector 215. In some examples, the pixels P0-P63 of FIG. 3A are all image pixels. In some examples, the photodetectors P0-P63 of FIG. 3A are all image photodetectors. In some examples, the pixels P0-P63 of FIG. 3A include image pixels and focus pixels. In some examples, the photodetectors P0-P63 of FIG. 3A include image photodetectors and focus photodetectors.

FIG. 3B is a conceptual diagram illustrating an example of a storage array 320 that temporarily stores pixel data corresponding to each of the pixels of the image sensor 310 of FIG. 3A. The storage array 320 includes a plurality of storage units labeled S0 through S63. The storage array 320, like the image sensor 310, is 9 cells (pixels) wide and 9 cells (pixels) in height. The cells are numbered sequentially from S0 to S63 from left to right within each row, starting from the top row and counting up toward the bottom row.

Each pixel dataset in each cell of the cells of the storage array 320 corresponds to a pixel in the image sensor 310. For example, the pixel dataset stored in the cell S0 in the storage array 320 corresponds to the pixel P0 in the image sensor 310, the pixel dataset stored in the cell Si in the storage array 320 corresponds to the pixel P1 in the image sensor 310, and so forth. A pixel dataset in the storage array 320 may represent one or more analog pixel signals and/or one or more analog photodetector signals corresponding to one or more photodetectors (e.g., photodiodes) of the image sensor that represent the pixel dataset for the pixel in question. In some examples, each pixel Pa of the pixels P0-P63 of the image sensor 310 includes a set of b photodetectors, and the corresponding cell Ma of the cells S0-S63 of the of the storage array 320 includes a set of b memory diodes that correspond to and store the pixel data from the set of b photodetectors. In this example, a can be any integer between zero and sixty-three (inclusive), and b can be any integer greater than or equal to one.

Figure 4A:
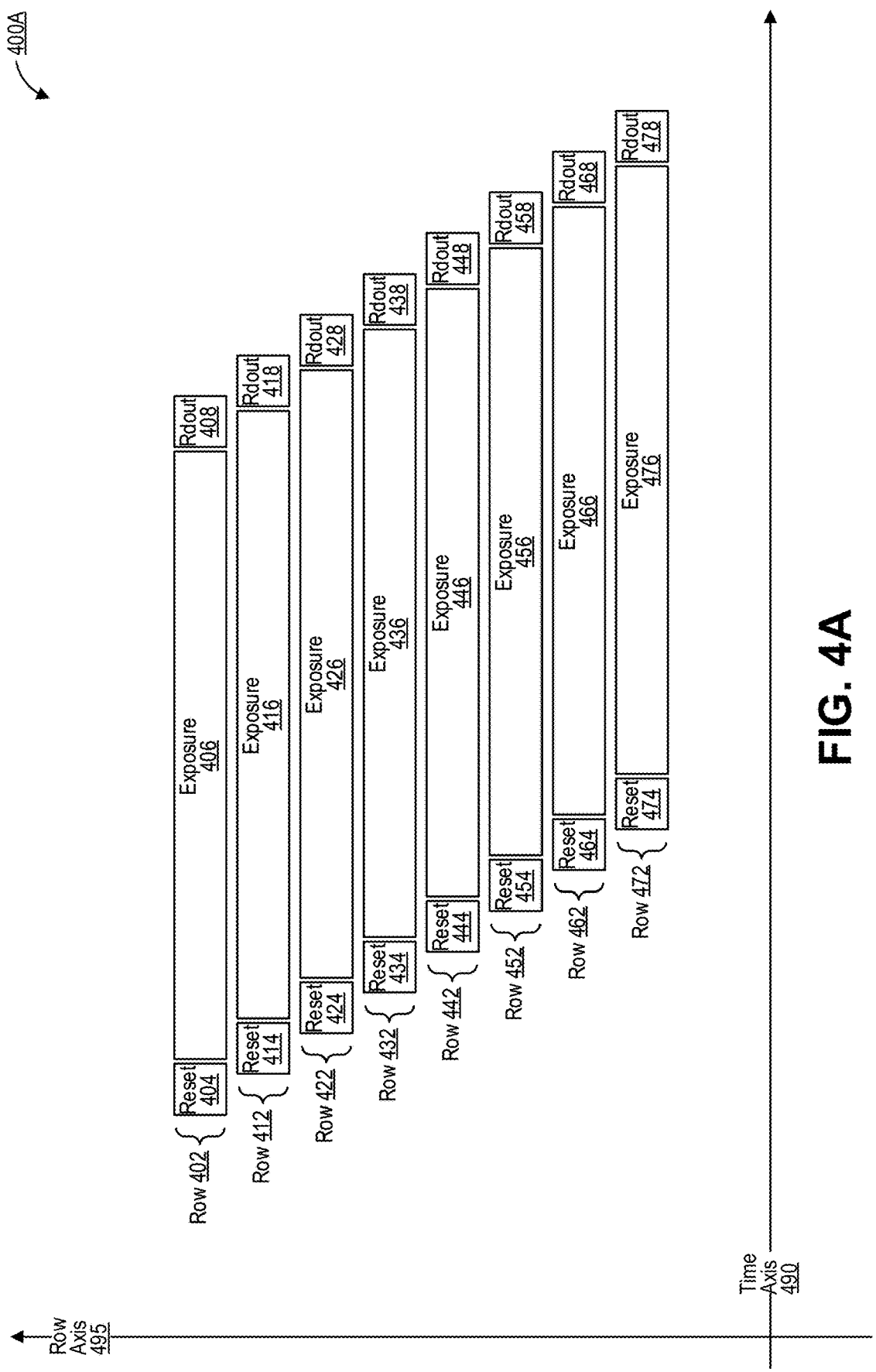
FIG. 4A is a conceptual diagram illustrating capture of image data via an image sensor of an imaging system using a rolling shutter, in accordance with some examples.

FIG. 4A is a conceptual diagram 400A illustrating capture of image data via an image sensor of an imaging system using a rolling shutter. The capture of different portions of the image data by the imaging system is illustrated relative to a horizontal time axis 490 along which time flows from left to right, and relative to a vertical row axis 495 indicative of different rows of the image sensor. The time axis 490 may be referred to as a timeline. Different rows of the image sensor are depicted along different horizontal lines perpendicular to the vertical row axis 495 and intersecting the vertical row axis 495 at different points. Examples of image sensor may include the image sensor 310 and/or the image sensor 130. The image sensor may include an array of photodetectors and/or pixels arranged in rows. In some examples, the rolling shutter may be part of the control mechanisms 120. In some examples, the rolling shutter may be an electronic rolling shutter that electronically controls when certain photodiodes and/or pixels (and/or rows thereof) are reset, exposed, and/or read out. In some examples, the rolling shutter may be a mechanical rolling shutter that physically blocks the image sensor at times and physically uncovers the image sensor one row at a time (e.g., using a rolling or rotating motion of a physical shutter).

Each row illustrated includes a reset block. The length of the reset block along the time axis 490 represents a span of time during which the row is being reset by the imaging system. Each row illustrated includes an exposure block after the reset block. The length of the exposure block along the time axis 490 represents a span of time during which the row (e.g., photodiodes and/or pixels within the row) is being exposed to light from the scene by the imaging system. Each row illustrated includes a readout block after the exposure block. The length of the readout block along the time axis 490 represents a span of time during which image data is being read out from the row (e.g., photodiodes and/or pixels within the row) by the imaging system.

Eight rows are illustrated, including a row 402, a row 412, a row 422, a row 432, a row 442, a row 452, a row 462, and a row 472. The reset block 404 for the row 402 is the first operation performed along the time axis 490. The reset block 414 for the row 412 begins after the reset block 404 for the row 402. The reset block 424 for the row 422 begins after the reset block 414 for the row 412. This pattern continues on, with each consecutive reset block along the row axis 495 beginning after the reset block in the row above it. This pattern applies to reset block 404, reset block 414, reset block 424, reset block 434, reset block 444, reset block 454, reset block 464, and reset block 474. Some of the durations of time corresponding to the different reset blocks may overlap.

Similarly, each consecutive exposure block along the row axis 495 begins after the exposure block in the row above it. This pattern applies to exposure block 406, exposure block 416, exposure block 426, exposure block 436, exposure block 446, exposure block 456, exposure block 466, and exposure block 476. Some of the durations of time corresponding to the different exposure blocks may overlap. Similarly, each consecutive readout block along the row axis 495 begins after the readout block in the row above it. This pattern applies to readout block 408, readout block 418, readout block 428, readout block 438, readout block 448, readout block 458, readout block 468, and readout block 478. Some of the durations of time corresponding to the different readout blocks may overlap. The exposure blocks can include operations associated with integration of the data associated with the rows. In some examples, reset, integration, and/or readout operations that scan across the image sensor in raster scan order.

Figure 4B:
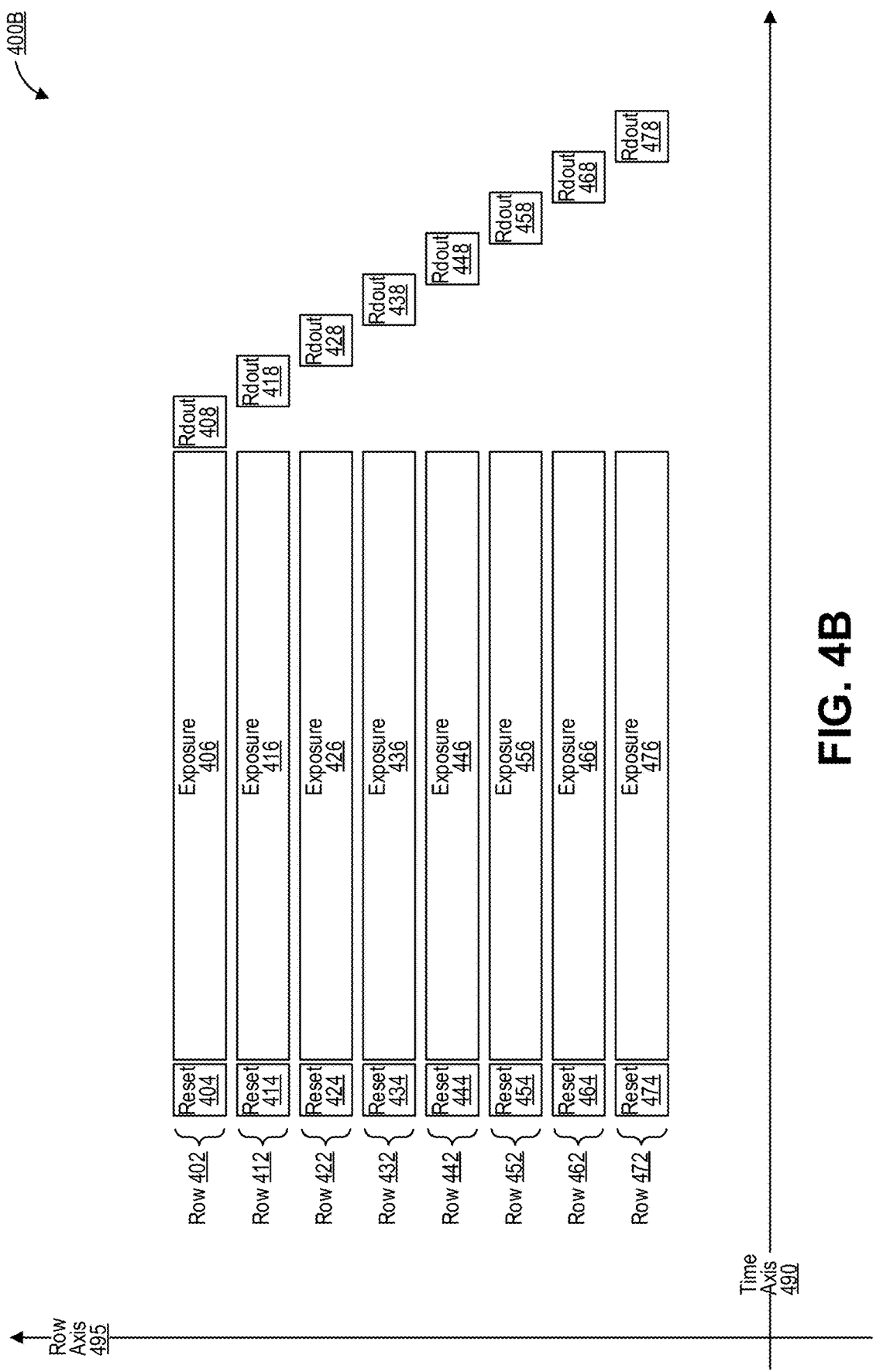
FIG. 4B is a conceptual diagram illustrating capture of image data via an image sensor of an imaging system using a global shutter, in accordance with some examples.

FIG. 4B is a conceptual diagram 400B illustrating capture of image data via an image sensor of an imaging system using a global shutter. The capture of image data using the imaging system with the global shutter of FIG. 4B is illustrated along the same time axis 490 and row axis 495 of FIG. 4A. The capture of image data using the imaging system with the global shutter of FIG. 4B is illustrated using the same eight rows and sets of reset blocks, exposure blocks, and readout blocks as FIG. 4A, but arranged in a different manner made possible by a storage array. An example of the storage array includes storage array 320. In FIG. 4B, the reset blocks (e.g., reset block 404, reset block 414, reset block 424, reset block 434, reset block 444, reset block 454, reset block 464, and/or reset block 474) can begin at approximately the same time. In FIG. 4B, the reset blocks can end at approximately the same time. In FIG. 4B, the durations of time along the time axis 490 that each of the reset blocks span can be approximately matching, contemporaneous, and/or simultaneous.

As illustrated in FIG. 4B, readout for multiple rows of an image sensor can amount to a significant amount of the time used in capturing image data using a global shutter. Thus, skipping readout for certain rows, pixels, and/or photodiodes can result in faster and more efficient capture of image data.

It should be understood that an imaging system with a global shutter may delay readout further in time after exposure than is illustrated in FIG. 4B, since the charges from the photodiodes can be stored in the storage array for a period of time. In some examples, readout of certain rows, pixels, and/or photodiodes may occur more than once (e.g., two or more times) after exposure and while the charges from the photodiodes are still stored in the storage array. For instance, in the context of FIG. 7, capture of the image 735 with the first resolution 727 and capture of the image 755 with the second resolution 757 may involve readout of certain rows, pixels, and/or photodiodes twice after the reset 732 (and/or the integration 730) and before the reset 742. In some imaging systems with global shutters, certain rows (e.g., two or more adjacent rows) may be read out simultaneously and/or contemporaneously.

Figure 5A:
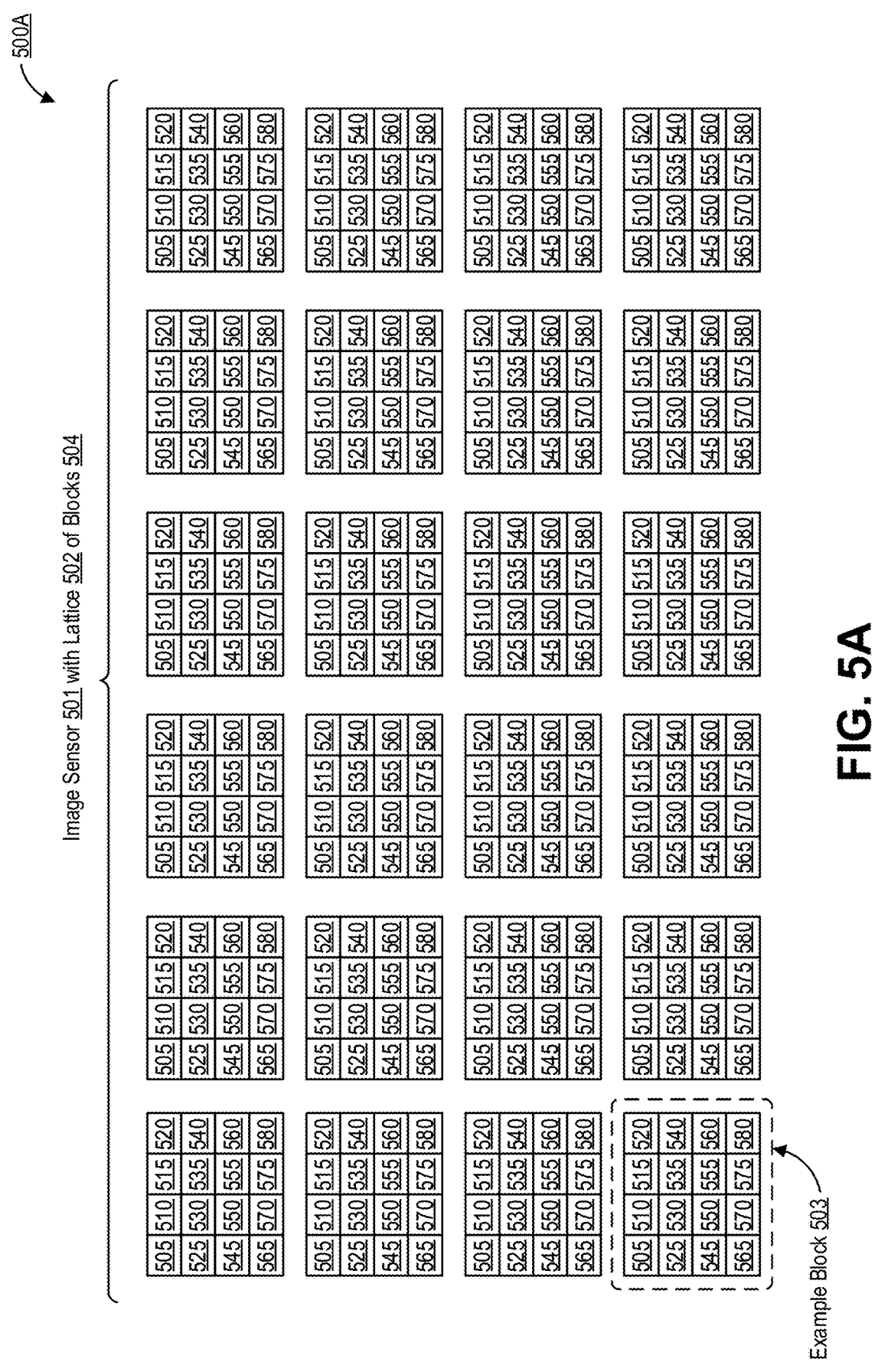

FIG. 5A is a conceptual diagram 500A illustrating organization of a pixel array of an image sensor 501 into a lattice 502 of twenty-four blocks 504, and organization of each of the pixels of the pixel array into one of sixteen groups (505 through 580), with each block including one pixel from each group. The pixel array of the image sensor 501 is twenty-four pixels wide by sixteen pixels in height. Each of the blocks 504 is four pixels wide by four pixels in height. The pixel array of the image sensor 501 is thus six blocks wide by four blocks in height.

The blocks 504 are illustrated spaced apart, with gaps in between one another, to highlight the lattice 502 organization. It should be understood that the blocks 504 may be adjacent to one another on the image sensor 501 itself, without these gaps. An example block 503 of the blocks 504 is outlined in a dashed rounded rectangle. Each of the blocks 504 includes sixteen pixels total. Each of the blocks 504 includes one pixel of each of the sixteen groups (505 through 580). Specifically, each of the blocks 504 includes a pixel in a first group 505, a pixel in a second group 510, a pixel in a third group 515, a pixel in the fourth group 520, a pixel in a fifth group 525, a pixel in a sixth group 530, a pixel in a seventh group 535, a pixel in an eighth group 540, a pixel in a ninth group 545, a pixel in a tenth group 550, a pixel in an eleventh group 555, a pixel in a twelfth group 560, a pixel in a thirteenth group 565, a pixel in a fourteenth group 570, a pixel in a fifteenth group 575, and a pixel in a sixteenth group 580. Each of the pixels in the pixel array is labeled with the group to which it belongs in FIGS. 5A-5C and 6A-6B. Within each block, the grouping of the pixels ascends from the top row down, and from left to right within each row. Thus, the top-left pixel in each block is in the first group 505, and the bottom-right pixel in each block is in the sixteenth group 580.

Figure 5B:
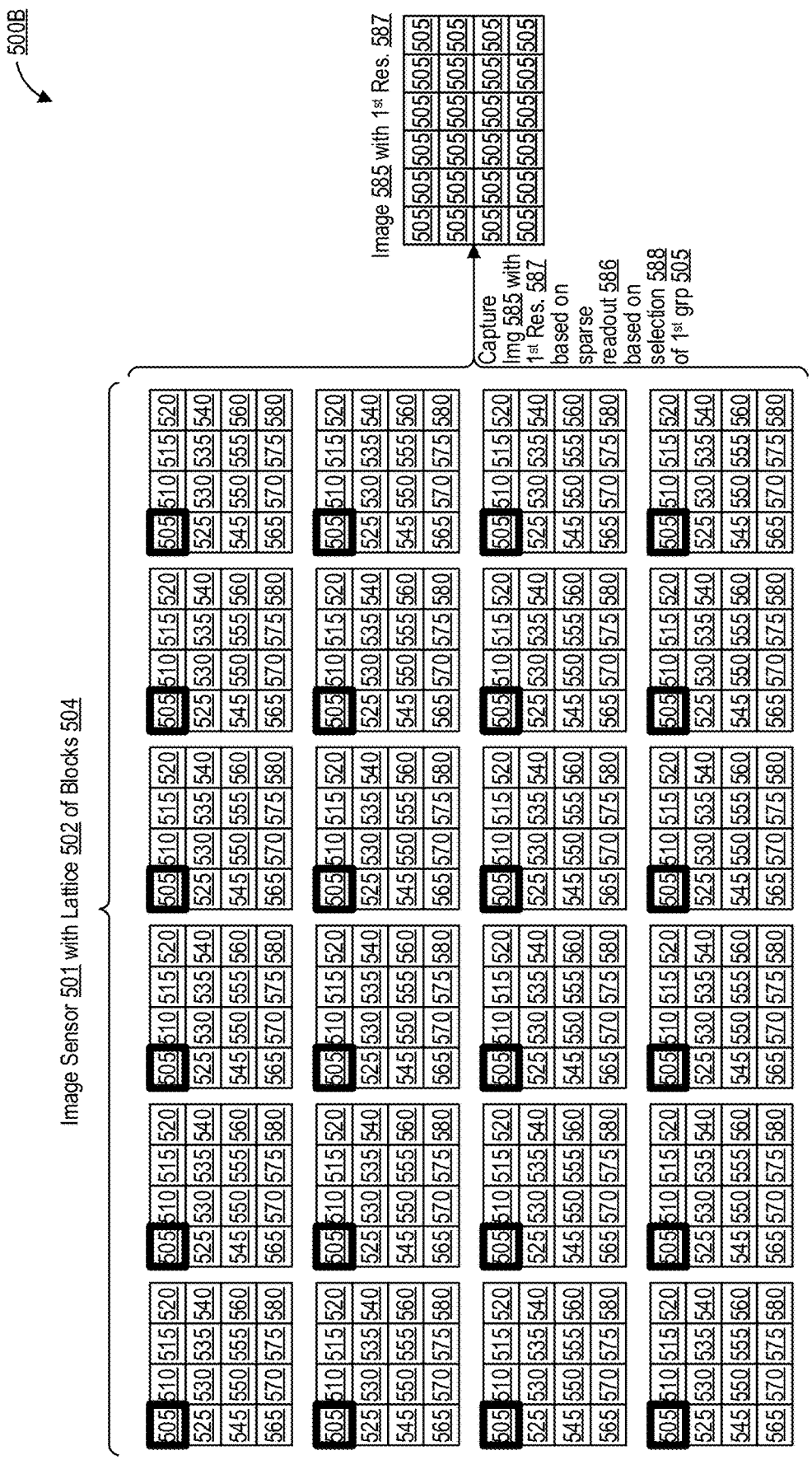
FIG. 5B is a conceptual diagram illustrating capture of an image with a first resolution by performing sparse readout of the image sensor based on reading out only pixels in a first group of the sixteen groups, in accordance with some examples.

FIG. 5B is a conceptual diagram 500B illustrating capture of an image 585 with a first resolution 587 by performing sparse readout 586 of the image sensor 501 based on reading out only pixels in a first group 505 of the sixteen groups (505 through 580). A selection 588 is made to select the first group 505. The selection 588 may be made based on a user interface input received from a user interface. The selection 588 may be made automatically by the imaging system. All of the pixels belonging to the first group 505 are highlighted in FIG. 5B using a thick black outline. The imaging system captures the image 585 with the first resolution 587 by performing a sparse readout 586 of the pixels belonging to the first group 505, without performing readout of any other pixels belonging to any of the other groups (510 through 580), and by combining pixel data from all of the pixels belonging to the first group 505 together into the image 585 with the first resolution 587. Sparse readout, as in the sparse readout 586 of FIG. 5B or the sparse readout 592 of FIG. 5C, allows for capture of an image at a given resolution that is lower than a full resolution that the image sensor 501 is capable of, without downscaling or binning, and with reductions in power draw, bandwidth usage, and computational resource usage. The pixels in the first group 505 can include image pixels, focus pixels, or a combination thereof. The pixels in the other groups (510 through 580) can include image pixels, focus pixels, or a combination thereof. The first resolution 587 is lower than a full resolution that the image sensor 501 is capable of, assuming the full resolution that the image sensor 501 is capable of uses pixels from all sixteen groups (505 through 580).

Figure 5C:
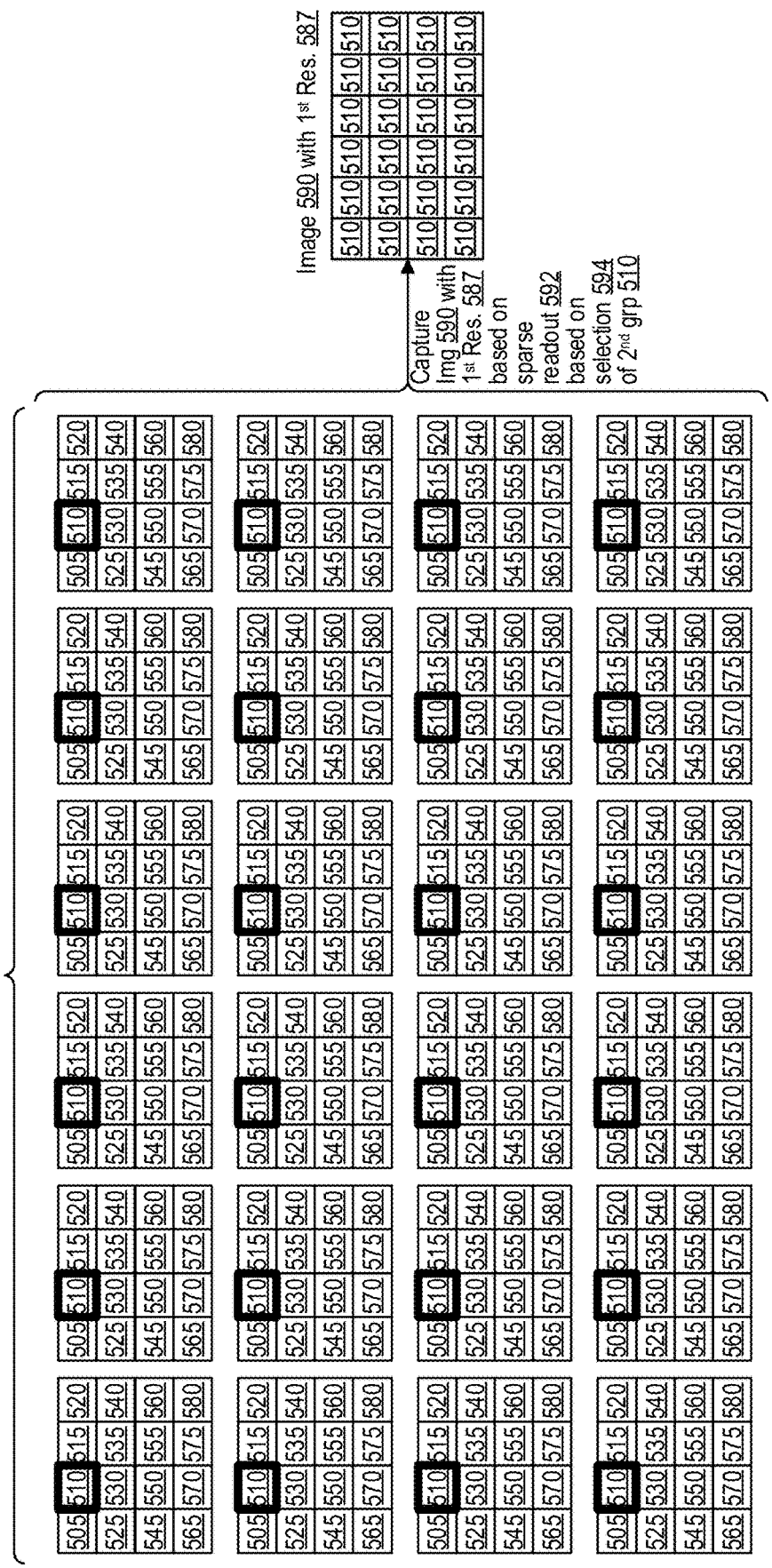
FIG. 5C is a conceptual diagram illustrating capture of an image with a low resolution by performing sparse readout of the image sensor based on reading out only pixels in a second group of the sixteen groups, in accordance with some examples.

FIG. 5C is a conceptual diagram 500C illustrating capture of an image 590 with the first resolution 587 by performing sparse readout 592 of the image sensor based on reading out only pixels in a second group 510 of the sixteen groups. A selection 594 is made to select the second group 510. The selection 594 may be made based on a user interface input received from a user interface. The selection 594 may be made automatically by the imaging system. All of the pixels belonging to the second group 510 are highlighted in FIG. 5C using a thick black outline. The imaging system captures the image 590 with the first resolution 587 by performing a sparse readout 592 of the pixels belonging to the second group 510, without performing readout of any other pixels belonging to any of the other groups (505 and 515 through 580), and by combining pixel data from all of the pixels belonging to the second group 510 together into the image 590 with the first resolution 587. The pixels in the second group 510 can include image pixels, focus pixels, or a combination thereof. The pixels in the other groups (505 and 515 through 580) can include image pixels, focus pixels, or a combination thereof. The first resolution 587 is lower than a full resolution that the image sensor 501 is capable of.

In some examples, an imaging system may alternate which group is selected for sparse readout in each subsequent frame in a series of image frames (e.g., for a video). For example, an imaging system may perform sparse readout based on the first group 505 (as in FIG. 5B) for the first image frame, sparse readout based on the second group 510 (as in FIG. 5C) for the second image frame, sparse readout based on the third group 515 for the third image frame, and so forth. The imaging system may cycle through the groups to eventually perform a sparse readout with every group. This way, the imaging system can gradually gather a full resolution view of the scene, at least for the static portions of the scene.

The blocks 504 in the lattice 502 in the conceptual diagrams 500A-500C are all uniform in shape, and are all square in shape. In some examples, at least some of the blocks 504 may be another shape, such as an oblong rectangle or another polygonal shape. In some examples, at least some of the blocks 504 may be a polyhedron that can form a polyhedral lattice. In some examples, at least some of the blocks 504 may be a regular polyhedron that can form a regular polyhedral lattice. The blocks 504 in the lattice 502 in the conceptual diagrams 500A-500C are all uniform in size. In some examples, at least some of the blocks 504 may be another size. The lattice 502 may be referred to as a grid.

Figure 6A:
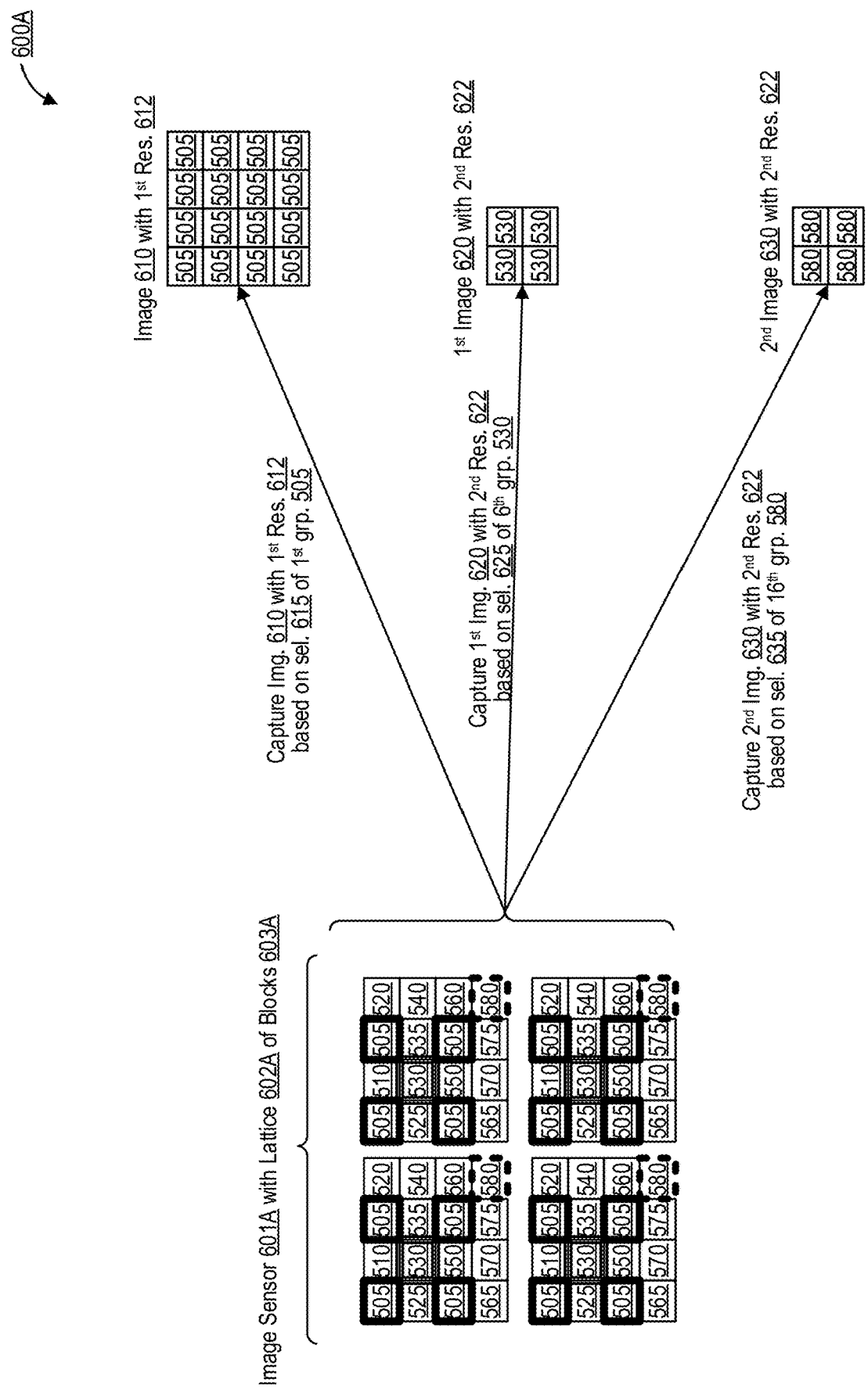
FIG. 6A is a conceptual diagram illustrating capture of an image with a first resolution, a first image with a second resolution, and/or a second image with the second resolution by performing sparse readouts of an image sensor with a pixel array that is organized into a lattice of four blocks, with each of the pixels of the pixel array organized into one of thirteen groups, with each block including sixteen pixels with at least one pixel from each group, in accordance with some examples.

FIG. 6A is a conceptual diagram 600A illustrating capture of an image 610 with a first resolution 612, a first image 620 with a second resolution 622, and/or a second image 630 with the second resolution 622 by performing sparse readouts of an image sensor 601A with a pixel array that is organized into a lattice 602A of four blocks 603A, with each of the pixels of the pixel array organized into one of thirteen groups, with each block including sixteen pixels with at least one pixel from each group. The pixel array of the image sensor 601A is eight pixels wide by eight (8) pixels in height. Similarly to the block 504 of FIGS. 5A-5C, each of the blocks 603A is four pixels wide by four pixels in height. The pixel array of the image sensor 601A is thus two blocks wide by two blocks in height.

Each of the blocks 603A includes sixteen pixels total. Each of the blocks 603A includes one pixel of each of the thirteen groups. The thirteen groups include the sixteen groups of FIGS. 5A-5C, without the third group 515, the ninth group 545 and the eleventh group 555. Each of the blocks 603A includes four pixels in the first group 505, and one pixel of each remaining group of the thirteen groups. Specifically, each of the blocks 603A includes four pixels in the first group 505, a pixel in the second group 510, a pixel in the fourth group 520, a pixel in the fifth group 525, a pixel in the sixth group 530, a pixel in the seventh group 535, a pixel in the eighth group 540, a pixel in the tenth group 550, a pixel in the twelfth group 560, a pixel in the thirteenth group 565, a pixel in the fourteenth group 570, a pixel in the fifteenth group 575, and a pixel in the sixteenth group 580.

All sixteen of the pixels belonging to the first group 505 (four per block 603A) are highlighted in FIG. 6A using a thick black outline. The imaging system captures the image 610 with the first resolution 612 by performing a sparse readout based on selection 615 of the first group 505, without reading out any of the other groups (510, 520, 525, 530, 535, 540, 550, 560, 565, 570, 575, 580), and by combining all of the pixels belonging to the first group 505 together into the image 610 with the first resolution 612.

All four of the pixels belonging to the sixth group 530 (one per block 603A) are highlighted in FIG. 6A using a triple-black-line outline. The imaging system captures the first image 620 with the second resolution 622 by performing a sparse readout based on selection 625 of the sixth group 530, without reading out any of the other groups (505, 510, 520, 525, 535, 540, 550, 560, 565, 570, 575, 580), and by combining all of the pixels belonging to the sixth group 530 into the first image 620 with the second resolution 622.

All four of the pixels belonging to the sixteenth group 580 (one per block 603A) are highlighted in FIG. 6A using a dashed-black-line outline. The imaging system captures the second image 630 with the second resolution 622 by performing a sparse readout based on selection 635 of the sixteenth group 580, without reading out any of the other groups (505, 510, 520, 525, 530, 535, 540, 550, 560, 565, 570, 575), and by combining all of the pixels belonging to the sixteenth group 580 together into the second image 630 with the second resolution 622. In some examples, the readout of the first group 505 to capture the image 610 with the first resolution 612 can be referred to as a dense readout relative to the sparse readout of the sixth group 530 to generate the first image 620 with the second resolution 622 and/or relative to the sparse readout of the sixteenth group 580 to generate the second image 630 with the second resolution 622.

In some examples, the first resolution 612 is a higher resolution than the second resolution 622. The terms dense readout and/or sparse readout may be relative. For instance, the term dense readout may refer to any readout that is more dense than a specified sparse readout. The term sparse readout may refer to any readout that is more sparse than a specified dense readout and/or full readout. In some examples, the readout of the first group 505 to capture the image 610 with the first resolution 612 can be referred to as a medium-density readout.

An image with a third resolution (not pictured) can be captured, for example, by selecting and reading out pixel data from multiple groups. In one illustrative example, image with a third resolution (not pictured) can be captured by selecting and reading out pixel data from all of the groups (e.g., 505, 510, 520, 525, 530, 535, 540, 550, 560, 565, 570, 575, and 580). Readout of an image at the third resolution may be referred to as a high-density readout. Readout of an image at the third resolution may be referred to as a full-density readout if the readout at the third resolution includes selecting and reading out pixel data from all of the groups. This way, an imaging system with the image sensor 601A can provide numerous levels of readout density. The numerous levels of readout density can include a most sparse readout (e.g., one pixel per block), a next readout with additional pixel data (e.g., two pixels per block), a next readout with additional pixel data (e.g., three pixels per block), a next readout with additional pixel data (e.g., four pixels per block as with group 505), a next readout with additional pixel data (e.g., five pixels per block), and so on up until a full resolution readout (e.g., sixteen pixels per block with the blocks 603A of FIG. 6A).

In some examples, different groups can have different numbers of pixels in each of the blocks 603A. For example, one group can have one pixel per block, a second group can have two pixels per block, a third group can have three pixels per block, a fourth group can have four pixels per block, and a fifth group can once again have one pixel per block. The pixels can have any arrangement within the blocks. In some examples, the pixels can be arranged in the same way (e.g., same arrangement of groupings) in each of the blocks of the lattice. In some examples, the pixels can be arranged in different ways (e.g., different arrangements of groupings) in different blocks of the lattice.

Figure 6B:
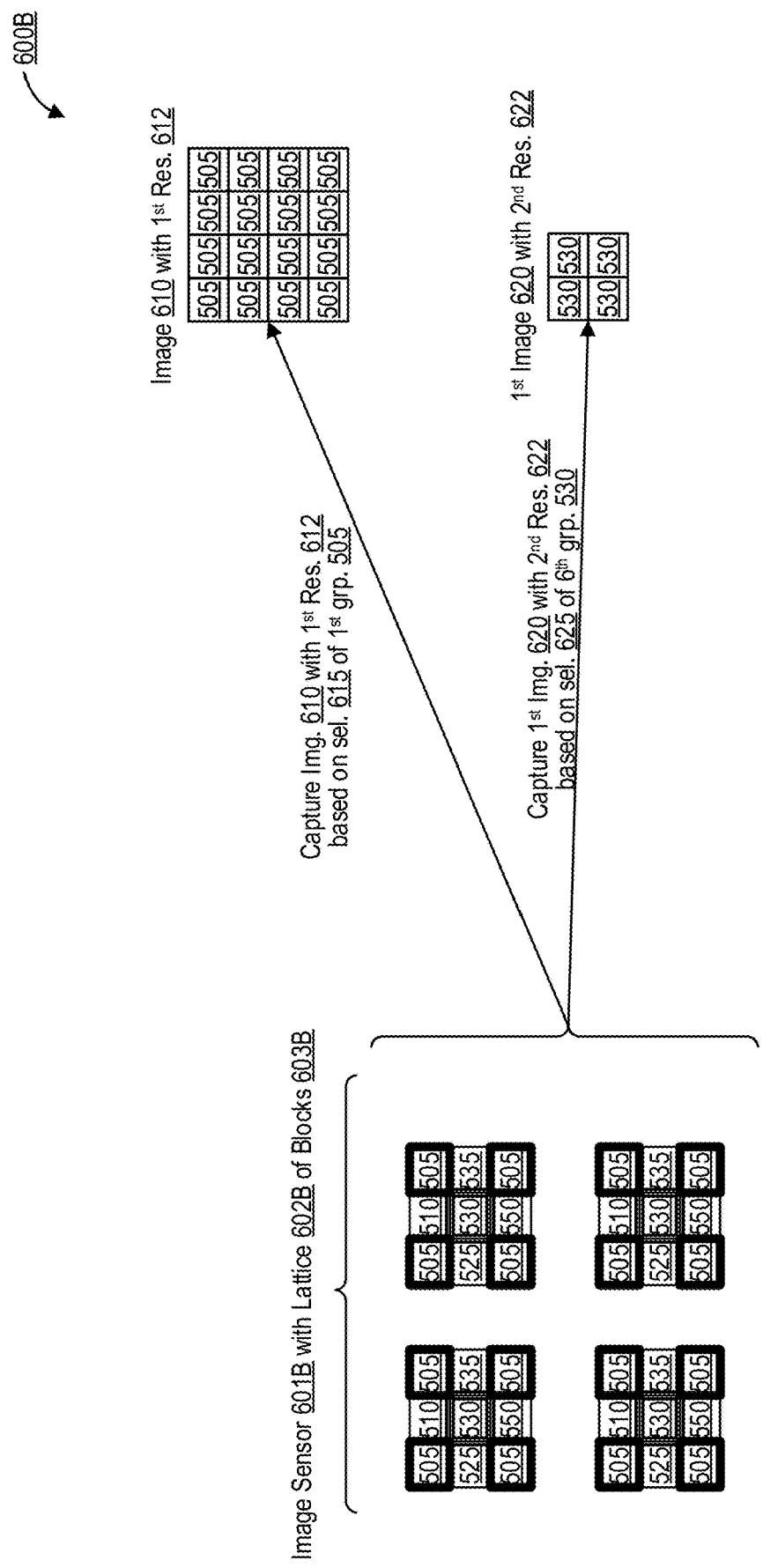
FIG. 6B is a conceptual diagram illustrating capture of the image with the first resolution and/or the first image with the second resolution by performing sparse readouts of an image sensor with a pixel array that is organized into a lattice of four blocks, with each of the pixels of the pixel array organized into one of six groups, with each block including nine pixels with at least one pixel from each group, in accordance with some examples.

FIG. 6B is a conceptual diagram 600B illustrating capture of the image 610 with the first resolution 612 and/or the first image 620 with the second resolution 622 by performing sparse readouts of an image sensor 601B with a pixel array that is organized into a lattice 602B of four blocks 603B, with each of the pixels of the pixel array organized into one of six groups, with each block including nine pixels with at least one pixel from each group. The pixel array of the image sensor 601B is six pixels wide by six pixels in height. Each of the blocks 603B three pixels wide by three pixels in height. The pixel array of the image sensor 601B is thus two blocks wide by two blocks in height.

Despite the smaller size of the blocks 603B compared to the blocks 603A, the image sensor 601B of FIG. 6B is still able to capture the image 610 with the first resolution 612 and/or the first image 620 with the second resolution 622, like the image sensor 601A of FIG. 6A is able to. This is because the blocks 603B still include the four pixels of the first group 505, and the sole pixel of the sixth group 530. In total, each of the blocks 603B includes four pixels in the first group 505, a pixel in the second group 510, a pixel in the fifth group 525, a pixel in the sixth group 530, a pixel in the seventh group 535, and a pixel in the tenth group 550. In some examples, the first resolution 612 is a higher resolution than the second resolution 622.

It should be understood that FIGS. 5A-5C and 6A-6B represent non-limiting examples of lattice, block, and pixel grouping structures, patterns, arrangements, and/or layouts. An image sensor of an imaging system can be arranged in a lattice with more blocks, fewer blocks, or an equal number of blocks compared to any of the lattices of FIGS. 5A-5C and 6A-6B. An image sensor of an imaging system can be arranged in a lattice with blocks having more pixels, fewer pixels, or an equal number of pixels compared to the blocks of any of the lattices of FIGS. 5A-5C and 6A-6B. An image sensor of an imaging system can be arranged in a lattice with blocks having more photodiodes, fewer photodiodes, or an equal number of photodiodes compared to the blocks of any of the lattices of FIGS. 5A-5C and 6A-6B. An image sensor of an imaging system can have a pixel array with more pixels, fewer pixels, or an equal number of pixels compared to the pixel arrays of any of the image sensors of FIGS. 5A-5C and 6A-6B. An image sensor of an imaging system can be arranged in a lattice with blocks that are larger, smaller, or equal in size compared to the blocks of any of the lattices of FIGS. 5A-5C and 6A-6B. An image sensor of an imaging system can be arranged in a lattice with blocks that include more pixel groupings, fewer pixel groupings, or an equal number of pixel groupings compared to the blocks of any of the lattices of FIGS. 5A-5C and 6A-6B. An image sensor of an imaging system can be arranged in a lattice with blocks that include more pixels in a pixel grouping, fewer pixels in a pixel grouping, or an equal number of pixels in a pixel grouping compared to the a pixel grouping of any of the pixel groupings of FIGS. 5A-5C and 6A-6B. An image sensor of an imaging system can be arranged in a lattice with one or more blocks that are square, like the blocks of FIGS. 5A-5C and 6A-6B. An image sensor of an imaging system can be arranged in a lattice with one or more blocks that are rectangular. An image sensor of an imaging system can be arranged in a lattice with one or more blocks that are oblong rectangles, with one side of the block being longer (in terms of number of pixels) than another side of the block. An image sensor of an imaging system can be arranged in a lattice with blocks having pixels arranged in any pattern, arrangement, or layout of pixel groupings. In some examples, each block has its pixels arranged the same pattern of pixel groupings, like the blocks of FIGS. 5A-5C and 6A-6B. In some examples, different blocks have pixels arranged in different patterns of pixel groupings. The different patterns of pixel groupings may repeat horizontally and/or vertically across the image sensor according to one or more lattices, such as the lattice 502, the lattice 602A, or the lattice 602B. For example, a particular pattern of pixel groupings can be used for every other block in a layout. Different pixel groupings may be arranged across the image sensor according to different patterns. Different patterns for the different pixel groupings may be arranged according to the same lattice or different lattices. In some examples, the lattice, block, and pixel grouping structures, patterns, arrangements, and/or layouts in FIGS. 5A-5C and 6A-6B can represent examples of an imaging system with a global shutter. In some examples, the lattice, block, and pixel grouping structures, patterns, arrangements, and/or layouts in FIGS. 5A-5C and 6A-6B can represent examples of an imaging system with a rolling shutter.

In some examples, the pixel arrays of FIGS. 5A-5C and 6A-6B are arrays of image pixels. In some examples, the pixel arrays of FIGS. 5A-5C and 6A-6B only include image pixels. In some examples, the pixel arrays of FIGS. 5A-5C and 6A-6B include image pixels and focus pixels. In some examples, one of the pixel groups of FIGS. 5A-5C and 6A-6B can be a group of image pixels. In some examples, one of the pixel groups of FIGS. 5A-5C and 6A-6B can only include image pixels. In some examples, one of the pixel groups of FIGS. 5A-5C and 6A-6B can include image pixels and focus pixels. In some examples, one of the pixel groups of FIGS. 5A-5C and 6A-6B can include focus pixels.

Figure 7:
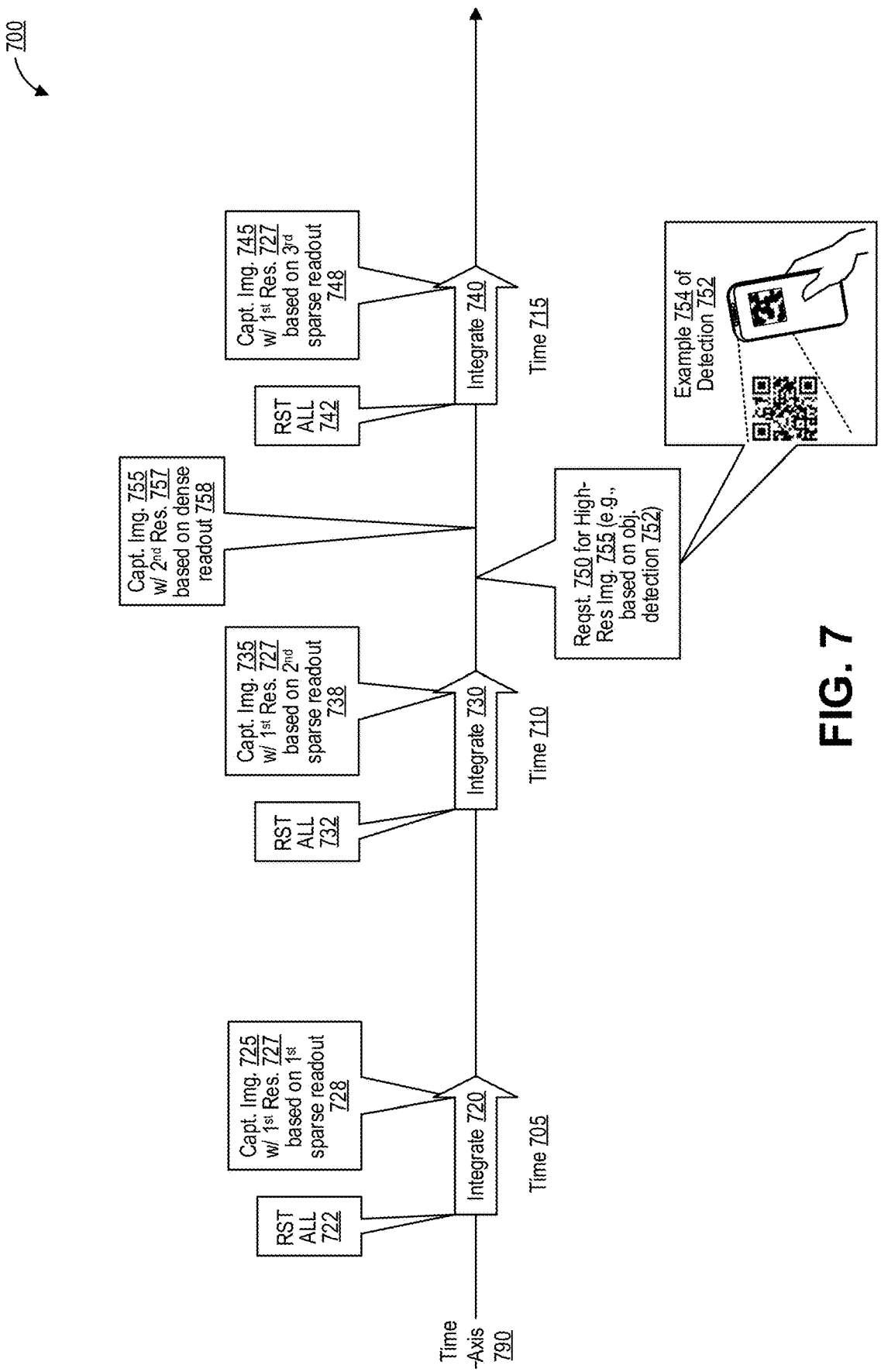
FIG. 7 is a conceptual diagram illustrating capture of a first image with a first resolution, capture of a second image with the first resolution, capture of an image with a second resolution, and capture of a third image with the first resolution, in accordance with some examples.

FIG. 7 is a conceptual diagram 700 illustrating capture of a first image 725 with a first resolution 727, capture of a second image 735 with the first resolution 727, capture of an image 755 with a second resolution 757, and capture of a third image 745 with the first resolution 727. Capture of the first image 725 with the first resolution 727, the second image 735 with the first resolution 727, the image 755 with the second resolution 757, and the third image 745 with the first resolution 727 are illustrated relative to a horizontal time axis 790 along which time flows from left to right. The time axis 790 may be referred to as a timeline.

Three durations of time are identified along the time axis 790—a first time 705, a second time 710 after the first time 705, and a third time 715 after the second time 710. At the beginning of the first time 705, all pixels of an image sensor of an imaging system are reset, indicated as a reset 722 (e.g., a "reset all" function). At the end of the first time 705, the imaging system captures the first image 725 with the first resolution 727 based on a first sparse readout 728 during which the imaging system selectively reads out one or more specified groups of pixels without reading out other groups of pixels other than the one or more specified groups of pixels. In some examples, during the first sparse readout 728, the imaging system reads all of the image pixels of the one or more specified groups of pixels. In some examples, during the first sparse readout 728, the imaging system reads all of the image pixels and all of the focus pixels of the one or more specified groups of pixels. The time in between the reset 722 and the sparse readout 728 to capture the first image 725 with the first resolution 727 is referred to as the integration 720. Exposure of the image sensor to light from the scene for an exposure time, and the resulting buildup of charge at the photodetectors of the image sensor, may occur during the integration 720. During the integration 720, the analog pixel data from all of the pixels and/or photodetectors of the image sensor may be stored in the storage array 135 as illustrated in and discussed with respect to FIGS. 1, 2, and 3A-3B.

At the beginning of the second time 710, all pixels of the image sensor of the imaging system are reset, indicated as a reset 732 (e.g., a "reset all" function). At the end of the second time 710, the imaging system captures the second image 735 with the first resolution 727 based on a second sparse readout 738 during which the imaging system selectively reads out one or more specified groups of pixels without reading out other groups of pixels other than the one or more specified groups of pixels. In some examples, the one or more specified groups of pixels are the same for the second sparse readout 738 as for the first sparse readout 728. In some examples, the one or more specified groups of pixels are different for the second sparse readout 738 compared to the first sparse readout 728. In some examples, the one or more specified groups of pixels for the second sparse readout 738 include at least one of the one or more specified groups of pixels for the first sparse readout 728. In some examples, the one or more specified groups of pixels for the second sparse readout 738 exclude at least one of the one or more specified groups of pixels for the first sparse readout 728. In some examples, during the second sparse readout 738, the imaging system reads all of the image pixels of the one or more specified groups of pixels. In some examples, during the second sparse readout 738, the imaging system reads all of the image pixels and all of the focus pixels of the one or more specified groups of pixels. The time in between the reset 732 and the sparse readout 738 to capture the second image 735 with the first resolution 727 is referred to as the integration 730. Exposure of the image sensor to light from the scene for an exposure time, and the resulting buildup of charge at the photodetectors of the image sensor, may occur during the integration 730. During the integration 730, the analog pixel data from all of the pixels and/or photodetectors of the image sensor may be stored in the storage array 135 as illustrated in and discussed with respect to FIGS. 1, 2, and 3A-3B.

At the beginning of the third time 715, all pixels of the image sensor of the imaging system are reset, indicated as a reset 742 (e.g., a "reset all" function). At the end of the third time 715, the imaging system captures the third image 745 with the first resolution 727 based on a third sparse readout 748 during which the imaging system selectively reads out one or more specified groups of pixels without reading out other groups of pixels other than the one or more specified groups of pixels. In some examples, the one or more specified groups of pixels are the same for the third sparse readout 748 as for the first sparse readout 728 and/or the second sparse readout 738. In some examples, the one or more specified groups of pixels are different for the third sparse readout 748 compared to the first sparse readout 728 and/or the second sparse readout 738. In some examples, the one or more specified groups of pixels for the third sparse readout 748 include at least one of the one or more specified groups of pixels for the first sparse readout 728 and/or for the second sparse readout 738. In some examples, the one or more specified groups of pixels for the third sparse readout 748 exclude at least one of the one or more specified groups of pixels for the first sparse readout 728 and/or for the second sparse readout 738. In some examples, during the third sparse readout 748, the imaging system reads all of the image pixels of the one or more specified groups of pixels. In some examples, during the third sparse readout 748, the imaging system reads all of the image pixels and all of the focus pixels of the one or more specified groups of pixels. The time in between the reset 742 and the sparse readout 748 to capture the third image 745 with the first resolution 727 is referred to as the integration 740. Exposure of the image sensor to light from the scene for an exposure time, and the resulting buildup of charge at the photodetectors of the image sensor, may occur during the integration 740. During the integration 740, the analog pixel data from all of the pixels and/or photodetectors of the image sensor may be stored in the storage array 135 as illustrated in and discussed with respect to FIGS. 1, 2, and 3A-3B.

A request 750 is received between the second time 710 and the third time 715. The request 750 requests capture of an image 755 with the second resolution 757. Because the data from all of the pixels and/or photodiodes of the image sensor are still stored in the storage array 135 following the integration 730, and have not yet been reset by the reset 742, the imaging system is able to perform a readout on the remaining pixel data from the remaining pixels and/or photodiodes that were not read out already as part of the sparse readout 738, and can thus perform a dense readout 758 of the image sensor and capture the image 755 with the second resolution 757. In some examples, the second resolution 757 is higher than the first resolution 727.

In some examples, during the dense readout 758, the imaging system selectively reads out one or more specified groups of pixels without reading out other groups of pixels other than the one or more specified groups of pixels. In some examples, the one or more specified groups of pixels for the dense readout 758 include the one or more specified groups of pixels for the second sparse readout 738. In some examples, the one or more specified groups of pixels for the dense readout 758 include one or more other groups of pixels other than the specified groups of pixels for the second sparse readout 738. In some examples, the one or more specified groups of pixels are the same for dense readout 758 include at least one of the one or more specified groups of pixels for the first sparse readout 728 and/or for the second sparse readout 738 and/or for the third sparse readout 748. In some examples, the one or more specified groups of pixels are the same for dense readout 758 exclude at least one of the one or more specified groups of pixels for the first sparse readout 728 and/or for the second sparse readout 738 and/or for the third sparse readout 748. In some examples, the one or more specified groups of pixels are different for the dense readout 758 compared to the first sparse readout 728 and/or the second sparse readout 738 and/or the third sparse readout 748. In some examples, the one or more specified groups of pixels are the same for the dense readout 758 as for the first sparse readout 728 and/or the third sparse readout 748. In some examples, during the dense readout 758, the imaging system reads all of the groups of pixels of the image sensor. In some examples, during the dense readout 758, the imaging system reads all of the pixels of the image sensor. In some examples, during the dense readout 758, the imaging system reads all of the image pixels of the one or more specified groups of pixels. In some examples, during the dense readout 758, the imaging system reads all of the image pixels and all of the focus pixels of the one or more specified groups of pixels. In some examples, during the dense readout 758, the imaging system reads all of the image pixels of the image sensor. In some examples, during the dense readout 758, the imaging system reads all of the image pixels and all of the focus pixels of the image sensor. In some examples, the dense readout 758 may be a full readout of the image sensor.

In some examples, the request 750 may be based on a user interface input received from a user interface. In some examples, the request 750 may be provided by the imaging system, received by the imaging system, or both. For instance the request 750 can be provided and/or received by the imaging system based on the imaging system detecting a property of the second image 735 with the first resolution 727 (and/or the first image 725 with the first resolution 727) that suggests that an image with the second resolution 757 (or otherwise with a resolution higher than the first resolution 727) may be desirable and/or beneficial for a use case. In some examples, the imaging system may provide and receive the request 750 based on the imaging system determining (e.g., using an object detection algorithm) that the second image 735 with the first resolution 727 (and/or the first image 725 with the first resolution 727) includes a depiction of an object. In some examples, the object includes a glyph that optically encodes information (e.g., a linear barcode or a two-dimensional (2D) barcode) that may be easier for the imaging system (e.g., for the object detection algorithm and/or a glyph detection and/or scanning and/or interpreting algorithm) to scan and/or interpret in an image with the second resolution 757 (or otherwise with a resolution higher than the first resolution 727). Examples of 2D barcodes include quick response (QR) codes, Aztec codes, data matrices, PDF417 codes, MaxiCodes, Codablock F codes, Han Xin codes, and DotCodes. In some examples, a 2D barcode and be referred to as a 2D code. An example 754 of a detection 752 of a glyph (a QR code) in the second image 735 with the first resolution 727 is illustrated as an example of the imaging system triggering the request 750. In the example 754, a glyph is visible in the field of view of a camera of a mobile handset. A first depiction of the glyph corresponding to the first resolution 727 is illustrated on the display of the mobile handset to indicate that the second image 735 with the first resolution 727 may include the first depiction of the glyph based on the glyph being in the FOV of the mobile handset at the time of capture of the second image 735 with the first resolution 727. The first depiction of the glyph may be too blurry and/or low-resolution for the imaging system to be able to interpret the information optically encoded by the glyph from the depiction of the glyph with a confidence value exceeding a confidence threshold (hence the request 750), but the first resolution 727 of the first depiction of the glyph may be sufficient to detect that the glyph is indeed depicted in the second image 735 with a confidence value exceeding a confidence threshold.

The image 755 with the second resolution 757 includes a second depiction of the glyph, which may be detailed, sharp, clear, and/or high-resolution enough for the imaging system to be able to interpret the information encoded by the glyph from the second depiction of the glyph with a confidence value exceeding the confidence threshold. In some examples, the information encoded by the glyph may include a uniform resource indicator (URI), such as a uniform resource locator (URL). In some examples, the information encoded by the glyph may include alphanumeric characters.

In some examples, the object includes a glyph, a portion of a person (e.g., a person's face, a person's body), a portion of a vehicle (e.g., including a license plate), a portion of an animal (e.g., an animal's face, an animal's body), one or more alphanumeric characters (e.g., arranged in a string of alphanumeric characters), or a combination thereof. The object detection algorithm can include a feature detection algorithm, a feature recognition algorithm, an object detection algorithm, an object recognition algorithm, a facial detection algorithm, a facial recognition algorithm, a person detection algorithm, a person recognition algorithm, an optical character detection algorithm, an optical character recognition (OCR) algorithm, a classifier, an optical glyph detector, an optical glyph scanner, or a combination thereof. The object detection algorithm may, in some examples, detect more effectively and/or consistently using an image with the second resolution 757 (or otherwise with a resolution higher than the first resolution 727) than using an image with the first resolution 727.

In some examples, the object is a set of one or more alphanumeric characters, that that may be easier for the object detection algorithm to parse using an image with the second resolution 757 (or otherwise with a resolution higher than the first resolution 727). The object detection algorithm may include an optical character recognition (OCR) algorithm.

In some examples, the object is an object and/or image region having a saliency exceeding a saliency threshold. The imaging system can determine the saliency of the object and/or image region at least in part by generating a saliency map based on the image with the first resolution 727 (e.g., the first image 725 and/or the second image 735). In some examples, the imaging system can generate the saliency map based on the image(s) with the first resolution 727 (e.g., the first image 725 and/or the second image 735) by inputting these image(s) with the first resolution 727 as input images to a trained machine learning model. The trained machine learning model is trained to output a saliency map based on one or more input images. In some examples, the imaging system can determine the saliency of the object and/or image region at least in part based on determining that the second image 735 with the first resolution 727 includes a movement (e.g., exceeding a movement threshold) compared to a previous image (e.g., the first image 725 with the first resolution 727), In some examples, the imaging system can determine the saliency of the object and/or image region at least in part based on identifying that the object or image region has unique colors or patterns not found elsewhere in the image(s) with the first resolution 727. In some examples, the imaging system can determine the saliency of the object and/or image region at least in part based on a distance (e.g., in a color space and/or luminosity space) between color values and/or luminosity values corresponding to pixel of the object and/or image region and color values and/or luminosity values of one or more other pixels in the image(s) with the first resolution 727. In some examples, the imaging system can identify a saliency for a given pixel in the second image 735 with the first resolution 727 at least in part based on a distance (e.g., in a color space and/or luminosity space) between color values and/or luminosity values corresponding to the given pixel in the image and color values and/or luminosity values of one or more other pixels in the image (e.g., other than the given pixel). In some examples, the color values and/or luminosity values of the one or more pixels in the image can include an average of the color values and/or luminosity values the pixels in the image, so that the imaging system finds the distance between the color values and/or luminosity values for the given pixel and the average of the color values and/or luminosity values the pixels in the image. In some examples, the color values and/or luminosity values of the one or more pixels in the image can include an average of the color values and/or luminosity values the pixels in the image other than the given pixel, so that the imaging system finds the distance between the color values and/or luminosity values for the given pixel and the average of the color values and/or luminosity values the pixels in the image other than the given pixel.

Thus, the imaging device can decide, on the fly, to switch from the first sparse readout 738 (e.g., sparse and/or low-resolution) to the second dense readout 758 (e.g., dense and/or high-resolution) before the time 715, and thus before the reset 742 and/or integration 740 begin. This is a technical improvement over traditional cameras in which a change in settings may require reconfiguration of the image sensor. Traditional image sensor reconfiguration to change settings is generally not applied until a delay in time passes (during which subsequent image frame(s) can be captured) after a request for the change is made. The imaging device provides technical improvements such as reduced power draw, reduced bandwidth usage, reduced heat generation, more effective heat dissipation, and/or reduced computational resource usage. These improvements are brought about due to use of sparse readout for the first sparse readout 728, the second sparse readout 738, and the third sparse readout 748 when images at the low resolution 727 (e.g., image 725, image 735, and image 745) are sufficient and use of the second readout 758 at the second resolution 757 (e.g., dense readout or even full readout) when requested via request 750 (e.g., by a user or by the imaging device itself) for operations in which an image with the second resolution 757 (e.g., the image 755) is beneficial or required.

In some examples, an imaging system may select the same group of pixels for the sparse readouts (e.g., the first sparse readout 728, the second sparse readout 738, and the third sparse readout 748) of each of the series of images with the first resolution 727 (e.g., the image 725, the image 735, and the image 745). For example, in the context of FIGS. 5A-5C, the imaging system may select the first group 505 for the sparse readouts (e.g., the first sparse readout 728, the second sparse readout 738, and the third sparse readout 748) of each of the series of images with the first resolution 727 (e.g., the image 725, the image 735, and the image 745). In some examples, an imaging system may alternate which group is selected for the sparse readouts (e.g., the first sparse readout 728, the second sparse readout 738, and the third sparse readout 748) of each of the series of images with the first resolution 727 (e.g., the image 725, the image 735, and the image 745). For example, an imaging system may perform the first sparse readout 728 based on the first group 505 (as in FIG. 5B) for the first image 725 with the first resolution 727, the second readout 738 based on the second group 510 (as in FIG. 5C) for the second image 735 with the first resolution 727, the third sparse readout 748 based on the third group 515 for the third image 735 with the first resolution 727, and so forth. The imaging system may cycle through the groups to eventually perform a sparse readout with every group, and then start the routine over with the first group. The imaging system can store the images that are produced this way. By performing a sparse readout with every group during this routine, the imaging system can store images captured using every group. The imaging system can combine these images into a combined image having a higher resolution by arranging the pixel data from the different images based on the layout of pixel groups in the blocks of the image sensor. This combined image can have a higher resolution than the images that are combined to form it. This way, the imaging system can gradually gather a high resolution (or even full resolution) view of the scene by combining multiple images captured with low resolutions that are generated via sparse readout. This combined image may still portray the scene accurately, at least for portions of the scene that are static during capture of the multiple images.

In some examples, the imaging device can use an object detection algorithm to attempt to perform object detection for other images with the first resolution 727 besides the second image 735 with the first resolution 727, such as the first image 725 with the first resolution 727 and/or the third image 745 with the first resolution 727. These attempts to perform object detection can result in no request for an image with the second resolution 757 (as in the request 750) because the attempt to perform object detection resulted in a lack of detection any of the object that the object detection algorithm attempts to detect by the object detection algorithm within a threshold amount of time, such as before the next reset (e.g., reset 732, reset 742). In some examples, the imaging system can perform a reset (e.g., reset 732, reset 742) automatically in response to the lack of detection any of the object that the object detection algorithm attempts to detect by the object detection algorithm within a threshold amount of time.

In some examples, the second resolution 757 is higher than the first resolution 727. In some examples, the imaging system can delay the reset 742 for a period of time (e.g., in response to the request 750 and/or the detection 752) to give the imaging system sufficient time to perform the dense readout 758, for instance if the imaging system determines that the dense readout 758 would otherwise be interrupted by the reset 742. The period of time for the delay may be a predetermined period of time. The period of time for the delay may be based on an amount of time to perform the dense readout 758, based on the scheduled time for the reset 742, and/or based on an additional predetermined buffer period of time. In some examples, the second resolution 757 is a full resolution that the image sensor of FIG. 7 is capable of In some examples, the first resolution 727 corresponds to a first set of one or more groups of pixels per block, while the second resolution 757 corresponds to a second set of one or more groups of pixels per block. In an illustrative example, the first resolution 727 corresponds to group 530 of FIGS. 6A-6B, while the second resolution 757 corresponds to group 505 of FIGS. 6A-6B. In some examples, the dense readout 758 at the second resolution 757 can have any of the numerous levels of readout density discussed with respect to FIGS. 6A-6B that exceed the most sparse readout density level. For instance, a medium-density readout, such as the readout of the first image 610 of FIGS. 6A-6B based on the selection 615 of the first group 505, is sufficient to read the glyph, or for facial recognition, or for object recognition, or for OCR, or for another function that the imaging device performs using the image 755.

In some examples, a request such as the request 750 can be used to trigger a second camera and/or a second image sensor other than the image sensor that captures the image 725, the image 735, and/or the image 745. For example, the image 755 can be captured used the second camera and/or a second image sensor. In some examples, the second camera and/or a second image sensor can have a different resolution than the camera and/or the image sensor that is used to captures the image 725, the image 735, and/or the image 745. In some examples, the second camera and/or a second image sensor can have a higher resolution than the camera and/or the image sensor that is used to captures the image 725, the image 735, and/or the image 745. In some examples, image data (e.g., the image 725, the image 735, and/or the image 745) and/or image capture settings (e.g., exposure settings, focus settings, white balance settings, zoom settings, flash settings, color balance settings, tone settings, saturation settings, gain settings, image processing settings, and the like) from the camera and/or the image sensor that is used to capture the image 725, the image 735, and/or the image 745 can be used to set image capture settings (e.g., exposure settings, focus settings, white balance settings, zoom settings, flash settings, color balance settings, tone settings, saturation settings, gain settings, image processing settings, and the like) for a second camera and/or a second image sensor. This can, for example, be used to speed up exposure convergence for the second camera and/or second image sensor.

It should be understood that references to pixels can refer to photodiodes herein. It should be understood that references to groups of pixels can refer to groups of photodiodes herein.

Figure 8:
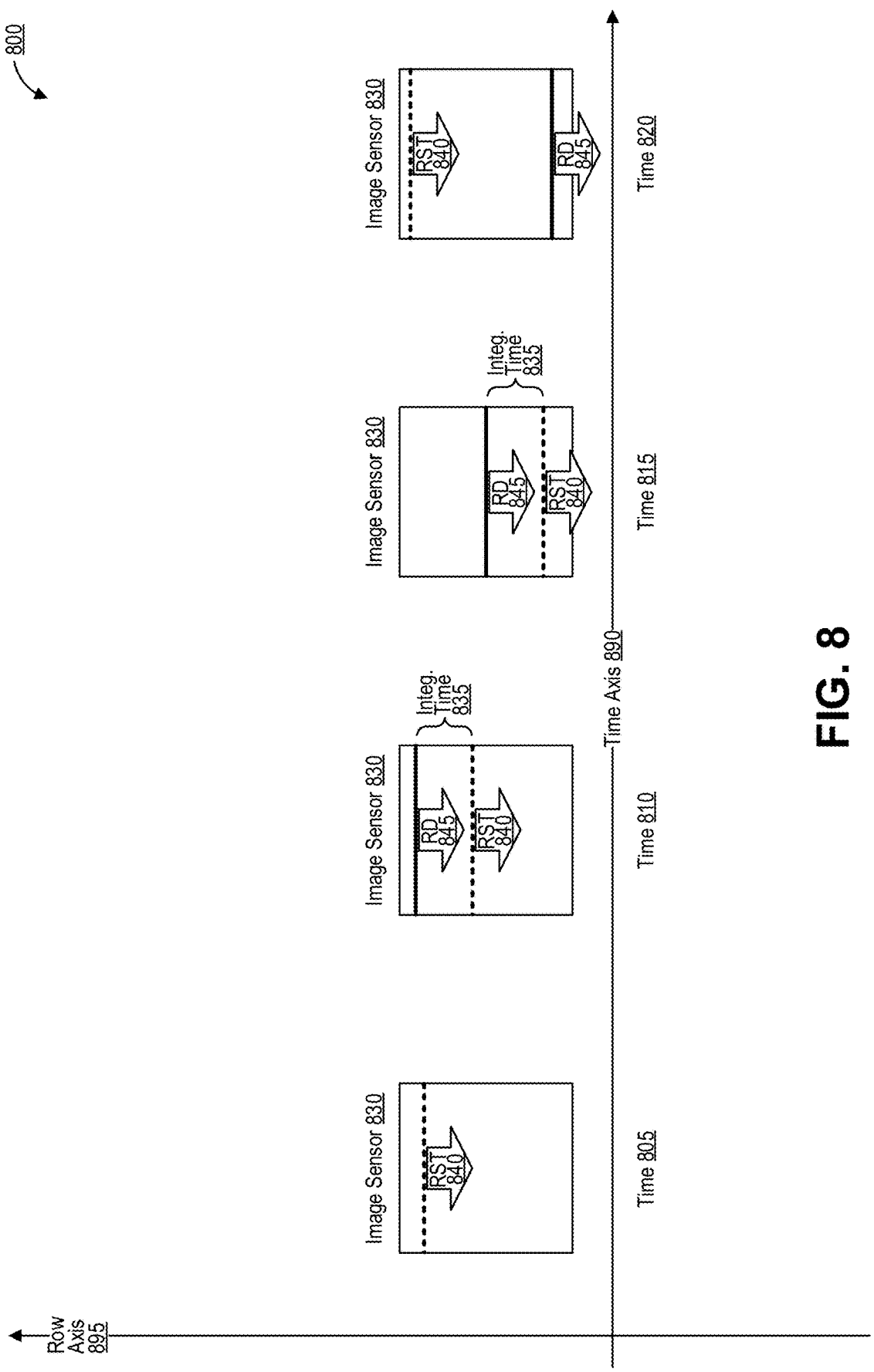
FIG. 8 is a conceptual diagram illustrating movement of a reset pointer and movement of a readout pointer along an image sensor in a rolling shutter imaging system, in accordance with some examples.

FIG. 8 is a conceptual diagram 800 illustrating movement of a reset pointer 840 and movement of a readout pointer 845 along an image sensor 830 in a rolling shutter imaging system. Movement of the reset pointer 840 and movement of the readout pointer 845 along the image sensor 830 are illustrated relative to a horizontal time axis 890 along which time flows from left to right. The time axis 890 may be referred to as a timeline.

The reset pointer 840 and the readout pointer 845 both move downward along the image sensor 830, from the top of the image sensor 830 to the bottom of the image sensor 830. The reset pointer 840 and the readout pointer 845 can both move downward along the image sensor 830 at the same speed. The reset pointer 840 and the readout pointer 845 can thus maintain a gap in time between them, which is referred to as the integration time 835. Exposure of the image sensor 830 to light from the scene for an exposure time, and the resulting buildup of charge at the photodetectors of the image sensor 830, may occur during the integration time 835.

Four times are identified along the time axis 890—a first time 805, a second time 810 after the first time 805, a third time 815 after the second time 810, and a fourth time 820 after the third time 815. At the first time 805, the reset pointer 840, illustrated as a thick horizontal dashed black line, is near the top of the image sensor 830, and is resetting a row near the top of the image sensor 830. At the second time 810, the reset pointer 840 has moved down toward the middle of the image sensor 830, and is resetting a row near the middle of the image sensor 830. A readout pointer 845, illustrated as a thick horizontal solid black line, is near the top of the image sensor 830, and is reading out pixel data from a row near the top of the image sensor 830. The space between the reset pointer 840 and the readout pointer 845 along the image sensor 830 represents a distance that can be crossed during the integration time 835 at the speed along which the reset pointer 840 and the readout pointer 845 are moving. At the third time 815, the reset pointer 840 has moved down toward the bottom of the image sensor 830, and is resetting a row near the bottom of the image sensor 830. The readout pointer 845 is near the middle of the image sensor 830, and is reading out pixel data from a row near the middle of the image sensor 830. The space between the reset pointer 840 and the readout pointer 845 along the image sensor 830 still corresponds to the integration time 835, since the speeds of the reset pointer 840 and the readout pointer 845 are consistent. At the fourth time 820, the reset pointer 840 has moved down past the bottom of the image sensor 830 and wrapped back around to the top of the image sensor 830, and is resetting a row near the top of the image sensor 830. The readout pointer 845 is near the bottom of the image sensor 830, and is reading out pixel data from a row near the bottom of the image sensor 830.

Once the readout pointer 845 reaches the bottom of the image sensor 830, and reads out the last of the pixel data from the image sensor 830, the image sensor 830 may capture an image based on the readout of the pixel data from the image sensor 830. The time axis 890 can then reset back to the time 805 and/or time 810 for a depiction of reset, integration, and readout of the next image captured by the image sensor 830. In some examples, the reset pointer 840 scans across the image sensor in raster scan order. In some examples, the readout pointer 845 scans across the image sensor in raster scan order.

Figure 9:
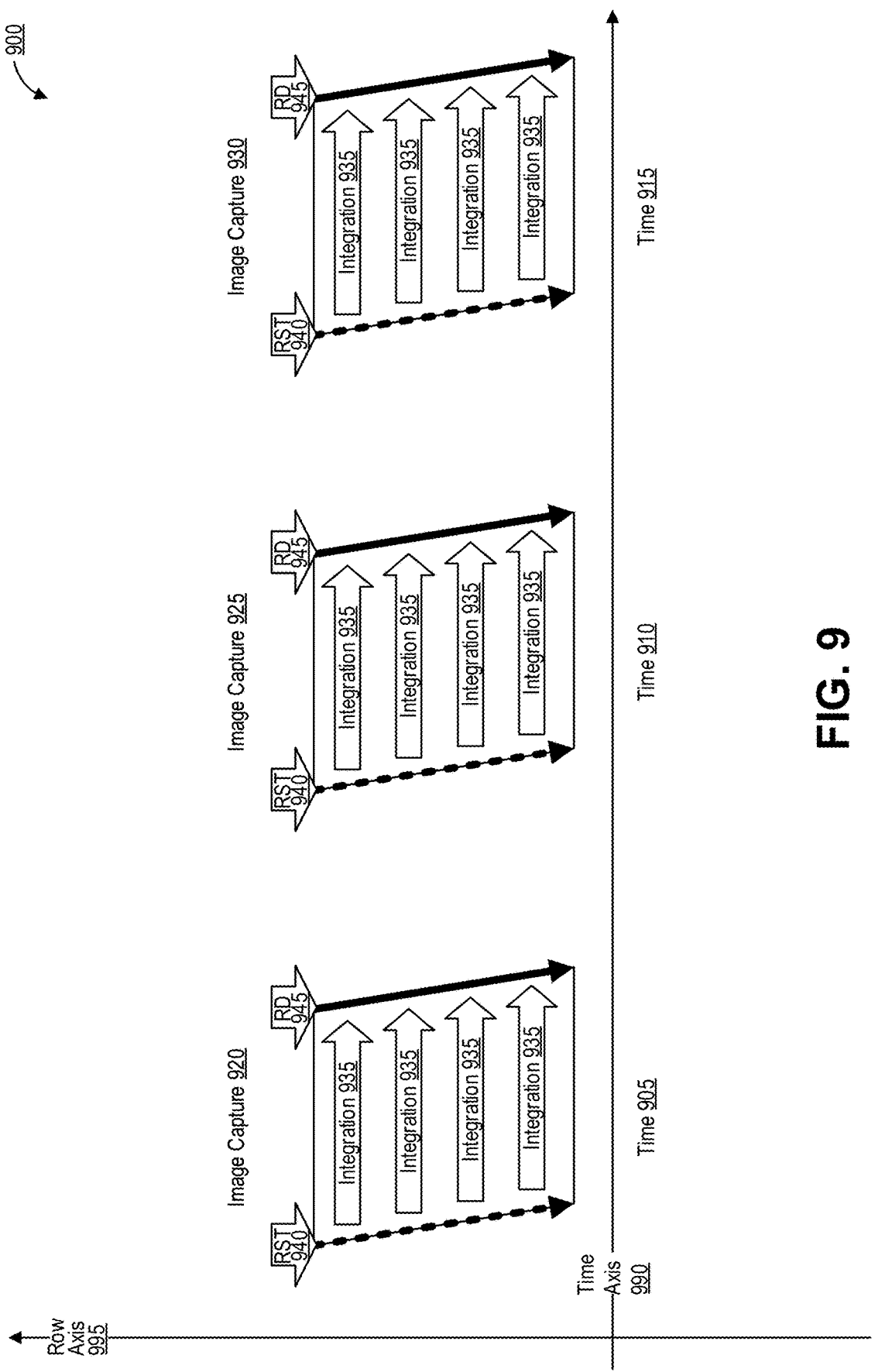
FIG. 9 is a conceptual diagram illustrating a rolling shutter imaging system performing a first image capture, a second image capture, and a third image capture, in accordance with some examples.

FIG. 9 is a conceptual diagram 900 illustrating a rolling shutter imaging system performing a first image capture 920, a second image capture 925, and a third image capture 930. The first image capture 920, the second image capture 925, and the third image capture 930 are illustrated relative to a horizontal time axis 990 along which time flows from left to right. The time axis 990 may be referred to as a timeline.

Three durations of time are identified along the time axis 990—a first time 905, a second time 910 after the first time 905, and a third time 915 after the second time 910. The imaging system performs the first image capture 920 during the first time 905, performs the second image capture 925 during the second time 910, and performs the third image capture 925 during the third time 915. The first image capture 920 may result in the imaging system capturing a first image, the second image capture 925 may result in imaging system capturing a second image, and the third image capture 930 may result in imaging system capturing a third image. The first image, the second image, and the third image may be sequential image frames of a video.

The first image capture 920, the second image capture 925, and the third image capture 930 are each illustrated as parallelograms, with the top row being further left (earlier along the time axis 990) than the bottom row, and the bottom row being further right (later along the time axis 990) than the top row. This is because the top rows of the image sensor are reset, integrated, and/or read out earlier than the bottom rows of the image sensor. The left edge of the parallelograms include a thick black dashed downward arrow representing resetting of the image sensor by the reset pointer 940. The reset pointer 940 of FIG. 9 moves from the top of the image sensor to the bottom of the image sensor as does the reset pointer 840 of FIG. 8. The left edge of the parallelograms include a thick black solid downward arrow representing readout of the pixel data from the image sensor by the readout pointer 945. The readout pointer 945 of FIG. 9 moves from the top of the image sensor to the bottom of the image sensor as does the readout pointer 845 of FIG. 8. Each parallelogram includes rightward-facing arrows representing integration 935 between the reset (e.g., corresponding to the reset pointer 940) on the left edge of the parallelogram and the readout (e.g., corresponding to the readout pointer 945) on the right edge of the parallelogram. Exposure of the image sensor to light from the scene for an exposure time, and the resulting buildup of charge at the photodetectors of the image sensor, may occur during the integration 935. In some examples, the reset pointer 940 scans across the image sensor in raster scan order. In some examples, the readout pointer 945 scans across the image sensor in raster scan order.

Figure 10A:
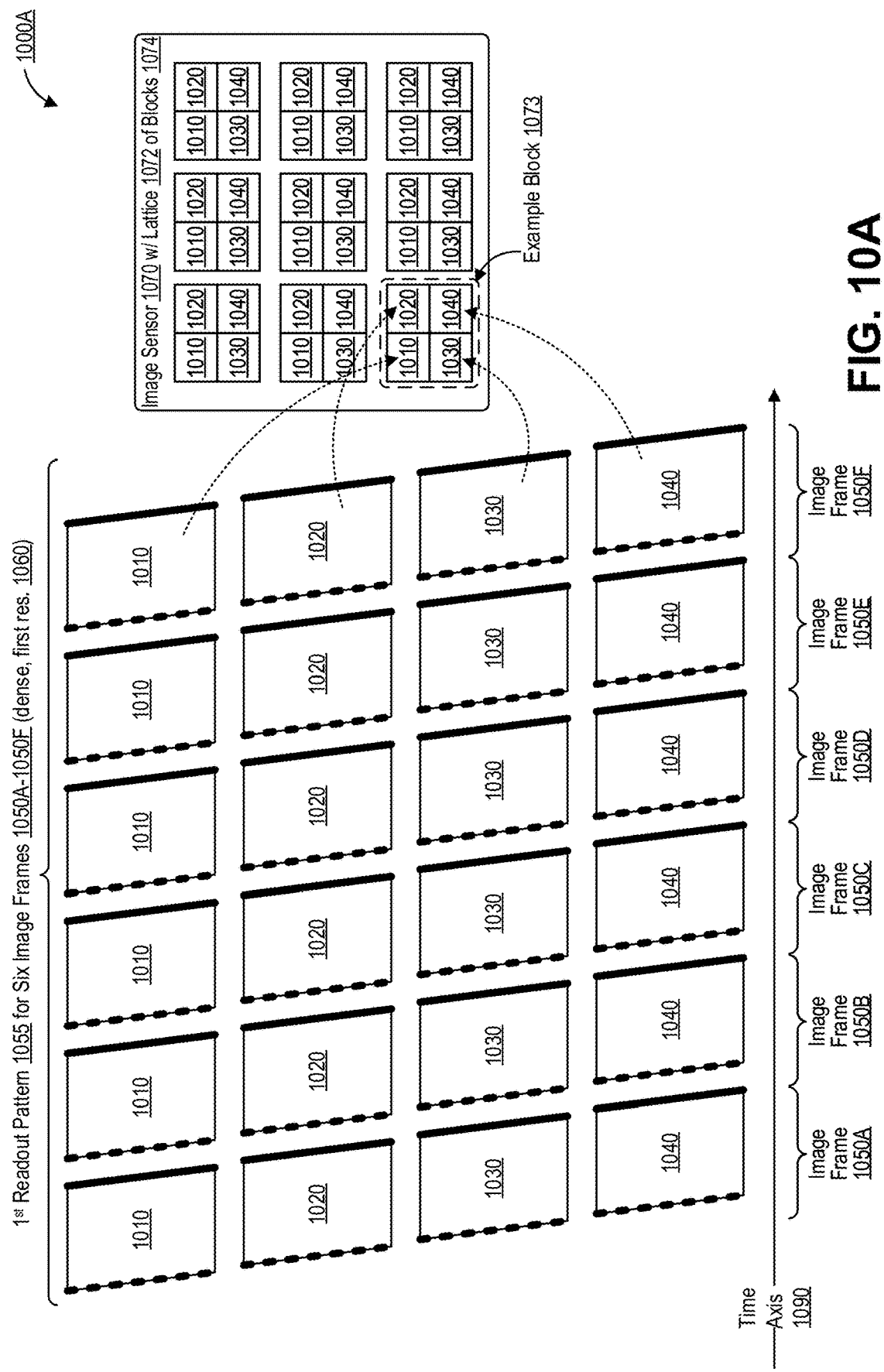
FIG. 10A is a conceptual diagram illustrating an image capture of six image frames, each with a first resolution, via a first readout pattern using a rolling shutter imaging system with four groups of pixels, in accordance with some examples.

FIG. 10A is a conceptual diagram 1000A illustrating an image capture of six image frames 1050A-1050F, each with a first resolution 1096, via a first readout pattern 1055 using a rolling shutter imaging system with four groups of pixels. The four groups of pixels include a first group 1010, a second group 1020, a third group 1030, and a fourth group 1040. An example of an image sensor 1070 (or a portion of the image sensor 1070) is illustrated in FIG. 10A. The image sensor 1070, or the portion of the image sensor 1070 that is illustrated, has dimensions of 6 pixels in width by 6 pixels in height.

The pixels of the image sensor 1070 are arranged according to a lattice 1072 of blocks 1074, similar to the lattice 502 of blocks 504 of FIGS. 5A-5C, the lattice 602A of blocks 603A of FIG. 6A, and/or the lattice 602B of blocks 603B of FIG. 6B. Each of the blocks 1074 include one pixel of each of the four groups of pixels. Thus, each of the blocks 1074 includes a pixel from the first group 1010, a pixel from the second group 1020, a pixel from the third group 1030, and a pixel from the fourth group 1040. The pixels from each of the four groups are arranged in the same order, pattern, and/or arrangement within each of the blocks 1074. An example block 1073 of the blocks 1074 is outlined in a dashed rounded rectangle. For instance, the top-left pixel in the example block 1073 is in the first group 1010, the top-right pixel in the example block 1073 is in the second group 1020, the bottom-left pixel in the example block 1073 is in the third group 1030, and the bottom-right pixel in the example block 1073 is in the fourth group 1040, The pixels of the four groups are arranged according to this order, pattern, and/or arrangement within each of the blocks 1074.

In some examples, the blocks 1074 may have more than one pixel in a certain group. Examples of blocks that have more than one pixel in a certain group include blocks 603A and blocks 603B of FIGS. 6A-6B, which each have four pixels in the first group 505. In some examples, one of the blocks 1074 may have different order, pattern, and/or arrangement of the groups of pixels compared to another one of the blocks 1074.

Figure 10B:
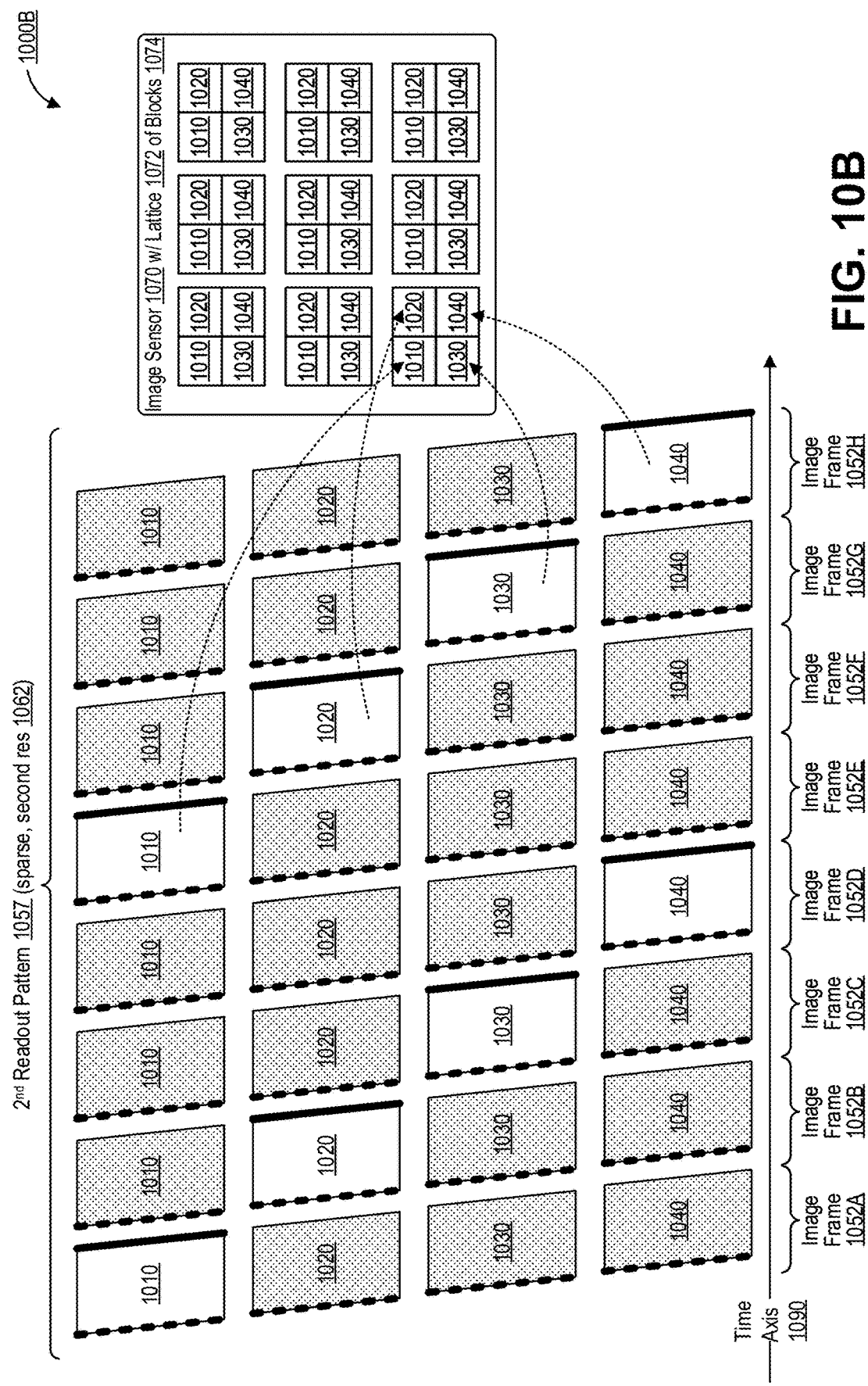
FIG. 10B is a conceptual diagram illustrating an image capture of eight image frames, each with a second resolution, via a second readout pattern using the rolling shutter imaging system with the four groups of pixels, in accordance with some examples.
Figure 10C:
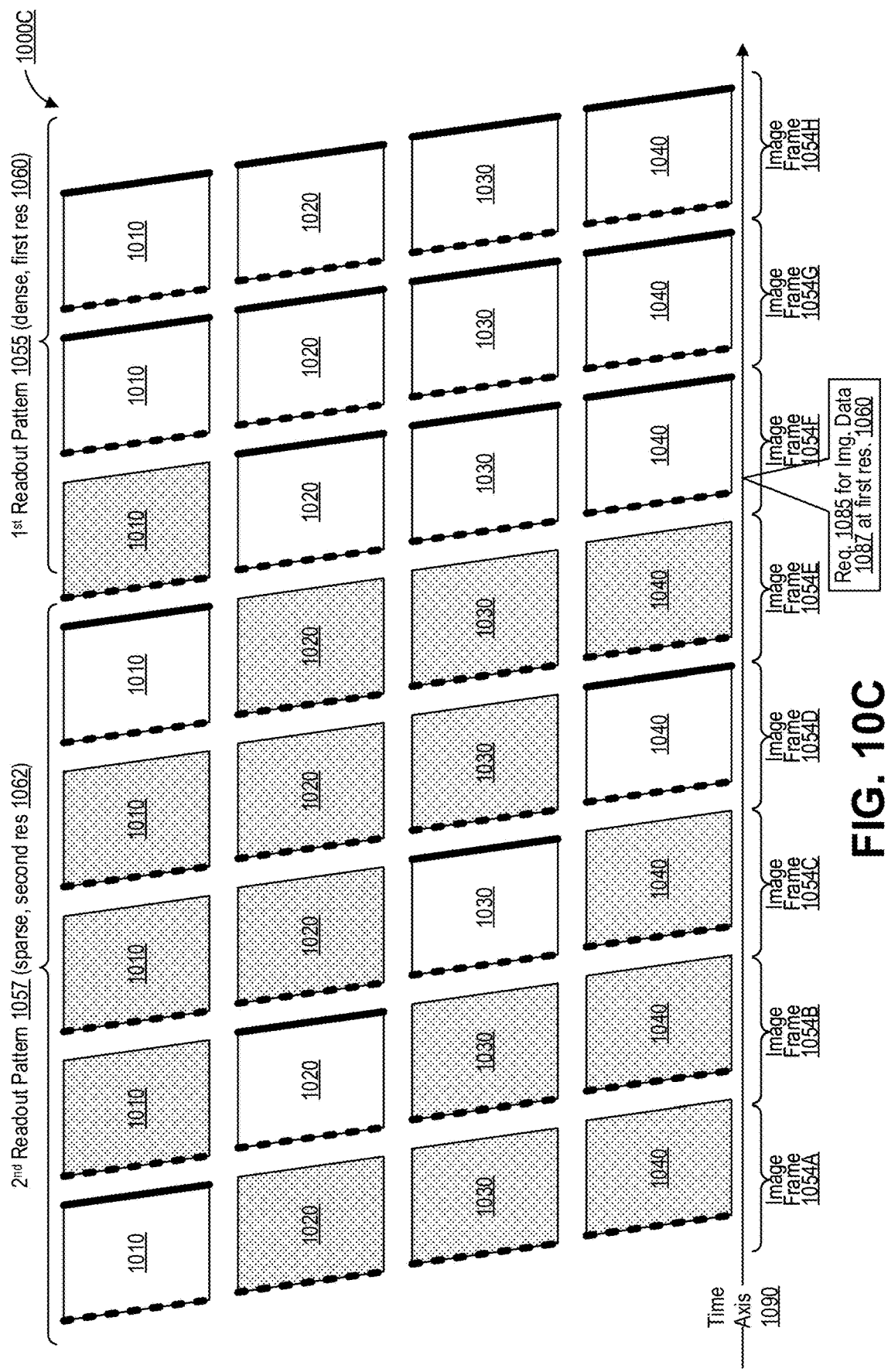
FIG. 10C is a conceptual diagram illustrating a transition from capture of image frames with the second resolution via the second readout pattern to capture of image frames with the first resolution via the first readout pattern using the rolling shutter imaging system with the four groups of pixels, in accordance with some examples.

The first readout pattern 1055 is illustrated with respect to a horizontal time axis 1090 along which time flows from left to right. The time axis 1090 may be referred to as a timeline. Six image frames are captured sequentially according to the first readout pattern 1055, each image frame captured at a first resolution 1060. The six image frames, in order from earlier to later along the time axis 1090, include an image frame 1050A, an image frame 1050B, an image frame 1050C, an image frame 1050D, an image frame 1050E, and an image frame 1050F. Each image frame is illustrated in FIGS. 10A-10C as a column of parallelograms along the time axis 1090 that includes the first group 1010, the second group 1020, the third group 1030, and the fourth group 1040. Each parallelogram represents all of the pixels across the image sensor 1070 that belong to the group that the parallelogram is labeled with. In particular, the parallelograms labeled with the first group 1010 represent all of the pixels across the image sensor 1070 within the first group 1010, the parallelograms labeled with the second group 1020 represent all of the pixels across the image sensor 1070 within the second group 1020, the parallelograms labeled with the third group 1030 represent all of the pixels across the image sensor 1070 within the third group 1030, and the parallelograms labeled with the fourth group 1040 represent all of the pixels across the image sensor 1070 within the fourth group 1040. The pixel data within each group can be read from top to bottom and left to right, according to raster scan order.

According to the first readout pattern 1055, all of the pixels across the image sensor 1070 are reset, exposed, integrated, and read out for every one of the six image frames. For every one of the six image frames, the pixels in the first group 1010, the pixels in the second group 1020, the pixels in the third group 1030, and the pixels in the fourth group 1040 are all reset, exposed, integrated, and read out. Within FIGS. 10A-10C, the parallelograms along the time axis 1090 all include a thick black dashed line along their left sides, which represents the image sensor 1070 resetting of the pixels in the group corresponding to the group label on the parallelogram. Within FIGS. 10A, all of the parallelograms along the time axis 1090 all include a thick solid black line along their right sides, which represents readout of the pixel data from the pixels in the group corresponding to the group label on the parallelogram. The area of the parallelogram itself represents exposure and/or integration between the resetting and the readout.

FIG. 10B is a conceptual diagram 1000B illustrating an image capture of eight image frames 1052A-1052H, each with a second resolution 1062, via a second readout pattern 1057 using the rolling shutter imaging system with the four groups of pixels. The eight image frames, in order from earlier to later along the time axis 1090, include an image frame 1052A, an image frame 1052B, an image frame 1052C, an image frame 1052D, an image frame 1052E, an image frame 1052F, an image frame 1052G, and an image frame 1052H. As in FIG. 10A, each image frame is illustrated a column of parallelograms along the time axis 1090 that includes the first group 1010, the second group 1020, the third group 1030, and the fourth group 1040. Within FIG. 10B, however, some of the parallelograms along the time axis 1090 are missing the thick solid black line along their right sides, indicating that those groups of pixels are not read out for that image frame according to the second readout pattern 1057. To help highlight the groups that are not read out according to the second readout pattern 1057, the parallelograms for those groups are also illustrated as shaded with a halftone shading pattern.

The second readout pattern 1057 reads a different group of pixels in each image frame until all four groups of pixels are read out, and then repeats the pattern of capture of the different groups of pixels for the next round of image frames. In FIG. 10B, the second readout pattern 1057 captures the first group 1010 in image frame 1052A, the second group 1020 in image frame 1052B, the third group 1030 in image frame 1052C, the fourth group 1040 in image frame 1052D. The diagonal group reading pattern established in image frames 1052A-1052D repeats in image frames 1052E-1052H.

According to the second readout pattern 1057, only the pixels of the first group 1010 are read out for the image frame 1052A and the image frame 1052E. The pixels of the second group 1020, the third group 1030, and the fourth group 1040 are not read out for the image frame 1052A and the image frame 1052E. According to the second readout pattern 1057, only the pixels of the second group 1020 are read out for the image frame 1052B and the image frame 1052F. The pixels of the first group 1010, the third group 1030, and the fourth group 1040 are not read out for the image frame 1052B and the image frame 1052F. According to the second readout pattern 1057, only the pixels of the third group 1030 are read out for the image frame 1052C and the image frame 1052G. The pixels of the first group 1010, the second group 1020, and the fourth group 1040 are not read out for the image frame 1052C and the image frame 1052G. According to the second readout pattern 1057, only the pixels of the fourth group 1040 are read out for the image frame 1052D and the image frame 1052H. The pixels of the first group 1010, the second group 1020, and the third group 1030 are not read out for the image frame 1052D and the image frame 1052H.

Because only one group of pixels is read out for each image frame, the image data captured for each individual image frame is read out and captured at a second resolution 1062. The second resolution 1062 is different than, and lower than, the first resolution 1060 of the image frames 1050A-1050F of FIG. 10A, for which all four groups are read out. Because readout is skipped for certain groups of pixels for certain image frames, capture of image frames according to the second readout pattern 1057 of FIG. 10B uses less power, uses less bandwidth (e.g., to convey the image data), uses less computational resources (e.g., for image processing), and generates less heat than capture of image frames according to the first readout pattern 1055 of FIG. 10A.

In some examples, an imaging system that includes the image sensor 1070 can combine the pixel data from different groups read out for different image frames into a single combined image having a higher resolution than the second resolution 1062. For instance, the imaging system that includes the image sensor 1070 can combine the pixel data from the first group 1010 from the image frame 1052A, the pixel data from the second group 1020 from the image frame 1052B, the pixel data from the third group 1030 from the image frame 1052C, and/or the pixel data from the fourth group 1040 from the image frame 1052D, into a single combined image. Similarly, the imaging system can combine the pixel data from the first group 1010 from the image frame 1052E, the pixel data from the second group 1020 from the image frame 1052F, the pixel data from the third group 1030 from the image frame 1052G, and/or the pixel data from the fourth group 1040 from the image frame 1052H, into a single combined image. If the imaging system combines pixel data from all four groups into the combined image, the combined image has the first resolution 1060. This way, the imaging system can still obtain high quality and high resolution images while still maintaining benefits such as using less power, using less bandwidth, using less computational resources, and generating less heat.

This approach for generating a combined image works particularly well when the imaging system is capturing images of scenes that include static regions. Because the static regions of the scene do not change much as time moves along the time axis 1090, those static regions appear similar while the image frame 1052A is captured, while the image frame 1052B is captured, while the image frame 1052C is captured, while the image frame 1052D is captured, while the image frame 1052E is captured, and/or while the image frame 1052B is captured. Thus, for the static regions of the scene, the combined image may appear indistinguishable from one of the image frames 1050A-1050F of FIG. 10A, in which all of the groups of pixels are read out.

Some visual artifacts may result from approach for generating a combined image when the imaging system is capturing images of scenes that include dynamic regions. The visual artifacts may be caused by combination of the different groups of pixels that are read out at different times associated with capture of the different image frames. The visual artifacts may be examples of, or may appear similar to, visual artifacts associated with interlaced video, such as combing, ghosting, interline twitter, moiré, aliasing effects, or combinations thereof. In some examples, the imaging system that includes the image sensor 1070 can reduce or eliminate the visual artifacts by applying one or more deinterlacing algorithms to the combined image, to other combined images, adjacent to the combined image along the time axis 1090, and/or to the pixel data associated with the individual groups of pixels that are used to generate the combined image. The one or more deinterlacing algorithm can include, for example, field combination deinterlacing, field extension deinterlacing, motion compensation deinterlacing, edge detection, blending, selective blending, weaving, inverse telecine, half-sizing, line doubling, block motion compensation, scene change detection, decimation, video filters, denoising filters, deblocking filters, or a combination thereof.

In some examples, an imaging system may use a third readout pattern (not pictured) that may readout the only specific groups without reading out other groups, similarly to the second readout pattern 1057, but in a different order, pattern, and/or arrangement. In one illustrative example, the third readout pattern may capture the fourth group 1040 in the image frame 1052A, the third group 1030 in the image frame 1052B, the second group 1020 in the image frame 1052C, and the fourth group 1040 in the image frame 1052D. In some examples, the third readout pattern may capture only a subset of the groups of pixels. In another illustrative example, the third readout pattern only captures image data and/or pixel data from one, two or three of the groups (e.g., selected from the first group 1010, the second group 1020, the third group 1030, and the fourth group 1040). In some examples, the third readout pattern may include some image frames that are skipped entirely, so that no image data or pixel data is read out during those frames. In another illustrative example, the third readout pattern only captures image data and/or pixel data from every other image frame of the image frames.

FIG. 10C is a conceptual diagram 1000C illustrating a transition from capture of image frames with the second resolution 1062 via the second readout pattern 1057 to capture of image frames with the first resolution 1060 via the first readout pattern 1055 using the rolling shutter imaging system with the four groups of pixels. The image frames, in order from earlier to later along the time axis 1090, include an image frame 1054A, an image frame 1054B, an image frame 1054C, an image frame 1054D, an image frame 1054E, an image frame 1054F, an image frame 1054G, and an image frame 1054H. As in FIGS. 10A-10B, each image frame is illustrated a column of parallelograms along the time axis 1090 that includes the first group 1010, the second group 1020, the third group 1030, and the fourth group 1040.

The first five image frames—including the image frame 1054A, the image frame 1054B, the image frame 1054C, the image frame 1054D, and the image frame 1054E—are captured at the second resolution 1062 according to the second readout pattern 1057, similarly to FIG. 10B. At a time along the time axis 1090 after capture of the image frame 1054E, the imaging system with the image sensor 1070 receives a request 1085 for image data 1087 at the first resolution 1060. After the request 1085 is received, the imaging device transitions from the second readout pattern 1057 to the first readout pattern 1055. The imaging system captures the image frame 1054G and the image frame 1054H according to the first readout pattern 1055, similarly to FIG. 10A. Because every group of pixels is reset at every image frame even if it is not read out, the transition between the second readout pattern 1057 and the first readout pattern 1055 can be instantaneous, or nearly instantaneous, since there is no need to delay until a reset can be performed. Resetting for every image frame does not add significant delay. In some examples (not pictured), the image sensor 1070 of the imaging system can skip resetting for certain image frame(s), for example to reset every other image frame.

Capture of the image frame 1054F includes readout of more of the groups than under the second readout pattern 1057, and less of the groups than under the first readout pattern 1055, because the request 1085 is received partway into capture and/or readout from the different groups of pixels of the image frame 1054F. In an illustrative example (not pictured), the request 1085 can be received earlier than is illustrated in FIG. 10C, and the image frame 1054F can be captured fully according to the first readout pattern 1055, and thus can also read out the first group 1010 as a result. In another illustrative example (not pictured), the request 1085 can be received later than is illustrated in FIG. 10C, and the image frame 1054F can be captured fully according to the second readout pattern 1057, and thus can also skip readout of the third group 1030 and of the fourth group 1040 as a result.

In some examples (not pictured), the imaging system with the image sensor 1070 can additionally or alternatively transition from the first readout pattern 1055 to the second readout pattern 1057. In some examples (not pictured), the imaging system with the image sensor 1070 can additionally or alternatively transition to and/or from one of the third readout patterns discussed with respect to FIG. 10B.

In some examples, the request 1085, or a similar request to transition from one readout pattern to another, can be triggered by a manual request received via a user interface. In some examples, the request 1085 can be triggered automatically by a detection, by the imaging device with the image sensor 1070, of one or more objects in one or more of the image frames 1054A-1054E captured under the second readout pattern 1057 (and/or within a combined image that is generated based on pixel data from different groups of pixels read out from different image frames). The detection can include any type of detection discussed with respect to the detection 752 of FIG. 7. The detection can include, for example, a detection of a glyph, as in the example 754 of the detection 752 of FIG. 7. As in FIG. 7, the detection of FIG. 10C can include, for example, a detection of an object using an object detection algorithm. The object can include, for example, a glyph, a portion of a person (e.g., a person's face, a person's body), a portion of a vehicle (e.g., including a license plate), a portion of an animal (e.g., an animal's face, an animal's body), one or more alphanumeric characters (e.g., arranged in a string of alphanumeric characters), or a combination thereof. The object detection algorithm can include a feature detection algorithm, a feature recognition algorithm, an object detection algorithm, an object recognition algorithm, a facial detection algorithm, a facial recognition algorithm, a person detection algorithm, a person recognition algorithm, an optical character detection algorithm, an optical character recognition (OCR) algorithm, a classifier, an optical glyph detector, an optical glyph scanner, or a combination thereof.

In some examples, the object is an object and/or image region having a saliency exceeding a saliency threshold. The imaging system can determine the saliency of the object and/or image region at least in part by generating a saliency map based on one or more of the image frames 1054A-1054E captured under the second readout pattern 1057 (and/or within a combined image that is generated based on pixel data from different groups of pixels read out from different image frames). In some examples, the imaging system can generate the saliency map based on these image (s) by inputting these image(s) as input images to a trained machine learning model. The trained machine learning model is trained to output a saliency map based on one or more input images. In some examples, the imaging system can determine the saliency of the object and/or image region at least in part based on determining that the image(s) include a movement (e.g., exceeding a movement threshold) compared to a previous image of the one or more of the image frames 1054A-1054E. In some examples, the imaging system can determine the saliency of the object and/or image region at least in part based on identifying that the object or image region has unique colors or patterns not found elsewhere in the image(s). In some examples, the imaging system can determine the saliency of the object and/or image region at least in part based on a distance (e.g., in a color space and/or luminosity space) between color values and/or luminosity values corresponding to pixel of the object and/or image region and color values and/or luminosity values of one or more other pixels in the image(s). In some examples, the imaging system can identify a saliency for a given pixel in the image(s) at least in part based on a distance (e.g., in a color space and/or luminosity space) between color values and/or luminosity values corresponding to the given pixel in the image and color values and/or luminosity values of one or more other pixels in the image(s) (e.g., other than the given pixel). In some examples, the color values and/or luminosity values of the one or more pixels in the image can include an average of the color values and/or luminosity values the pixels in the image, so that the imaging system finds the distance between the color values and/or luminosity values for the given pixel and the average of the color values and/or luminosity values the pixels in the image. In some examples, the color values and/or luminosity values of the one or more pixels in the image can include an average of the color values and/or luminosity values the pixels in the image other than the given pixel, so that the imaging system finds the distance between the color values and/or luminosity values for the given pixel and the average of the color values and/or luminosity values the pixels in the image other than the given pixel.

Figure 11:
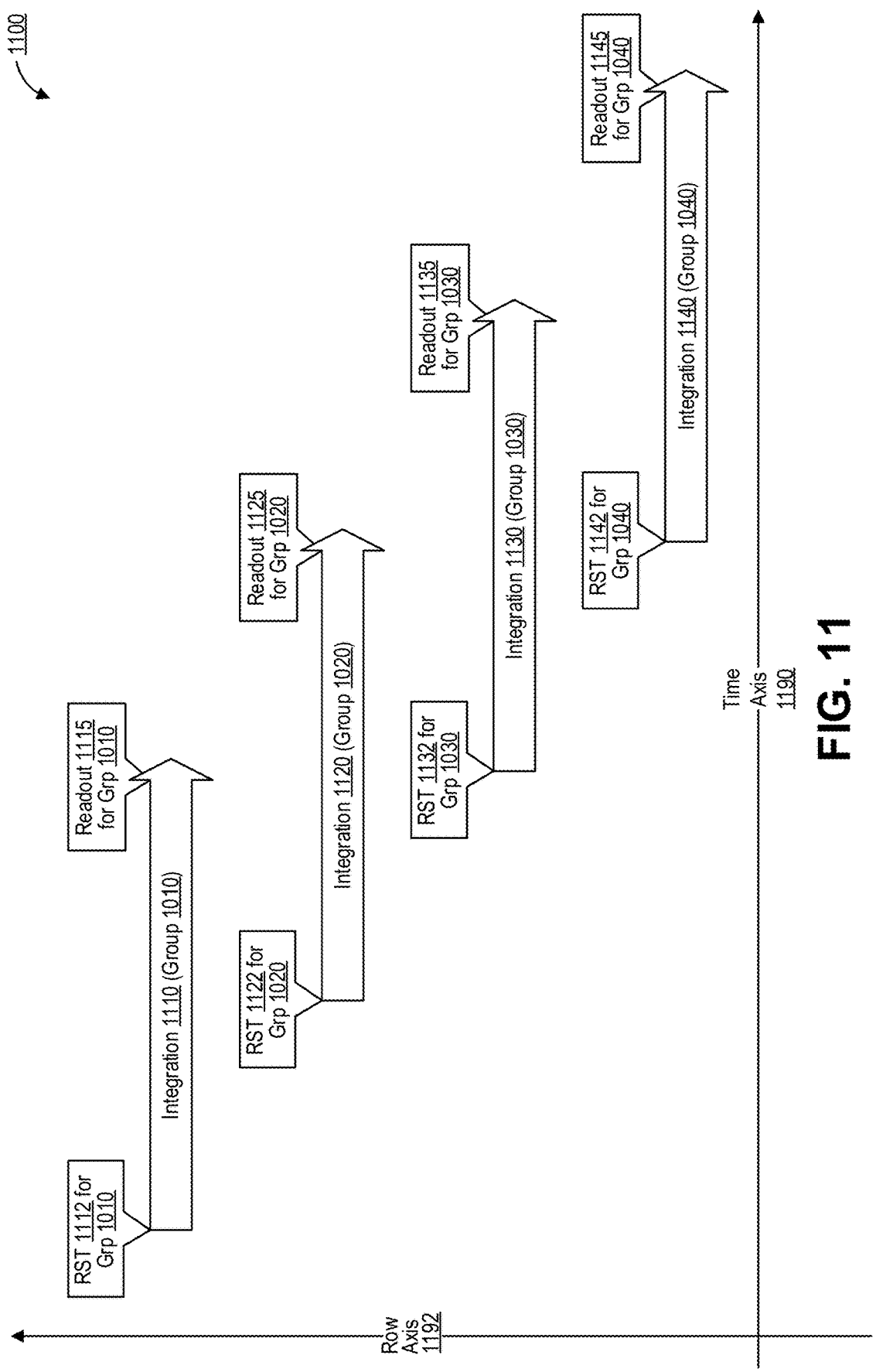
FIG. 11 is a conceptual diagram illustrating a rolling shutter readout pattern using a rolling shutter imaging system, in accordance with some examples.

FIG. 11 is a conceptual diagram illustrating a rolling shutter readout pattern 1100 using a rolling shutter imaging system. The rolling shutter readout pattern 1100 is illustrated relative to a horizontal time axis 1190 along which time flows from left to right, and relative to a vertical row axis 1192 indicative of different rows of the image sensor. The time axis 1190 may be referred to as a timeline. Different rows of the image sensor are depicted along different horizontal lines perpendicular to the vertical row axis 1192 and intersecting the vertical row axis 1192 at different points. The rolling shutter readout pattern 1100 includes a reset 1112 for group 1010 followed by a readout 1115 for group 1010, with integration 1110 for group 1010 in between. The rolling shutter readout pattern 1100 includes a reset 1122 for group 1020 followed by a readout 1125 for group 1020, with integration 1120 for group 1020 in between. The rolling shutter readout pattern 1100 includes a reset 1132 for group 1030 followed by a readout 1135 for group 1030, with integration 1130 for group 1030 in between. The rolling shutter readout pattern 1100 includes a reset 1142 for group 1040 followed by a readout 1145 for group 1040, with integration 1140 for group 1040 in between. Different groups can be reset at different times. There is overlap in time between the integrations of neighboring groups.

Figure 12:
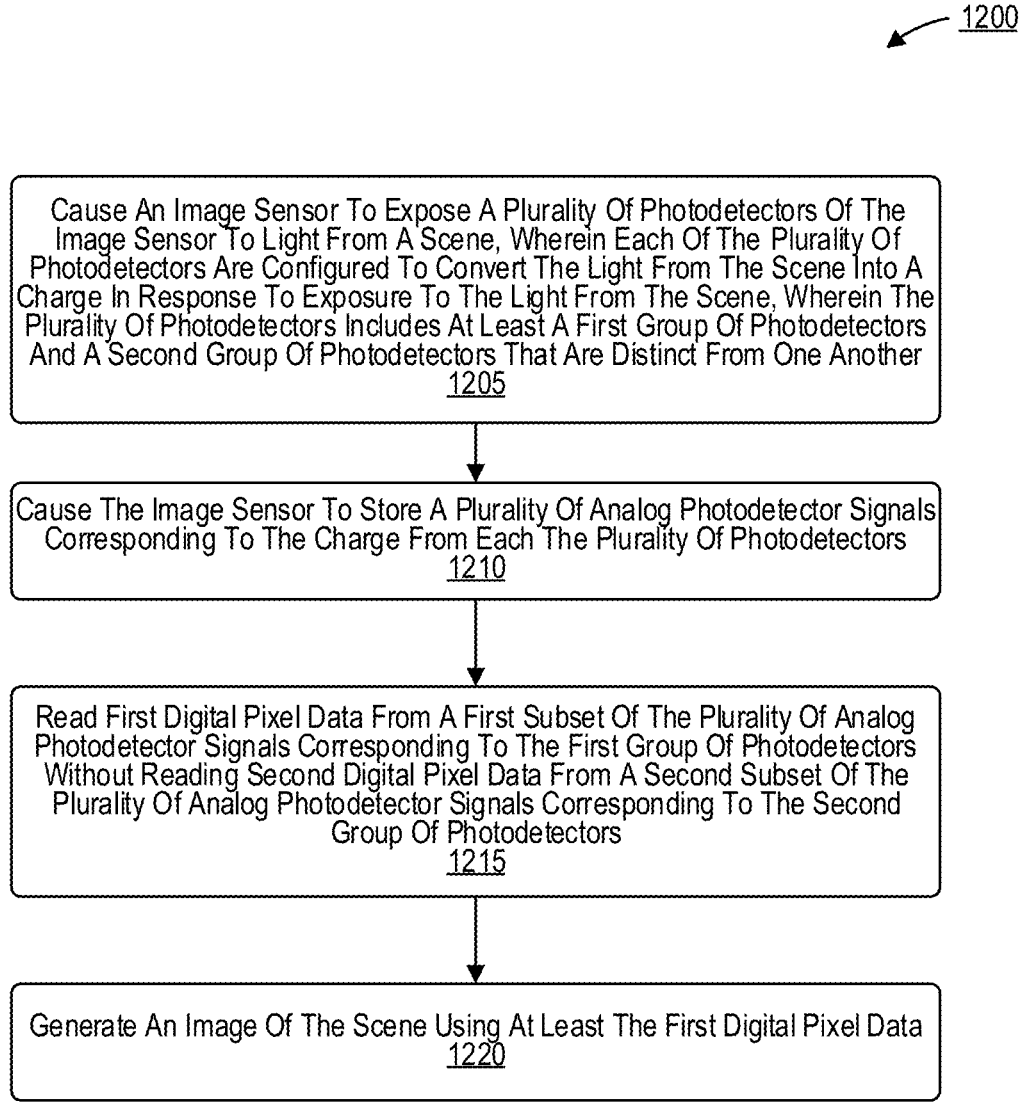
FIG. 12 is a flow diagram illustrating operations for imaging, in accordance with some examples.

FIG. 12 is a flow diagram illustrating operations for imaging. The process 1200 may be performed by an imaging system. In some examples, the imaging system can include, for example, the image capture and processing system 100, the image capture device 105A, the image processing device 105B, the image processor 150, the ISP 154, the host processor 152, the imaging system of FIG. 2 that performs at least a subset of the process 200, an imaging system that includes the image sensor 310 and/or the storage array 320, an imaging system that includes the image sensor 410 and the rolling shutter 420, an imaging system that includes the image sensor 501, an imaging system that includes the image sensor 601A, an imaging system with the rolling shutter of FIG. 4A, an imaging system with the global shutter of FIG. 4B, an imaging system with the image sensor 501 of FIGS. 5A-5C, an imaging system with the image sensor 601A of FIG. 6A, an imaging system with the image sensor 601B of FIG. 6B, an imaging system that captures at least a subset of the images of FIG. 7 (e.g., image 725, image 735, image 745, image 755), an imaging system that includes the image sensor 830 of FIG. 8, an imaging system that performs at least a subset of the image captures of FIG. 9 (e.g., image capture 920, image capture 925, image capture 930), an imaging system that performs readout according to the first readout pattern 1055 of FIGS. 10A and 10C, an imaging system that performs readout according to the second readout pattern 1057 of FIGS. 10B-10C, an imaging system that applies the rolling shutter readout pattern 1100 of FIG. 11, the computing system 1300, the processor 1310, or a combination thereof.

At operation 1205, the imaging system is configured to, and can, cause an image sensor to expose a plurality of photodetectors of the image sensor to light from a scene. Each of the plurality of photodetectors are configured to convert the light from the scene into a charge in response to exposure to the light from the scene. The plurality of photodetectors includes at least a first group of photodetectors and a second group of photodetectors that are distinct from one another. In some examples, the imaging system includes the image sensor. Examples of the image sensor include the image sensor 130, an image sensor that includes the photodetector 215, the image sensor 310, an image sensor of the imaging system of FIG. 4A, an image sensor of the imaging system of FIG. 4B, the image sensor 501, the image sensor 601A, the image sensor 601B, an image sensor of the imaging system of FIG. 7, the image sensor 830, an image sensor of the imaging system of FIG. 9, an image sensor of the imaging system of any of FIGS. 10A-10C, an image sensor of the imaging system of FIG. 11, another image sensor, or a combination thereof. Examples of the photodetectors include the photodetector 215, the photodetectors P0-P63 of the image sensor 310, photodetectors corresponding to the pixels of the image sensor 501, photodetectors corresponding to the pixels of the image sensor 601A, photodetectors corresponding to the pixels of the image sensor 601B, photodetectors corresponding to the pixels of the image sensor 830, photodetectors corresponding to the pixels of the image sensor(s) of any of FIG. 10A-10C, or a combination thereof. Examples of the scene include the scene 110. Examples of the distinct groups of photodetectors in the context of FIGS. 5A-5C and 6A-6B include the first group 505, the second group 510, the third group 515, a pixel in the fourth group 520, the fifth group 525, the sixth group 530, the seventh group 535, a pixel in an eighth group 540, the ninth group 545, the tenth group 550, a pixel in an eleventh group 555, the twelfth group 560, the thirteenth group 565, the fourteenth group 570, the fifteenth group 575, and the sixteenth group 580. Examples of the distinct groups of photodetectors in the context of FIGS. 10A-10C include the first group 1010, the second group 1020, the third group 1030, and the fourth group 1040. Causing the image sensor to expose the photodetectors of the image sensor to the light from the scene can include actuating one or more actuators and/or motors to open a shutter associated with the image sensor and/or to open an aperture associated with the image sensor. Causing the image sensor to expose the photodetectors of the image sensor to the light from the scene can be followed by causing the image sensor to end or terminate the exposure of the photodetectors of the image sensor to the light from the scene, which can include actuating one or more actuators and/or motors to close the shutter associated with the image sensor and/or to close the aperture associated with the image sensor.

In some aspects, the plurality of photodetectors includes a plurality of photodiodes. In some aspects, the plurality of photodetectors of the image sensor includes a plurality of image photodetectors (e.g., image photodiodes) and a plurality of focus photodetectors (e.g., focus photodiodes). The plurality of focus photodetectors are configured for phase detection autofocus (PDAF). The first group of photodetectors includes a first subset of the plurality of image photodiodes. The first group of photodetectors can also include a first subset of the plurality of focus photodetectors. The second group of photodetectors includes a second subset of the plurality of image photodiodes. The second group of photodetectors can also include a second subset of the plurality of focus photodetectors.

At operation 1210, the imaging system is configured to, and can, store a plurality of analog photodetector signals corresponding to the charge from each the plurality of photodetectors. In some aspects, the image sensor includes a storage array with a plurality of storage units. To store each of the plurality of analog photodetector signals corresponding to the charge from each the plurality of photodetectors, the imaging system (e.g., the image sensor) is configured to, and can, store each of the plurality of analog photodetector signals in one of the plurality of storage units of the storage array. Examples of the storage array include the storage array 265 and the storage array 320. Examples of the storage units include the storage unit 260 and the storage units S0-S63 of the storage array 320.

In some aspects, an analog photodetector signal of the plurality of analog photodetector signals is indicative of a voltage corresponding to the charge from one of the plurality of photodetectors. Examples of the analog photodetector signal include the analog photodetector signal 250.

In some aspects, the imaging system (e.g., the image sensor) is configured to, and can, reset each of the plurality of photodetectors of the image sensor and/or the plurality of storage units of the storage array before exposing the plurality of photodetectors to the light from the scene at operation 1205. Examples of resetting the photodetectors and/or the storage units include reset block 404, reset block 414, reset block 424, reset block 434, reset block 444, reset block 454, reset block 464, reset block 474, reset 722, reset 732, reset 742, reset using reset pointer 840, reset using reset pointer 940, reset using the resets (indicated by dashed lines) of any of FIGS. 10A-10C, reset 1112, reset 1122, reset 1132, reset 1142, or a combination thereof.

At operation 1215, the imaging system is configured to, and can, read first digital pixel data from a first subset of the plurality of analog photodetector signals corresponding to the first group of photodetectors without reading second digital pixel data from a second subset of the plurality of analog photodetector signals corresponding to the second group of photodetectors. Examples of the first digital pixel data include the digital pixel data 255. Reading of the first digital pixel data can be referred to as readout of the first digital pixel data. Examples of the reading, or readout, of the first digital pixel data, include readout by the image processing device 105A from the image capture device 105A, readout of the digital pixel data 255, readout from the image sensor 310, readout from the storage array 320, readout block 408, readout block 418, readout block 428, readout block 438, readout block 448, readout block 458, readout block 468, readout block 478, sparse readout 586, sparse readout 592, the three readouts of FIG. 6A, the two readouts of FIG. 6B, first sparse readout 728, second sparse readout 738, third sparse readout 748, dense readout 758, readout according to readout pointer 845, readout according to readout pointer 945, readout according to the first readout pattern 1055, readout according to the second readout pattern 1057, readout 1115, readout 1125, readout 1135, readout 1145, or a combination thereof.

In some examples, the imaging system may include a connector coupled to the image sensor. Reading the first digital pixel data can include receiving the first digital pixel data using the connector. The connector can include a port, a jack, a wire, an input/output (I/O) pin, a conductive trace on a printed circuit board (PCB), any other type of connector discussed herein, or some combination thereof. In some examples, the imaging system can include the image sensor. In some examples, causing the image sensor to expose the plurality of photodetectors of the image sensor to light from the scene, as in operation 1205, can include sending a signal from one or more processors of the imaging system to the image sensor over the connector. In some examples, causing the image sensor to store the plurality of analog photodetector signals corresponding to the charge from each the plurality of photodetectors, as in operation 1210, can include sending a signal from one or more processors of the imaging system to the image sensor over the connector. In some examples, reading first digital pixel data from a first subset of the plurality of analog photodetector signals corresponding to the first group of photodetectors, as in operation 1215, includes receiving and/or reading the first digital pixel data and/or the a first subset of the plurality of analog photodetector signals (and/or a processed variant thereof) over the connector.

In some aspects, to read the first digital pixel data from the first subset of the plurality of analog photodetector signals corresponding to the first group of photodetectors without reading the second digital pixel data from the second subset of the plurality of analog photodetector signals corresponding to the second group of photodetectors, the imaging system is configured to, and can, use imaging circuitry to selectively apply a modification to the first subset of the plurality of analog photodetector signals without applying the modification to the second subset of the plurality of analog photodetector signals. The modification can include, for example, amplification of the plurality of analog photodetector signals via one or more analog gain amplifiers, such as the amplifier 230. The modification can include, for example, filtering of the plurality of analog photodetector signals via one or more filters, such as a high-pass filter, a low-pass filter, a band-pass filter, or a combination thereof. Examples of modification using such filter(s) is discussed with respect to FIG. 2. The modification can include, for example, conversion of the plurality of analog photodetector signals into digital pixel data via one or more analog to digital converters (ADCs), such as the ADC 235 and/or the ADC 132. The modification can include, for example, processing operations performed by the ISP 154, such as demosaicing, digital gain, missing pixel correction, bad pixel correction, brightness adjustment, contrast adjustment, saturation adjustment, histogram adjustment, color space conversion, automatic white balance adjustment, automatic black balance adjustment, downsampling, upsampling, additional image processing operations, or a combination thereof.

In some aspects, the imaging system (e.g., the image sensor and/or imaging circuitry associated with the image sensor) includes one or more amplifiers. Examples of the one or more amplifiers include the amplifier 230. To read the first digital pixel data from the first subset of the plurality of analog photodetector signals, the imaging system is configured to, and can, cause the one or more amplifiers to amplify each of the first subset of the plurality of analog photodetector signals corresponding to the first group of photodetectors into a plurality of amplified analog photodetector signals. Examples of the amplified analog photodetector signals include the analog photodetector signal 250, once amplified by the amplifier 230. In some examples, the first digital pixel data is based on the plurality of amplified analog photodetector signals. Examples of the digital pixel data here include the digital pixel data 255 as based on the photodetector signal 250 that is amplified by the amplifier 230.

In some aspects, the imaging system (e.g., the image sensor) includes or more analog to digital converters (ADCs). Examples of the one or more ADCs include the ADC 132 and the ADC 235. To read the first digital pixel data from the first subset of the plurality of analog photodetector signals, the imaging system is configured to, and can, cause the one or more ADCs to convert a plurality of analog signals based on the first subset of the plurality of analog photodetector signals corresponding to the first group of photodetectors into digital signals. The first digital pixel data is based on the digital signals. Examples of the digital signals include the digital pixel data 255 and/or an output of the ADC 235 to the image processor 240.

In some aspects, the imaging system is configured to, and can, generate the first digital pixel data based on the digital signals at least in part by processing the digital signals using one or more image processing operations. The one or more image processing operations can be performed by an image processor, such as the ISP 154, the host processor 152, the image processor 150, the image processor 240, the processor 1310, or a combination thereof. Examples of generating the first digital pixel data by processing the digital signals using the one or more image processing operations executed by the by the image processor includes generating the digital pixel data 255 by processing digital signals output by the ADC 235 using the one or more image processing operations executed by the image processor 240. The one or more image processing operations can include digital gain, demosaicking, pixel interpolation, missing pixel correction, bad pixel correction, brightness adjustment, contrast adjustment, saturation adjustment, histogram adjustment, color space conversion, automatic white balance adjustment, automatic black balance adjustment, downsampling, upsampling, or a combination thereof. In some aspects, the plurality of analog signals include a plurality of amplified analog photodetector signals. One or more amplifiers can generate the plurality of amplified analog photodetector signals at least in part by amplifying the first subset of the plurality of analog photodetector signals corresponding to the first group of photodetectors. Examples of the one or more amplifiers include the amplifier 230.

At operation 1220, the imaging system is configured to, and can, generate an image of the scene using at least the first digital pixel data. Examples of the image include an image captured by the image capture and processing system 100, an image captured via the image capture 270 based on the digital pixel data 255, an image captured using the image sensor 310 and/or the storage array 320, an image captured via an imaging device with a rolling shutter as in FIG. 4A, an image captured via an imaging device with a global shutter as in FIG. 4B, an image captured using the image sensor 501 (e.g, based on digital pixel data from one or more of groups 505-580, without digital pixel data from a different one or more of the groups 505-580), the image 585 with the first resolution 587, the image 590 with the first resolution 587, the image 610 with the first resolution 612, the first image 620 with the second resolution 622, the second image 630 with the second resolution 622, an image captured using the image sensor 601A (e.g, based on digital pixel data from one or more of groups 505-580, without digital pixel data from a different one or more of the groups 505-580), an image captured using the image sensor 601B (e.g, based on digital pixel data from one or more of groups 505-580, without digital pixel data from a different one or more of the groups 505-580), the first image 725 with the first resolution 727, the second image 735 with the first resolution 727, the third image 745 with the first resolution 727, the image 755 with the second resolution 757, an image captured using the image sensor 830 based on pixel data read out according to the readout pointer 845, an image captured using the image capture 920 based on pixel data read out according to the readout pointer 945, an image captured using the image capture 925 based on pixel data read out according to the readout pointer 945, an image captured using the image capture 930 based on pixel data read out according to the readout pointer 945, an image captured according to the first readout pattern 1055, an image captured according to the second readout pattern 1057, an image captured using the image sensor 1070, an image captured according to the readout 1115, an image captured according to the readout 1125, an image captured according to the readout 1135, an image captured according to the readout 1145, or a combination thereof.

In some aspects, the imaging system (e.g., the image sensor) is configured to, and can, reset the plurality of photodetectors of the image sensor and/or the plurality of storage units of the storage array after capturing the image. Examples of resetting the photodetectors and/or the storage units include reset block 404, reset block 414, reset block 424, reset block 434, reset block 444, reset block 454, reset block 464, reset block 474, reset 722, reset 732, reset 742, reset using reset pointer 840, reset using reset pointer 940, reset using the resets (indicated by dashed lines) of any of FIGS. 10A-10C, reset 1112, reset 1122, reset 1132, reset 1142, or a combination thereof.

In some aspects, the imaging system is configured to, and can, analyze the image using an object detection algorithm. The object detection algorithm can include a feature detection algorithm, a feature recognition algorithm, an object detection algorithm, an object recognition algorithm, a facial detection algorithm, a facial recognition algorithm, a person detection algorithm, a person recognition algorithm, an optical character detection algorithm, an optical character recognition (OCR) algorithm, a classifier, an optical glyph detector, an optical glyph scanner, or a combination thereof. The object detection algorithm can be executed by one or more processors of the imaging system. The object detection algorithm can include one or more trained machine learning (ML) systems that can receive one or more input images (e.g., including the image) as input, and can determine whether or not the one or more input images depict an object of a particular type, such as an optical glyph, a face, a person, at least a portion (e.g., a hand, a face) of a person, one or more alphanumeric characters (e.g., arranged in a string of text), at least a portion of a vehicle, at least a portion of an animal, at least a portion of a plant, at least a portion of a structure (e.g., a building), or a combination thereof. The one or more trained ML systems can include one or more trained ML models, one or more trained neural networks (NNs), one or more trained convolutional neural networks (CNNs), one or more trained time delay neural networks (TDNNs), one or more deep networks, one or more deep belief nets (DBNs), one or more recurrent neural networks (RNNs), one or more generative adversarial networks (GANs), one or more trained support vector machines (SVMs), one or more trained random forests (RFs), or a combination thereof.

In some examples, if the object detection algorithm detects an object, the imaging system can read the second digital pixel data from the second subset of the plurality of analog photodetector signals corresponding to the second group of photodetectors. In some examples, if the object detection algorithm fails to detect any object of the object type for at least a threshold period of time, the imaging system can reset the plurality of photodetectors of the image sensor and/or the plurality of storage units of the storage array. In some examples, the threshold period of time is a period of time ending at an instant in time at which the reset of the photodetectors and/or storage array is scheduled to be performed by the imaging system. In some examples, the imaging system (e.g., the image sensor) is be configured to, and can, reset the plurality of photodetectors of the image sensor and the plurality of storage units of the storage array automatically in response to a lack of a detection of one or more objects in the image by the object detection algorithm.

In some aspects, the imaging system is configured to, and can, determine whether to read the second digital pixel data from the second subset of the plurality of analog photodetector signals corresponding to the second group of photodetectors after generating the image at operation 1220. In some aspects, the imaging system is configured to, and can, determine whether to read the second digital pixel data from the second subset of the plurality of analog photodetector signals corresponding to the second group of photodetectors based on the image that is generated at operation 1220. For instance, the determination as to whether to read the second digital pixel data can be based on an analysis of the image that is generated at operation 1220 using the object detection algorithm.

In some aspects, the imaging system is configured to, and can, read the second digital pixel data from the second subset of the plurality of analog photodetector signals corresponding to the second group of photodetectors after reading the first digital pixel data from the first subset of the plurality of analog photodetector signals corresponding to the first group of photodetectors. Examples of the second digital pixel data include the digital pixel data 255. Reading of the second digital pixel data can be referred to as readout of the second digital pixel data. Examples of the reading, or readout, of the second digital pixel data, include readout by the image processing device 105A from the image capture device 105A, readout of the digital pixel data 255, readout from the image sensor 310, readout from the storage array 320, readout block 408, readout block 418, readout block 428, readout block 438, readout block 448, readout block 458, readout block 468, readout block 478, sparse readout 586, sparse readout 592, the three readouts of FIG. 6A, the two readouts of FIG. 6B, first sparse readout 728, second sparse readout 738, third sparse readout 748, dense readout 758, readout according to readout pointer 845, readout according to readout pointer 945, readout according to the first readout pattern 1055, readout according to the second readout pattern 1057, readout 1115, readout 1125, readout 1135, readout 1145, or a combination thereof.

In some aspects, the readout of the second digital pixel data by the imaging system is based on storage of the plurality of analog photodetector signals at operation 1210. An example of the readout of the second digital pixel data by the imaging system based on storage of the analog photodetector signals can include readout of the digital pixel data 255 based on a stored analog photodetector signal 250 stored in the storage unit 260 of the storage array 265, in some cases amplified by the amplifier 230, converted by the ADC 235, and in some cases processed by the image processor 240. In some aspects, the imaging system is configured to, and can, generate a second image of the scene using at least the first digital pixel data and the second digital pixel data. The second image has a second resolution that is different than a first resolution of the image that is generated at operation 1220. In some aspects, the second image has a second resolution that is higher than (e.g., greater than) a first resolution of the image that is generated at operation 1220. In some aspects, the imaging system is configured to, and can, read the second digital pixel data from the second subset of the plurality of analog photodetector signals corresponding to the second group of photodetectors after generating the image of the scene in operation 1220.

In some aspects, the imaging system is configured to, and can, identify that the image includes an area with a saliency exceeding a saliency threshold. For example, the imaging system can generate a saliency map based on the image. In some examples, the imaging system can generate the saliency map by using the image as an input to one or more trained machine learning (ML) systems that are trained to generate saliency maps corresponding to input images input into the one or more trained machine learning (ML) systems. In some examples, the imaging system can generate the saliency map by identifying areas with movement compared to a previous image captured by image sensor before the image. In some examples, the imaging system can generate the saliency map by identifying areas with unique colors or patterns not found elsewhere in the image. In some examples, the imaging system can identify a saliency for a given pixel in the image at least in part based on a distance (e.g., in a color space and/or luminosity space) between color values and/or luminosity values corresponding to the given pixel in the image and color values and/or luminosity values of one or more other pixels in the image (e.g., other than the given pixel). In some examples, the color values and/or luminosity values of the one or more pixels in the image can include an average of the color values and/or luminosity values the pixels in the image, so that the imaging system finds the distance between the color values and/or luminosity values for the given pixel and the average of the color values and/or luminosity values the pixels in the image. In some examples, the color values and/or luminosity values of the one or more pixels in the image can include an average of the color values and/or luminosity values the pixels in the image other than the given pixel, so that the imaging system finds the distance between the color values and/or luminosity values for the given pixel and the average of the color values and/or luminosity values the pixels in the image other than the given pixel. The imaging system can identify the area with the saliency exceeding the saliency threshold using the saliency map. In some aspects, the imaging system is configured to, and can, read the second digital pixel data from the second subset of the plurality of analog photodetector signals corresponding to the second group of photodetectors in response to identifying that the image includes the area with the saliency exceeding the saliency threshold. In some examples, if the imaging system generates the saliency map of the image and identifies that no area in the image has a saliency exceeding the saliency threshold, then the imaging system can reset the photodiodes and/or the storage array. Identification of the area with the saliency exceeding the saliency threshold, or lack thereof, can be a trigger for some of the same operations as the object detection using the object detection algorithm, or lack thereof.

In some aspects, the imaging system is configured to, and can, identify that the image depicts a movement relative to a previous image of the scene captured by the image sensor, the movement exceeding a movement threshold. In some examples, the image sensor may capture a sequence of images. For instance, the sequence of image can be video frames of a video. In some examples, the previous image is an image in the sequence of images that is immediately before the image in the sequence of image, with no additional images in between the previous image and the image in the sequence of images. In some examples, the previous image is an image in the sequence of images that is more than one image before the image in the sequence of images, with one or more additional images in between the previous image and the image in the sequence of images. In the context of FIG. 7, if the image generated in operation 1220 is the third image 745 with the first resolution 727, then the previous image can be the first image 725 with the first resolution 727, the second image 735 with the first resolution 727, or the image 755 with the second resolution 757. In the context of FIG. 7, if the image generated in operation 1220 is the second image 735 with the first resolution 727, then the previous image can be the first image 725 with the first resolution 727. The movement can include a movement of an object, such as a movement of a person from the previous image to the image. The movement threshold can indicate a minimum distance (e.g., in pixels) for the object to move between the previous image and the image. The imaging system is configured to, and can, read the second digital pixel data from the second subset of the plurality of analog photodetector signals corresponding to the second group of photodetectors in response to identifying that the image depicts the movement relative to the previous image of the scene captured by the image sensor, the movement exceeding the movement threshold.

In some aspects, the imaging system is configured to, and can, determine whether to read third digital pixel data from a third subset of the plurality of analog photodetector signals corresponding to a third group of photodetectors after generating the second image and based on the second image. The plurality of photodetectors includes the third group of photodetectors that are distinct from the first group of photodetectors and the second group of photodetectors. The image is generated in operation 1220 without the third digital pixel data. The second image is also generated without the third digital pixel data In some aspects, the imaging system is configured to, and can, read third digital pixel data from a third subset of the plurality of analog photodetector signals corresponding to a third group of photodetectors after reading the second digital pixel data from the second subset of the plurality of analog photodetector signals corresponding to the second group of photodetectors. Reading the third digital pixel data is based on storage of the plurality of analog photodetector signals at operation 1210. An example of the readout of the third digital pixel data by the imaging system based on storage of the analog photodetector signals can include readout of the digital pixel data 255 based on a stored analog photodetector signal 250 stored in the storage unit 260 of the storage array 265, in some cases amplified by the amplifier 230, converted by the ADC 235, and in some cases processed by the image processor 240. The plurality of photodetectors includes the third group of photodetectors that are distinct from the first group of photodetectors and the second group of photodetectors. The image is generated in operation 1220 without the third digital pixel data. The second image is also generated without the third digital pixel data. The imaging system is configured to, and can, generate a third image of the scene using at least the first digital pixel data and the second digital pixel data and the third digital pixel data. The third image has a third resolution that is higher than (e.g., greater than) the second resolution of the second image and/or the first resolution of the first image that is generated at operation 1220. In some aspects, the imaging system is configured to, and can, read the third digital pixel data from the third subset of the plurality of analog photodetector signals corresponding to the third group of photodetectors after generating the image of the scene in operation 1220 and/or after generating the second image.

Examples of the third digital pixel data include the digital pixel data 255. Reading of the third digital pixel data can be referred to as readout of the third digital pixel data. Examples of the reading, or readout, of the first third pixel data, include readout by the image processing device 105A from the image capture device 105A, readout of the digital pixel data 255, readout from the image sensor 310, readout from the storage array 320, readout block 408, readout block 418, readout block 428, readout block 438, readout block 448, readout block 458, readout block 468, readout block 478, sparse readout 586, sparse readout 592, the three readouts of FIG. 6A, the two readouts of FIG. 6B, first sparse readout 728, second sparse readout 738, third sparse readout 748, dense readout 758, readout according to readout pointer 845, readout according to readout pointer 945, readout according to the first readout pattern 1055, readout according to the second readout pattern 1057, readout 1115, readout 1125, readout 1135, readout 1145, or a combination thereof.

In some aspects, the imaging system is configured to, and can, identify that the image includes a depiction of an object, for instance using an object detection algorithm. The imaging system is configured to, and can, read the second digital pixel data from the second subset of the plurality of analog photodetector signals corresponding to the second group of photodetectors in response to identifying that the image includes the depiction of the object. In some aspects, the object is a glyph that optically encodes information. The glyph can include at least one linear barcode, at least one 2D code, or a combination thereof. In some aspects, the object includes at least a portion of a person and/or an animal. For instance, the object can include a face, a hand, an arm, a finger, a fingerprint, a handprint, a leg, a foot, a footprint, an eye, a head, a gait, a pose, or a combination thereof. In some aspects, the object includes at least a portion of a vehicle. For instance, the object can include a shape of the vehicle, a license plat of the vehicle, a set of headlights of the vehicle, or a combination thereof. In some aspects, the object includes one or more alphanumeric characters. For instance, the one or more alphanumeric characters can be arranged in a string, for example on a sheet of paper, a sign, a card, a display, a projection surface, or a combination thereof.

In some aspects, the plurality of photodetectors of the image sensor are arranged according to a lattice of blocks that each contain a respective subset of the plurality of photodetectors. Each block of the lattice of blocks includes at least one photodetector of the first group of photodetectors and at least one photodetector of the second group of photodetectors. Examples of the lattice of blocks include the lattice 502 of blocks 504, the lattice 602A of blocks 603A, the lattice 602B of blocks 603B, the lattice 1072 of blocks 1074 of pixels of FIG. 10A-10C, or combinations thereof.

In some aspects, the first group of photodetectors is arranged across the image sensor according to a first pattern, and the second group of photodetectors is arranged across the image sensor according to a second pattern. The first pattern and the second pattern correspond to one or more lattices. The first pattern may repeat horizontally and/or vertically according to the one or more lattices. The second pattern may repeat horizontally and/or vertically according to the one or more lattices. Examples of the one or more lattices include the lattice 502, the lattice 602A, the lattice 602B, the lattice 1072 of blocks 1074 of pixels of FIG. 10A-10C, or combinations thereof. In some examples, the first pattern and the second pattern both correspond to the same lattice. In some examples, the first pattern corresponds to a first lattice, and the second pattern corresponds to a second lattice. The first lattice and the second lattice and be distinct from each other. For example, in the context of FIGS. 5A-5C, the first lattice can be the lattice 502 of blocks 504, while the second lattice is a lattice of clusters of multiple adjacent blocks 504 (e.g., each cluster being a two block by two block cluster of four adjacent blocks 504).

In some aspects, the imaging system is configured to, and can, move a reset pointer across a plurality of reset pointer positions from a first side of the image sensor to a second side of the image sensor at a predetermined speed. An example of movement of the reset pointer across the plurality of reset pointer positions is illustrated in FIG. 8, with the first side of the image sensor being the top of the image sensor 830 of FIG. 8 and the second side of the image sensor being the bottom of the image sensor 830 of FIG. 8. Examples of resetting using a reset pointer also include at least at FIG. 4A, FIG. 9, FIGS. 10A-10C, and FIG. 11. To reset each of the plurality of photodetectors, the imaging system is configured to, and can, reset a first photodetector of the plurality of photodetectors in response to the reset pointer reaching one of the plurality of reset pointer positions at which the first photodetector of the plurality of photodetectors is positioned. and move a readout pointer across a plurality of readout pointer positions from the first side of the image sensor to the second side of the image sensor at the predetermined speed. In some examples, imaging system is configured to, and can, read third digital pixel data corresponding to a second photodetector of the first group of photodetectors in response to the readout pointer reaching one of the plurality of reset pointer positions at which the second photodetector of the first group of photodetectors is positioned. The predetermined speed can be associated with a rolling shutter, such as the rolling shutter of the imaging systems of FIG. 4A, FIG. 8, FIG. 9, FIGS. 10A-10C, and FIG. 11.

In some aspects, the imaging system is configured to, an can, output the image. The imaging system can include a display. To output the image, the imaging system is configured to, and can, display the image using the display. The imaging system can include a communication transceiver. To output the image, the one or more processors is configured to, and can, send the image to a recipient device using the communication transceiver. Examples of displays, communication transceivers, and/or other output devices through which to output the image include the output device 1335, the communications interface 1340, devices connected to the I/O 156, devices connected to the I/O 160, or a combination thereof.

In some aspects, the imaging system can include: means for causing an image sensor to expose a plurality of photodetectors of the image sensor to light from a scene, wherein each of the plurality of photodetectors are configured to convert the light from the scene into a charge in response to exposure to the light from the scene, wherein the plurality of photodetectors includes at least a first group of photodetectors and a second group of photodetectors that are distinct from one another; means for causing the image sensor to store a plurality of analog photodetector signals corresponding to the charge from each the plurality of photodetectors; means for reading first digital pixel data from a first subset of the plurality of analog photodetector signals corresponding to the first group of photodetectors without reading second digital pixel data from a second subset of the plurality of analog photodetector signals corresponding to the second group of photodetectors; and means for generating an image of the scene using at least the first digital pixel data.

The means for exposing the plurality of photodetectors of the image sensor includes the image sensor 130, an image sensor that includes the photodetector 215, the image sensor 310, an image sensor of the imaging system of FIG. 4A, an image sensor of the imaging system of FIG. 4B, the image sensor 501, the image sensor 601A, the image sensor 601B, an image sensor of the imaging system of FIG. 7, the image sensor 830, an image sensor of the imaging system of FIG. 9, an image sensor of the imaging system of any of FIGS. 10A-10C, an image sensor of the imaging system of FIG. 11, the control mechanisms 120, an actuated motor controlling opening and/or closing of a shutter, an actuated motor controlling opening and/or closing of an aperture, or a combination thereof. The means for causing the image sensor to store the plurality of analog photodetector signals includes the storage unit 260, the storage array 265, the storage array 320, the storage units S0-S63, the image sensor 130, an image sensor that includes the photodetector 215, the image sensor 310, an image sensor of the imaging system of FIG. 4A, an image sensor of the imaging system of FIG. 4B, the image sensor 501, the image sensor 601A, the image sensor 601B, an image sensor of the imaging system of FIG. 7, the image sensor 830, an image sensor of the imaging system of FIG. 9, an image sensor of the imaging system of any of FIGS. 10A-10C, an image sensor of the imaging system of FIG. 11, or a combination thereof. The means for reading the first digital pixel data without reading the second digital pixel data includes the amplifier 230, the filter 220, the ADC 235, the storage unit 260, the storage array 265, the image processor 240, readout block 408, readout block 418, readout block 428, readout block 438, readout block 448, readout block 458, readout block 468, readout block 478, sparse readout 586, sparse readout 592, the three readouts of FIG. 6A, the two readouts of FIG. 6B, first sparse readout 728, second sparse readout 738, third sparse readout 748, dense readout 758, readout pointer 845, readout pointer 945, readout according to the first readout pattern 1055, readout according to the second readout pattern 1057, readout 1115, readout 1125, readout 1135, readout 1145, or a combination thereof. The means for generating the image includes the image capture and processing system 100, the image capture device 105A, the image processing device 105B, the image processor 150, the ISP 154, the host processor 152, the imaging system of FIG. 2 that performs at least a subset of the process 200, the image processor 240, an imaging system that includes the image sensor 310 and/or the storage array 320, an imaging system that includes the image sensor 410 and the rolling shutter 420, an imaging system that includes the image sensor 501, an imaging system that includes the image sensor 601A, an imaging system with the rolling shutter of FIG. 4A, an imaging system with the global shutter of FIG. 4B, an imaging system with the image sensor 501 of FIGS. 5A-5C, an imaging system with the image sensor 601A of FIG. 6A, an imaging system with the image sensor 601B of FIG. 6B, an imaging system that captures at least a subset of the images of FIG. 7 (e.g., image 725, image 735, image 745, image 755), an imaging system that includes the image sensor 830 of FIG. 8, an imaging system that performs at least a subset of the image captures of FIG. 9 (e.g., image capture 920, image capture 925, image capture 930), an imaging system that performs readout according to the first readout pattern 1055, an imaging system that performs readout according to the second readout pattern 1057, an imaging system that applies the rolling shutter readout pattern 1100 of FIG. 11, the computing system 1300, the processor 1310, or a combination thereof.

In some examples, the processes described herein (e.g., processes the process of FIG. 7200, the process of FIG. 7, the process of FIG. 8, the process of FIG. 9, the process of FIG. 11, process 1200, and/or other process described herein) may be performed by a computing device or apparatus. In some examples, the processes 200, the process of FIG. 7, the process of FIG. 8, the process of FIG. 9, the process of FIG. 11, and/or 1200 the process of FIG. 7 can be performed by the image capture and processing system 100, the imaging system of FIG. 2, the imaging system of FIG. 4A, the imaging system of FIG. 4B, the imaging system of FIG. 7, or a combination thereof. In another example, the processes 200, the process of FIG. 7, the process of FIG. 8, the process of FIG. 9, the process of FIG. 11, and/or 1200 the process of FIG. 7 can be performed by a computing device with the computing system 1300 shown in FIG. 13.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the processes 200, the process of FIG. 7, the process of FIG. 8, the process of FIG. 9, the process of FIG. 11, and/or 1200 the process of FIG. 7. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 200, the process of FIG. 7, the process of FIG. 8, the process of FIG. 9, the process of FIG. 11, and/or 1200 the process of FIG. Tare illustrated as logical flow diagrams, block diagrams, or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process the process of FIG. 7200, the process of FIG. 7, the process of FIG. 8, the process of FIG. 9, the process of FIG. 11, the process 1200 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 13:
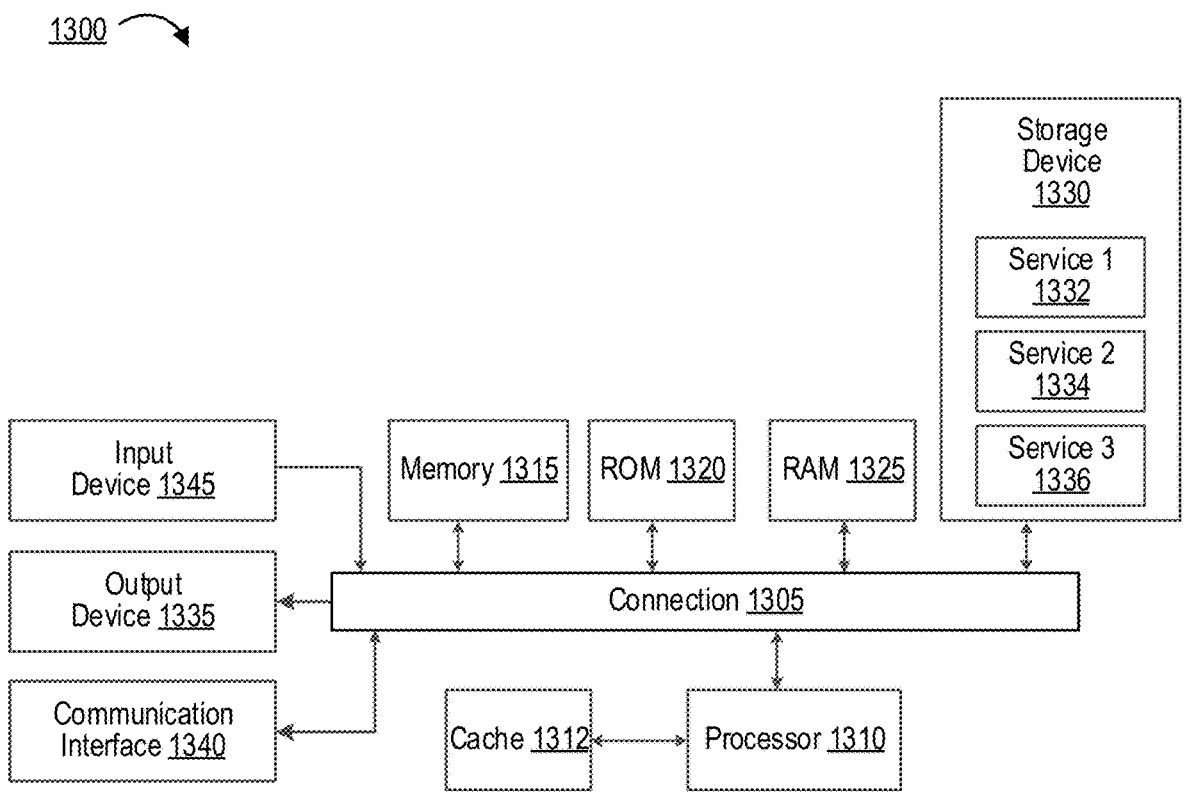
FIG. 13 is a diagram illustrating an example of a computing system for implementing certain aspects described herein.

FIG. 13 is a diagram illustrating an example of a system for implementing certain aspects of the present technology. In particular, FIG. 13 illustrates an example of computing system 1300, which can be for example any computing device making up internal computing system, a remote computing system, a camera, or any component thereof in which the components of the system are in communication with each other using connection 1305. Connection 1305 can be a physical connection using a bus, or a direct connection into processor 1310, such as in a chipset architecture. Connection 1305 can also be a virtual connection, networked connection, or logical connection.

In some embodiments, computing system 1300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1300 includes at least one processing unit (CPU or processor) 1310 and connection 1305 that couples various system components including system memory 1315, such as read-only memory (ROM) 1320 and random access memory (RAM) 1325 to processor 1310. Computing system 1300 can include a cache 1312 of high-speed memory connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms. In some instances, multimodal systems can enable a user to provide multiple types of input/output to communicate with computing system 1300. Computing system 1300 can include communications interface 1340, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1330 can include software services, servers, services, etc., that when the code that defines such software is executed by the processor 1310, it causes the system to perform a function. In some embodiments, a hardware service that performs a particular function can include the software component stored in a computer-readable medium in connection with the necessary hardware components, such as processor 1310, connection 1305, output device 1335, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for imaging, the apparatus comprising: a memory; and one or more processors coupled to the memory, the one or more processors configured to: cause an image sensor to expose a plurality of photodetectors of the image sensor to light from a scene, wherein each of the plurality of photodetectors are configured to convert the light from the scene into a charge in response to exposure to the light from the scene, wherein the plurality of photodetectors includes at least a first group of photodetectors and a second group of photodetectors that are distinct from one another; cause the image sensor to store a plurality of analog photodetector signals corresponding to the charge from each the plurality of photodetectors; read first digital pixel data from a first subset of the plurality of analog photodetector signals corresponding to the first group of photodetectors without reading second digital pixel data from a second subset of the plurality of analog photodetector signals corresponding to the second group of photodetectors; and generate an image of the scene using at least the first digital pixel data.

Aspect 2. The apparatus of Aspect 1, wherein, to read the first digital pixel data from the first subset of the plurality of analog photodetector signals corresponding to the first group of photodetectors without reading the second digital pixel data from the second subset of the plurality of analog photodetector signals corresponding to the second group of photodetectors, the one or more processors use imaging circuitry to selectively apply a modification to the first subset of the plurality of analog photodetector signals without applying the modification to the second subset of the plurality of analog photodetector signals.

Aspect 3. The apparatus of any of Aspects 1 or 2, wherein an analog photodetector signal of the plurality of analog photodetector signals is indicative of a voltage corresponding to the charge from one of the plurality of photodetectors.

Aspect 4. The apparatus of any of Aspects 1 to 3, further comprising: the image sensor.

Aspect 5. The apparatus of any of Aspects 1 to 4, wherein, to read the first digital pixel data from the first subset of the plurality of analog photodetector signals, the one or more processors are configured to cause one or more amplifiers to amplify each of the first subset of the plurality of analog photodetector signals corresponding to the first group of photodetectors into a plurality of amplified analog photodetector signals using the one or more amplifiers, wherein the first digital pixel data is based on the plurality of amplified analog photodetector signals.

Aspect 6. The apparatus of Aspect 5, further comprising: the one or more amplifiers.

Aspect 7. The apparatus of any of Aspects 1 to 6, wherein, to read the first digital pixel data from the first subset of the plurality of analog photodetector signals, the one or more processors are configured to cause one or more analog to digital converters (ADCs) to convert a plurality of analog signals based on the first subset of the plurality of analog photodetector signals corresponding to the first group of photodetectors into digital signals using the one or more ADCs, wherein the first digital pixel data is based on the digital signals.

Aspect 8. The apparatus of Aspect 7, further comprising: the one or more ADCs.

Aspect 9. The apparatus of any of Aspects 7 or 8, wherein the plurality of analog signals include a plurality of amplified analog photodetector signals, wherein one or more amplifiers generate the plurality of amplified analog photodetector signals at least in part by amplifying the first subset of the plurality of analog photodetector signals corresponding to the first group of photodetectors.

Aspect 10. The apparatus of any of Aspects 7 to 9, the one or more processors configured to: generate the first digital pixel data based on the digital signals at least in part by processing the digital signals using one or more image processing operations, the one or more image processing operations including at least one of digital gain, demosaicking, pixel interpolation, missing pixel correction, bad pixel correction, brightness adjustment, contrast adjustment, saturation adjustment, histogram adjustment, color space conversion, automatic white balance adjustment, automatic black balance adjustment, downsampling, and upsampling.

Aspect 11. The apparatus of any of Aspects 1 to 10, the one or more processors configured to: determine whether to read the second digital pixel data from the second subset of the plurality of analog photodetector signals corresponding to the second group of photodetectors after generating the image and based on the image.

Aspect 12. The apparatus of any of Aspects 1 to 11, the one or more processors configured to: read the second digital pixel data from the second subset of the plurality of analog photodetector signals corresponding to the second group of photodetectors after reading the first digital pixel data from the first subset of the plurality of analog photodetector signals corresponding to the first group of photodetectors, wherein reading the second digital pixel data is based on storage of the plurality of analog photodetector signals; and generate a second image of the scene using at least the first digital pixel data and the second digital pixel data, wherein a second resolution of the second image is higher than a first resolution of the image.

Aspect 13. The apparatus of Aspect 12, wherein, to read the second digital pixel data from the second subset of the plurality of analog photodetector signals corresponding to the second group of photodetectors after reading the first digital pixel data from the first subset of the plurality of analog photodetector signals corresponding to the first group of photodetectors, the one or more processors are configured to read the second digital pixel data from the second subset of the plurality of analog photodetector signals corresponding to the second group of photodetectors after generating the image of the scene.

Aspect 14. The apparatus of any of Aspects 12 or 13, the one or more processors configured to: identify that the image includes an area with a saliency exceeding a saliency threshold, wherein the one or more processors are configured to read the second digital pixel data from the second subset of the plurality of analog photodetector signals corresponding to the second group of photodetectors in response to identifying that the image includes the area with the saliency exceeding the saliency threshold.

Aspect 15. The apparatus of any of Aspects 12 to 14, the one or more processors configured to: identify that the image depicts a movement relative to a previous image of the scene captured by the image sensor and exceeding a movement threshold, wherein the one or more processors are configured to read the second digital pixel data from the second subset of the plurality of analog photodetector signals corresponding to the second group of photodetectors in response to identifying that the image depicts the movement relative to the previous image of the scene captured by the image sensor and exceeding the movement threshold.

Aspect 16. The apparatus of any of Aspects 12 to 15, the one or more processors configured to: determine whether to read third digital pixel data from a third subset of the plurality of analog photodetector signals corresponding to a third group of photodetectors after generating the second image and based on the second image, wherein the plurality of photodetectors includes the third group of photodetectors that are distinct from the first group of photodetectors and the second group of photodetectors, wherein the image and the second image are generated without the third digital pixel data.

Aspect 17. The apparatus of any of Aspects 12 to 16, the one or more processors configured to: read third digital pixel data from a third subset of the plurality of analog photodetector signals corresponding to a third group of photodetectors after reading the second digital pixel data from the second subset of the plurality of analog photodetector signals corresponding to the second group of photodetectors, wherein reading the third digital pixel data is based on storage of the plurality of analog photodetector signals, wherein the plurality of photodetectors includes the third group of photodetectors that are distinct from the first group of photodetectors and the second group of photodetectors, wherein the image and the second image are generated without the third digital pixel data; and generate a third image of the scene using at least the first digital pixel data and the second digital pixel data and the third digital pixel data, wherein a third resolution of the third image is higher than the second resolution of the second image.

Aspect 18. The apparatus of any of Aspects 12 to 17, the one or more processors configured to: identify that the image includes a depiction of an object, wherein the one or more processors are configured to read the second digital pixel data from the second subset of the plurality of analog photodetector signals corresponding to the second group of photodetectors in response to identifying that the image includes the depiction of the object.

Aspect 19. The apparatus of Aspect 18, wherein the object is a glyph that optically encodes information, wherein the glyph includes at least one of a linear bar code and a two-dimensional code.

Aspect 20. The apparatus of any of Aspects 18 or 19, wherein the object includes at least a portion of a person.

Aspect 21. The apparatus of any of Aspects 18 to 20, wherein the object includes at least a portion of a vehicle.

Aspect 22. The apparatus of any of Aspects 18 to 21, wherein the object includes one or more alphanumeric characters.

Aspect 23. The apparatus of any of Aspects 1 to 22, wherein the plurality of photodetectors of the image sensor are arranged according to a lattice of blocks that each contain a respective subset of the plurality of photodetectors, wherein each block of the lattice of blocks includes at least one photodetector of the first group of photodetectors and at least one photodetector of the second group of photodetectors.

Aspect 24. The apparatus of any of Aspects 1 to 23, wherein the first group of photodetectors is arranged across the image sensor according to a first pattern, wherein the second group of photodetectors is arranged across the image sensor according to a second pattern, wherein the first pattern and the second pattern correspond to one or more lattices.

Aspect 25. The apparatus of any of Aspects 1 to 24, wherein the image sensor includes a storage array with a plurality of storage units, wherein, to store each of the plurality of analog photodetector signals corresponding to the charge from each the plurality of photodetectors, the image sensor is configured to store each of the plurality of analog photodetector signals in one of the plurality of storage units of the storage array.

Aspect 26. The apparatus of Aspect 25, wherein the image sensor is configured to: reset the plurality of photodetectors of the image sensor and the plurality of storage units of the storage array after capturing the image.

Aspect 27. The apparatus of Aspect 26, the one or more processors configured to: analyze the image using an object detection algorithm, wherein, to reset the plurality of photodetectors of the image sensor and the plurality of storage units of the storage array after capturing the image, the image sensor is configured to reset the plurality of photodetectors of the image sensor and the plurality of storage units of the storage array automatically in response to a lack of a detection of one or more objects in the image by the object detection algorithm.

Aspect 28. The apparatus of any of Aspects 1 to 27, wherein the image sensor is configured to: reset each of the plurality of photodetectors of the image sensor before exposing the plurality of photodetectors to the light from the scene.

Aspect 29. The apparatus of Aspect 28, wherein the image sensor is configured to: move a reset pointer across a plurality of reset pointer positions from a first side of the image sensor to a second side of the image sensor at a predetermined speed, wherein to reset each of the plurality of photodetectors, the image sensor is configured to reset a first photodetector of the plurality of photodetectors in response to the reset pointer reaching one of the plurality of reset pointer positions at which the first photodetector of the plurality of photodetectors is positioned; and move a readout pointer across a plurality of readout pointer positions from the first side of the image sensor to the second side of the image sensor at the predetermined speed, wherein, to read the first digital pixel data from the first subset of the plurality of analog photodetector signals corresponding to the first group of photodetectors, the image sensor is configured to read third digital pixel data corresponding to a second photodetector of the first group of photodetectors in response to the readout pointer reaching one of the plurality of reset pointer positions at which the second photodetector of the first group of photodetectors is positioned, wherein the predetermined speed is associated with a rolling shutter.

Aspect 30. The apparatus of any of Aspects 1 to 29, the one or more processors configured to: output the image.

Aspect 31. The apparatus of Aspect 30, further comprising: a display, wherein, to output the image, the one or more processors are configured to display the image using the display.

Aspect 32. The apparatus of any of Aspects 30 or 31, further comprising: a communication transceiver, wherein, to output the image, the one or more processors are configured to send the image to a recipient device using the communication transceiver.

Aspect 33. The apparatus of any of Aspects 1 to 32, wherein the plurality of photodetectors of the image sensor includes a plurality of image photodiodes and a plurality of focus photodiodes, wherein the plurality of focus photodiodes are configured for phase detection autofocus (PDAF), wherein the first group of photodetectors includes a first subset of the plurality of image photodiodes, wherein the second group of photodetectors includes a second subset of the plurality of image photodiodes.

Aspect 34. The apparatus of any of Aspects 1 to 33, wherein the plurality of photodetectors includes a plurality of photodiodes.

Aspect 35. The apparatus of any of Aspects 1 to 34, wherein the apparatus includes at least one of a mobile handset, a wireless communication device, and a head-mounted display.

Aspect 36. A method for imaging, the method comprising: causing an image sensor to expose a plurality of photodetectors of the image sensor to light from a scene, wherein each of the plurality of photodetectors are configured to convert the light from the scene into a charge in response to exposure to the light from the scene, wherein the plurality of photodetectors includes at least a first group of photodetectors and a second group of photodetectors that are distinct from one another; causing the image sensor to store a plurality of analog photodetector signals corresponding to the charge from each the plurality of photodetectors; reading first digital pixel data from a first subset of the plurality of analog photodetector signals corresponding to the first group of photodetectors without reading second digital pixel data from a second subset of the plurality of analog photodetector signals corresponding to the second group of photodetectors; and generating an image of the scene using at least the first digital pixel data.

Aspect 37. The method of Aspect 36, wherein reading the first digital pixel data from the first subset of the plurality of analog photodetector signals corresponding to the first group of photodetectors without reading the second digital pixel data from the second subset of the plurality of analog photodetector signals corresponding to the second group of photodetectors includes: selectively applying a modification to the first subset of the plurality of analog photodetector signals without applying the modification to the second subset of the plurality of analog photodetector signals.

Aspect 38. The method of any of Aspects 36 or 37, wherein an analog photodetector signal of the plurality of analog photodetector signals is indicative of a voltage corresponding to the charge from one of the plurality of photodetectors.

Aspect 39. The method of any of Aspects 36 to 38, wherein the method is performed by an imaging system that includes the image sensor.

Aspect 40. The method of any of Aspects 36 to 39, wherein reading the first digital pixel data from the first subset of the plurality of analog photodetector signals includes: causing one or more amplifiers to amplify each of the first subset of the plurality of analog photodetector signals corresponding to the first group of photodetectors into a plurality of amplified analog photodetector signals, wherein the first digital pixel data is based on the plurality of amplified analog photodetector signals.

Aspect 41. The method of Aspect 40, wherein the method is performed by an imaging system that includes the one or more amplifiers.

Aspect 42. The method of any of Aspects 36 to 41, wherein reading the first digital pixel data from the first subset of the plurality of analog photodetector signals includes: causing one or more analog to digital converters (ADCs) to convert a plurality of analog signals based on the first subset of the plurality of analog photodetector signals corresponding to the first group of photodetectors into digital signals, wherein the first digital pixel data is based on the digital signals.

Aspect 43. The method of Aspect 42, wherein the method is performed by an imaging system that includes the one or more ADCs.

Aspect 44. The method of any of Aspects 42 or 43, wherein the plurality of analog signals include a plurality of amplified analog photodetector signals, wherein one or more amplifiers generate the plurality of amplified analog photodetector signals at least in part by amplifying the first subset of the plurality of analog photodetector signals corresponding to the first group of photodetectors.

Aspect 45. The method any of Aspects 42 to 44, further comprising: generating the first digital pixel data based on the digital signals at least in part by processing the digital signals using one or more image processing operations, the one or more image processing operations including at least one of digital gain, demosaicking, pixel interpolation, missing pixel correction, bad pixel correction, brightness adjustment, contrast adjustment, saturation adjustment, histogram adjustment, color space conversion, automatic white balance adjustment, automatic black balance adjustment, downsampling, and upsampling.

Aspect 46. The method of any of Aspects 36 to 45, further comprising: determining whether to read the second digital pixel data from the second subset of the plurality of analog photodetector signals corresponding to the second group of photodetectors after generating the image and based on the image.

Aspect 47. The method of any of Aspects 36 to 46, further comprising: reading the second digital pixel data from the second subset of the plurality of analog photodetector signals corresponding to the second group of photodetectors after reading the first digital pixel data from the first subset of the plurality of analog photodetector signals corresponding to the first group of photodetectors, wherein reading the second digital pixel data is based on storage of the plurality of analog photodetector signals; and generating a second image of the scene using at least the first digital pixel data and the second digital pixel data, wherein a second resolution of the second image is higher than a first resolution of the image.

Aspect 48. The method of Aspect 47, wherein reading the second digital pixel data from the second subset of the plurality of analog photodetector signals corresponding to the second group of photodetectors after reading the first digital pixel data from the first subset of the plurality of analog photodetector signals corresponding to the first group of photodetectors includes: reading the second digital pixel data from the second subset of the plurality of analog photodetector signals corresponding to the second group of photodetectors after generating the image of the scene.

Aspect 49. The method of any of Aspects 47 or 48, further comprising: identifying that the image includes an area with a saliency exceeding a saliency threshold, wherein reading the second digital pixel data from the second subset of the plurality of analog photodetector signals corresponding to the second group of photodetectors includes reading the second digital pixel data from the second subset of the plurality of analog photodetector signals corresponding to the second group of photodetectors in response to identifying that the image includes the area with the saliency exceeding the saliency threshold.

Aspect 50. The method of any of Aspects 47 to 49, further comprising: identifying that the image depicts a movement relative to a previous image of the scene captured by the image sensor and exceeding a movement threshold, wherein reading the second digital pixel data from the second subset of the plurality of analog photodetector signals corresponding to the second group of photodetectors includes reading the second digital pixel data from the second subset of the plurality of analog photodetector signals corresponding to the second group of photodetectors in response to identifying that the image depicts the movement relative to the previous image of the scene captured by the image sensor and exceeding the movement threshold.

Aspect 51. The method of any of Aspects 47 to 50, further comprising: determining whether to read third digital pixel data from a third subset of the plurality of analog photodetector signals corresponding to a third group of photodetectors after generating the second image and based on the second image, wherein the plurality of photodetectors includes the third group of photodetectors that are distinct from the first group of photodetectors and the second group of photodetectors, wherein the image and the second image are generated without the third digital pixel data.

Aspect 52. The method of any of Aspects 47 to 51, further comprising: reading third digital pixel data from a third subset of the plurality of analog photodetector signals corresponding to a third group of photodetectors after reading the second digital pixel data from the second subset of the plurality of analog photodetector signals corresponding to the second group of photodetectors, wherein reading the third digital pixel data is based on storage of the plurality of analog photodetector signals, wherein the plurality of photodetectors includes the third group of photodetectors that are distinct from the first group of photodetectors and the second group of photodetectors, wherein the image and the second image are generated without the third digital pixel data; and generating a third image of the scene using at least the first digital pixel data and the second digital pixel data and the third digital pixel data, wherein a third resolution of the third image is higher than the second resolution of the second image.

Aspect 53. The method of any of Aspects 47 to 52, further comprising: identifying that the image includes a depiction of an object, wherein reading the second digital pixel data from the second subset of the plurality of analog photodetector signals corresponding to the second group of photodetectors includes reading the second digital pixel data from the second subset of the plurality of analog photodetector signals corresponding to the second group of photodetectors in response to identifying that the image includes the depiction of the object.

Aspect 54. The method of Aspect 53, wherein the object is a glyph that optically encodes information, wherein the glyph includes at least one of a linear bar code and a two-dimensional code.

Aspect 55. The method of any of Aspects 53 or 54, wherein the object includes at least a portion of a person.

Aspect 56. The method of any of Aspects 53 to 55, wherein the object includes at least a portion of a vehicle.

Aspect 57. The method of any of Aspects 53 to 56, wherein the object includes one or more alphanumeric characters.

Aspect 58. The method of any of Aspects 36 to 57, wherein the plurality of photodetectors of the image sensor are arranged according to a lattice of blocks that each contain a respective subset of the plurality of photodetectors, wherein each block of the lattice of blocks includes at least one photodetector of the first group of photodetectors and at least one photodetector of the second group of photodetectors.

Aspect 59. The method of any of Aspects 36 to 58, wherein the first group of photodetectors is arranged across the image sensor according to a first pattern, wherein the second group of photodetectors is arranged across the image sensor according to a second pattern, wherein the first pattern and the second pattern correspond to one or more lattices.

Aspect 60. The method of any of Aspects 36 to 59, wherein the image sensor includes a storage array with a plurality of storage units, wherein storing each of the plurality of analog photodetector signals corresponding to the charge from each the plurality of photodetectors includes storing each of the plurality of analog photodetector signals in one of the plurality of storage units of the storage array.

Aspect 61. The method of Aspect 60, further comprising: resetting the plurality of photodetectors of the image sensor and the plurality of storage units of the storage array after capturing the image.

Aspect 62. The method of Aspect 61, further comprising: analyze the image using an object detection algorithm, wherein resetting the plurality of photodetectors of the image sensor and the plurality of storage units of the storage array after capturing the image includes: resetting the plurality of photodetectors of the image sensor and the plurality of storage units of the storage array automatically in response to a lack of a detection of one or more objects in the image by the object detection algorithm.

Aspect 63. The method of any of Aspects 36 to 62, further comprising: resetting each of the plurality of photodetectors of the image sensor before exposing the plurality of photodetectors to the light from the scene.

Aspect 64. The method of Aspect 63, further comprising: moving a reset pointer across a plurality of reset pointer positions from a first side of the image sensor to a second side of the image sensor at a predetermined speed, wherein resetting each of the plurality of photodetectors includes resetting a first photodetector of the plurality of photodetectors in response to the reset pointer reaching one of the plurality of reset pointer positions at which the first photodetector of the plurality of photodetectors is positioned; and move a readout pointer across a plurality of readout pointer positions from the first side of the image sensor to the second side of the image sensor at the predetermined speed, wherein reading the first digital pixel data from the first subset of the plurality of analog photodetector signals corresponding to the first group of photodetectors includes reading third digital pixel data corresponding to a second photodetector of the first group of photodetectors in response to the readout pointer reaching one of the plurality of reset pointer positions at which the second photodetector of the first group of photodetectors is positioned, wherein the predetermined speed is associated with a rolling shutter.

Aspect 65. The method of any of Aspects 36 to 64, further comprising: outputting the image.

Aspect 66. The method of Aspect 65, wherein outputting the image includes displaying the image using a display.

Aspect 67. The method of any of Aspects 65 or 66, wherein outputting the image includes sending the image to a recipient device using a communication transceiver.

Aspect 68. The method of any of Aspects 36 to 67, wherein the plurality of photodetectors of the image sensor includes a plurality of image photodiodes and a plurality of focus photodiodes, wherein the plurality of focus photodiodes are configured for phase detection autofocus (PDAF), wherein the first group of photodetectors includes a first subset of the plurality of image photodiodes, wherein the second group of photodetectors includes a second subset of the plurality of image photodiodes.

Aspect 69. The method of any of Aspects 36 to 68, wherein the plurality of photodetectors includes a plurality of photodiodes.

Aspect 70. A non-transitory computer-readable medium having stored thereon instructions that, when executed by one or more processors, cause the one or more processors to: cause an image sensor to expose a plurality of photodetectors of the image sensor to light from a scene, wherein each of the plurality of photodetectors are configured to convert the light from the scene into a charge in response to exposure to the light from the scene, wherein the plurality of photodetectors includes at least a first group of photodetectors and a second group of photodetectors that are distinct from one another; cause the image sensor to store a plurality of analog photodetector signals corresponding to the charge from each the plurality of photodetectors; read first digital pixel data from a first subset of the plurality of analog photodetector signals corresponding to the first group of photodetectors without reading second digital pixel data from a second subset of the plurality of analog photodetector signals corresponding to the second group of photodetectors; and generate an image of the scene using at least the first digital pixel data.

Aspect 71. The non-transitory computer-readable medium of Aspect 70, wherein execution of the instructions by the one or more processors cause the one or more processors to further perform operations according to any of Aspects 2 to 35, and/or any of Aspects 37 to 69.

Aspect 72. An apparatus for imaging, the apparatus comprising: means for causing an image sensor to expose a plurality of photodetectors of the image sensor to light from a scene, wherein each of the plurality of photodetectors are configured to convert the light from the scene into a charge in response to exposure to the light from the scene, wherein the plurality of photodetectors includes at least a first group of photodetectors and a second group of photodetectors that are distinct from one another; means for causing the image sensor to stored a plurality of analog photodetector signals corresponding to the charge from each the plurality of photodetectors; means for reading first digital pixel data from a first subset of the plurality of analog photodetector signals corresponding to the first group of photodetectors without reading second digital pixel data from a second subset of the plurality of analog photodetector signals corresponding to the second group of photodetectors; and means for generating an image of the scene using at least the first digital pixel data.

Aspect 73. The apparatus of Aspect 72, further comprising means to perform operations according to any of Aspects 2 to 35, and/or any of Aspects 37 to 69.

Aspect 74. An apparatus for imaging, the apparatus comprising: a memory; and one or more processors coupled to the memory, the one or more processors configured to: cause an image sensor to expose a plurality of photodetectors of the image sensor to light from a scene, wherein each of the plurality of photodetectors are configured to convert the light from the scene into a charge in response to exposure to the light from the scene, wherein the plurality of photodetectors includes at least a first group of photodetectors and a second group of photodetectors that are distinct from one another; cause the image sensor to store a plurality of analog photodetector signals corresponding to the charge from each the plurality of photodetectors; read first digital pixel data from a first subset of the plurality of analog photodetector signals corresponding to the first group of photodetectors without reading second digital pixel data from a second subset of the plurality of analog photodetector signals corresponding to the second group of photodetectors; generate an image of the scene using at least the first digital pixel data; and determine whether to read the second digital pixel data from the second subset of the plurality of analog photodetector signals corresponding to the second group of photodetectors after generating the image and based on the image.

Aspect 75. The apparatus of Aspect 74, one or more processors configured to perform one or more operations according to any of Aspects 2 to 35.

Aspect 76. A method for imaging, the method comprising: causing an image sensor to expose a plurality of photodetectors of the image sensor to light from a scene, wherein each of the plurality of photodetectors are configured to convert the light from the scene into a charge in response to exposure to the light from the scene, wherein the plurality of photodetectors includes at least a first group of photodetectors and a second group of photodetectors that are distinct from one another; causing the image sensor to store a plurality of analog photodetector signals corresponding to the charge from each the plurality of photodetectors; reading first digital pixel data from a first subset of the plurality of analog photodetector signals corresponding to the first group of photodetectors without reading second digital pixel data from a second subset of the plurality of analog photodetector signals corresponding to the second group of photodetectors; generating an image of the scene using at least the first digital pixel data; and determining whether to read the second digital pixel data from the second subset of the plurality of analog photodetector signals corresponding to the second group of photodetectors after generating the image and based on the image.

Aspect 77. The method of Aspect 76, further comprising one or more operations according to any of Aspects 37 to 69.

Aspect 78. A non-transitory computer-readable medium having stored thereon instructions that, when executed by one or more processors, cause the one or more processors to: cause an image sensor to expose a plurality of photodetectors of the image sensor to light from a scene, wherein each of the plurality of photodetectors are configured to convert the light from the scene into a charge in response to exposure to the light from the scene, wherein the plurality of photodetectors includes at least a first group of photodetectors and a second group of photodetectors that are distinct from one another; cause the image sensor to store a plurality of analog photodetector signals corresponding to the charge from each the plurality of photodetectors; read first digital pixel data from a first subset of the plurality of analog photodetector signals corresponding to the first group of photodetectors without reading second digital pixel data from a second subset of the plurality of analog photodetector signals corresponding to the second group of photodetectors; generate an image of the scene using at least the first digital pixel data; and determine whether to read the second digital pixel data from the second subset of the plurality of analog photodetector signals corresponding to the second group of photodetectors after generating the image and based on the image.

Aspect 79. The non-transitory computer-readable medium of Aspect 78, wherein execution of the instructions by the one or more processors cause the one or more processors to further perform operations according to any of Aspects 2 to 35, and/or any of Aspects 37 to 69.

Aspect 80. An apparatus for imaging, the apparatus comprising: causing an image sensor to expose a plurality of photodetectors of the image sensor to light from a scene, wherein each of the plurality of photodetectors are configured to convert the light from the scene into a charge in response to exposure to the light from the scene, wherein the plurality of photodetectors includes at least a first group of photodetectors and a second group of photodetectors that are distinct from one another; means for causing the image sensor to stored a plurality of analog photodetector signals corresponding to the charge from each the plurality of photodetectors; means for reading first digital pixel data from a first subset of the plurality of analog photodetector signals corresponding to the first group of photodetectors without reading second digital pixel data from a second subset of the plurality of analog photodetector signals corresponding to the second group of photodetectors; means for generating an image of the scene using at least the first digital pixel data; and means for determining whether to read the second digital pixel data from the second subset of the plurality of analog photodetector signals corresponding to the second group of photodetectors after generating the image and based on the image.

Aspect 81. The apparatus of Aspect 80, further comprising means to perform operations according to any of Aspects 2 to 35, and/or any of Aspects 33 to 69.

What is claimed is:

1. An apparatus for imaging, the apparatus comprising:
   at least one memory; and
   at least one processor coupled to the at least one memory, the at least one processor configured to:
   cause an image sensor to expose a plurality of photodetectors of the image sensor to light from a scene, wherein each of the plurality of photodetectors are configured to convert the light from the scene into a charge in response to exposure to the light from the scene, wherein the plurality of photodetectors includes at least a first group of image photodetectors and a second group of image photodetectors that are distinct from one another, wherein the plurality of photodetectors represent a pixel array of the image sensor;
   cause the image sensor to store, in a storage array, a plurality of analog photodetector signals corresponding to the charge from each the plurality of photodetectors;
   read first digital pixel data from a first subset of the plurality of analog photodetector signals corresponding to the first group of image photodetectors from the storage array using at least one analog to digital converter (ADC) without reading second digital pixel data from a second subset of the plurality of analog photodetector signals corresponding to the second group of image photodetectors, wherein the first group of image photodetectors is arranged in a regular pattern across the pixel array, the regular pattern including at least one pixel corresponding to the second group of image photodetectors in between each pixel corresponding to the first group of image photodetectors; and
   generate an image of the scene using at least the first digital pixel data.

2. The apparatus of claim 1, wherein the at least one processor uses imaging circuitry to selectively apply a modification to the first subset of the plurality of analog photodetector signals without applying the modification to the second subset of the plurality of analog photodetector signals to read the first digital pixel data from the first subset of the plurality of analog photodetector signals corresponding to the first group of image photodetectors without reading the second digital pixel data from the second subset of the plurality of analog photodetector signals corresponding to the second group of image photodetectors.

3. The apparatus of claim 1, wherein an analog photodetector signal of the plurality of analog photodetector signals is indicative of a voltage corresponding to the charge from one of the plurality of photodetectors.

4. The apparatus of claim 1, further comprising:
   the image sensor.

5. The apparatus of claim 1, wherein the at least one processor is configured to cause at least one amplifier to amplify each of the first subset of the plurality of analog photodetector signals corresponding to the first group of image photodetectors into a plurality of amplified analog photodetector signals using the at least one amplifier to read the first digital pixel data from the first subset of the plurality of analog photodetector signals, wherein the first digital pixel data is based on the plurality of amplified analog photodetector signals.

6. The apparatus of claim 5, further comprising:
   the at least one amplifier.

7. The apparatus of claim 1, wherein the at least one processor is configured to cause the at least one ADC to convert a plurality of analog signals based on the first subset of the plurality of analog photodetector signals corresponding to the first group of image photodetectors into digital signals using the at least one ADC to read the first digital pixel data from the first subset of the plurality of analog photodetector signals, wherein the first digital pixel data is based on the digital signals.

8. The apparatus of claim 1, further comprising:
   the at least one ADC.

9. The apparatus of claim 7, wherein the plurality of analog signals include a plurality of amplified analog photodetector signals, wherein at least one amplifier amplifies the first subset of the plurality of analog photodetector signals corresponding to the first group of image photodetectors to generate the plurality of amplified analog photodetector signals.

10. The apparatus of claim 1, the at least one processor configured to:
    determine whether to read the second digital pixel data from the second subset of the plurality of analog photodetector signals corresponding to the second group of image photodetectors after generating the image and based on the image.

11. The apparatus of claim 1, the at least one processor configured to:
    read the second digital pixel data from the second subset of the plurality of analog photodetector signals corresponding to the second group of image photodetectors after reading the first digital pixel data from the first subset of the plurality of analog photodetector signals corresponding to the first group of image photodetectors, wherein reading the second digital pixel data is based on storage of the plurality of analog photodetector signals; and
    generate a second image of the scene using at least the first digital pixel data and the second digital pixel data, wherein a second resolution of the second image is higher than a first resolution of the image.

12. The apparatus of claim 11, wherein the at least one processor is configured to read the second digital pixel data from the second subset of the plurality of analog photodetector signals corresponding to the second group of image photodetectors after generating the image of the scene to read the second digital pixel data from the second subset of the plurality of analog photodetector signals corresponding to the second group of image photodetectors after reading the first digital pixel data from the first subset of the plurality of analog photodetector signals corresponding to the first group of image photodetectors.

13. The apparatus of claim 11, the at least one processor configured to:
identify that the image includes an area with a saliency exceeding a saliency threshold, wherein the at least one processor is configured to read the second digital pixel data from the second subset of the plurality of analog photodetector signals corresponding to the second group of image photodetectors in response to identifying that the image includes the area with the saliency exceeding the saliency threshold.

14. The apparatus of claim 11, the at least one processor configured to:
identify that the image depicts a movement relative to a previous image of the scene captured by the image sensor and exceeding a movement threshold, wherein the at least one processor is configured to read the second digital pixel data from the second subset of the plurality of analog photodetector signals corresponding to the second group of image photodetectors in response to identifying that the image depicts the movement relative to the previous image of the scene captured by the image sensor and exceeding the movement threshold.

15. The apparatus of claim 11, the at least one processor configured to:
determine whether to read third digital pixel data from a third subset of the plurality of analog photodetector signals corresponding to a third group of image photodetectors after generating the second image and based on the second image, wherein the plurality of photodetectors includes the third group of image photodetectors that are distinct from the first group of image photodetectors and the second group of image photodetectors, wherein the image and the second image are generated without the third digital pixel data.

16. The apparatus of claim 11, the at least one processor configured to:
read third digital pixel data from a third subset of the plurality of analog photodetector signals corresponding to a third group of image photodetectors after reading the second digital pixel data from the second subset of the plurality of analog photodetector signals corresponding to the second group of image photodetectors, wherein reading the third digital pixel data is based on storage of the plurality of analog photodetector signals, wherein the plurality of photodetectors includes the third group of image photodetectors that are distinct from the first group of image photodetectors and the second group of image photodetectors, wherein the image and the second image are generated without the third digital pixel data; and
generate a third image of the scene using at least the first digital pixel data and the second digital pixel data and the third digital pixel data, wherein a third resolution of the third image is higher than the second resolution of the second image.

17. The apparatus of claim 11, the at least one processor configured to:
identify that the image includes a depiction of an object, wherein the at least one processor is configured to read the second digital pixel data from the second subset of the plurality of analog photodetector signals corresponding to the second group of image photodetectors in response to identifying that the image includes the depiction of the object.

18. The apparatus of claim 17, wherein the object is a glyph that optically encodes information, wherein the glyph includes at least one of a linear bar code or a two-dimensional code.

19. The apparatus of claim 17, wherein the object includes at least one of a portion of a person, a portion of a vehicle, or an alphanumeric character.

20. The apparatus of claim 1, wherein the pixel array of the image sensor is arranged according to a lattice of blocks that each includes a respective subset of pixels of the pixel array, wherein each block of the lattice of blocks includes at least one photodetector of the first group of image photodetectors and at least one photodetector of the second group of image photodetectors.

21. The apparatus of claim 1, wherein the second group of image photodetectors is arranged across the image sensor according to a second pattern, wherein the regular pattern and the second pattern correspond to at least one lattice of blocks of pixels across the pixel array.

22. The apparatus of claim 1, wherein the image sensor includes the storage array, wherein the storage array includes a plurality of storage units, wherein, to store each of the plurality of analog photodetector signals corresponding to the charge from each the plurality of photodetectors, the image sensor is configured to store each of the plurality of analog photodetector signals in one of the plurality of storage units of the storage array.

23. The apparatus of claim 1, wherein the image sensor is configured to:
reset the plurality of photodetectors of the image sensor and a plurality of storage units of the storage array after capturing the image.

24. The apparatus of claim 23, the at least one processor configured to:
analyze the image using an object detection algorithm, wherein, to reset the plurality of photodetectors of the image sensor and the plurality of storage units of the storage array after capturing the image, the image sensor is configured to reset the plurality of photodetectors of the image sensor and the plurality of storage units of the storage array automatically in response to a lack of a detection of one or more objects in the image by the object detection algorithm.

25. The apparatus of claim 1, wherein the image sensor is configured to:
reset each of the plurality of photodetectors of the image sensor before exposing the plurality of photodetectors to the light from the scene.

26. The apparatus of claim 25, wherein the image sensor is configured to:
move a reset pointer across a plurality of reset pointer positions from a first side of the image sensor to a second side of the image sensor at a predetermined speed, wherein to reset each of the plurality of photodetectors, the image sensor is configured to reset a first photodetector of the plurality of photodetectors in response to the reset pointer reaching one of the plurality of reset pointer positions at which the first photodetector of the plurality of photodetectors is positioned; and
move a readout pointer across a plurality of readout pointer positions from the first side of the image sensor to the second side of the image sensor at the predetermined speed, wherein, to read the first digital pixel data from the first subset of the plurality of analog photodetector signals corresponding to the first group of image photodetectors, the image sensor is configured to read third digital pixel data corresponding to a second photodetector of the first group of image photodetectors in response to the readout pointer reaching one of the plurality of reset pointer positions at which the second photodetector of the first group of image photodetectors is positioned, wherein the predetermined speed is associated with a rolling shutter.

27. The apparatus of claim 1, the at least one processor configured to:
output the image.

28. The apparatus of claim 27, further comprising:
a display configured to display the image to output the image.

29. The apparatus of claim 1, wherein the plurality of photodetectors of the image sensor includes a plurality of image photodiodes and a plurality of focus photodiodes, wherein the plurality of focus photodiodes are configured for phase detection autofocus (PDAF), wherein the first group of image photodetectors includes a first subset of the plurality of image photodiodes, wherein the second group of image photodetectors includes a second subset of the plurality of image photodiodes.

30. A method for imaging, the method comprising:
causing an image sensor to expose a plurality of photodetectors of the image sensor to light from a scene, wherein each of the plurality of photodetectors are configured to convert the light from the scene into a charge in response to exposure to the light from the scene, wherein the plurality of photodetectors includes at least a first group of image photodetectors and a second group of image photodetectors that are distinct from one another, wherein the plurality of photodetectors represent a pixel array of the image sensor;
causing the image sensor to store, in a storage array, a plurality of analog photodetector signals corresponding to the charge from each the plurality of photodetectors;
reading first digital pixel data from a first subset of the plurality of analog photodetector signals corresponding to the first group of image photodetectors from the storage array using at least one analog to digital converter (ADC) without reading second digital pixel data from a second subset of the plurality of analog photodetector signals corresponding to the second group of image photodetectors, wherein the first group of image photodetectors is arranged in a regular pattern across the pixel array, the regular pattern including at least one pixel corresponding to the second group of image photodetectors in between each pixel corresponding to the first group of image photodetectors; and
generating an image of the scene using at least the first digital pixel data.

31. The apparatus of claim 1, wherein the regular pattern repeats horizontally and vertically across the pixel array.

* * * * *